United States Patent
Winter

(10) Patent No.: US 11,299,279 B2
(45) Date of Patent: Apr. 12, 2022

(54) CHILLED WORKING FLUID GENERATION AND SEPARATION FOR AN AIRCRAFT

(71) Applicant: United Technologies Corporation, Farmington, CT (US)

(72) Inventor: Michael Winter, New Haven, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 295 days.

(21) Appl. No.: 16/361,482

(22) Filed: Mar. 22, 2019

(65) Prior Publication Data

US 2019/0292982 A1    Sep. 26, 2019

Related U.S. Application Data

(60) Provisional application No. 62/656,453, filed on Apr. 12, 2018, provisional application No. 62/656,451, (Continued)

(51) Int. Cl.
*F02C 7/141* (2006.01)
*F02C 7/16* (2006.01)
(Continued)

(52) U.S. Cl.
CPC ............. *B64D 13/08* (2013.01); *B01D 45/08* (2013.01); *B01D 53/002* (2013.01); *B03C 1/288* (2013.01);
(Continued)

(58) Field of Classification Search
CPC .... F02C 6/06; F02C 6/08; F02C 7/141; F02C 7/143; F02C 7/16; F02C 7/185; B03C 1/288; B64D 13/08; B64D 27/12; B64D 33/08; B64D 33/32; B64D 2013/0614; B64D 2013/0659; B64D 2013/0674; B64D 2013/0677; B64D 2013/0681; F01D 15/00; F01D 25/12; B01D 45/08; B01D 53/002; F02K 3/06; F05D 2220/323;
(Continued)

(56) References Cited

U.S. PATENT DOCUMENTS 2,877,966 A * 3/1959 Summers, Jr. ......... B64D 13/04
244/59
3,319,072 A   5/1967 Maynard et al.
(Continued)

FOREIGN PATENT DOCUMENTS

CN    106697297    5/2017
CN    206280113    6/2017
(Continued)

OTHER PUBLICATIONS

EP Application No. 19164870.8 Partial EP Search Report dated Sep. 4, 2019, 14 pages.
(Continued)

*Primary Examiner* — Jason H Duger
(74) *Attorney, Agent, or Firm* — Cantor Colburn LLP

(57) ABSTRACT

A system for an aircraft includes an engine bleed source of a gas turbine engine. The system also includes a means for chilling an engine bleed air flow from the engine bleed source to produce a chilled working fluid. The system further includes a means for providing the chilled working fluid for an aircraft use.

16 Claims, 31 Drawing Sheets

Related U.S. Application Data filed on Apr. 12, 2018, provisional application No. 62/653,604, filed on Apr. 6, 2018, provisional application No. 62/653,599, filed on Apr. 6, 2018, provisional application No. 62/653,602, filed on Apr. 6, 2018, provisional application No. 62/647,060, filed on Mar. 23, 2018, provisional application No. 62/647,055, filed on Mar. 23, 2018.

(51) Int. Cl.
| | |
|---|---|
| F02C 9/18 | (2006.01) |
| B64D 13/08 | (2006.01) |
| F25B 9/14 | (2006.01) |
| F25J 3/04 | (2006.01) |
| B01D 45/08 | (2006.01) |
| B01D 53/00 | (2006.01) |
| B03C 1/28 | (2006.01) |
| B64D 27/12 | (2006.01) |
| B64D 33/08 | (2006.01) |
| F01D 15/00 | (2006.01) |
| F01D 25/12 | (2006.01) |
| F02C 6/08 | (2006.01) |
| F02C 7/143 | (2006.01) |
| F02C 7/18 | (2006.01) |
| F02K 3/06 | (2006.01) |
| B64D 13/06 | (2006.01) |
| F17C 7/02 | (2006.01) |
| F17C 7/04 | (2006.01) |
| B64D 37/32 | (2006.01) |

(52) U.S. Cl.
CPC ............ *B64D 13/06* (2013.01); *B64D 27/12* (2013.01); *B64D 33/08* (2013.01); *F01D 15/00* (2013.01); *F01D 25/12* (2013.01); *F02C 6/08* (2013.01); *F02C 7/141* (2013.01); *F02C 7/143* (2013.01); *F02C 7/16* (2013.01); *F02C 7/185* (2013.01); *F02C 9/18* (2013.01); *F02K 3/06* (2013.01); *F17C 7/02* (2013.01); *F17C 7/04* (2013.01); *F25B 9/14* (2013.01); *F25J 3/04254* (2013.01); *F25J 3/04975* (2013.01); *B64D 37/32* (2013.01); *B64D 2013/0614* (2013.01); *B64D 2013/0659* (2013.01); *B64D 2013/0674* (2013.01); *B64D 2013/0677* (2013.01); *B64D 2013/0681* (2013.01); *F05D 2220/323* (2013.01); *F05D 2260/205* (2013.01); *F05D 2260/211* (2013.01); *F05D 2260/232* (2013.01); *F05D 2260/60* (2013.01); *F25J 2240/42* (2013.01); *F25J 2240/80* (2013.01); *F25J 2290/70* (2013.01)

(58) Field of Classification Search
CPC ......... F05D 2220/205; F05D 2220/211; F05D 2220/232; F05D 2220/60; F17C 7/02; F17C 7/04; F25B 9/14; F25J 3/04254; F25J 3/0429; F25J 3/04533; F25J 3/04563; F25J 3/046; F25J 3/04636; F25J 3/04975; F25J 2205/86; F25J 2215/40; F25J 2240/42; F25J 2240/80; F25J 2290/70
See application file for complete search history.

(56) References Cited

U.S. PATENT DOCUMENTS

| | | | |
|---|---|---|---|
| 3,779,452 A * | 12/1973 | Nau | B01D 53/00 |
| | | | 202/152 |
| 4,262,495 A | 4/1981 | Gupta et al. | |
| 4,668,260 A | 5/1987 | Yoshino | |
| 4,681,602 A | 7/1987 | Glenn et al. | |
| 5,517,978 A | 5/1996 | Yi | |
| 6,519,945 B2 | 2/2003 | Arar et al. | |
| 7,171,819 B2 | 2/2007 | Lui et al. | |
| 7,296,412 B2 | 11/2007 | Hall et al. | |
| 7,406,829 B2 | 8/2008 | Coffinberry | |
| 8,127,527 B2 * | 3/2012 | Giffin | F02C 6/10 |
| | | | 60/224 |
| 8,186,169 B2 | 5/2012 | Gardiner | |
| 8,552,575 B2 | 10/2013 | Teets et al. | |
| 8,752,391 B2 | 6/2014 | Anand et al. | |
| 9,079,199 B2 | 7/2015 | Mishra | |
| 9,162,770 B2 | 10/2015 | Stuckl et al. | |
| 9,494,078 B2 | 11/2016 | Kaufman | |
| 2006/0026988 A1 | 2/2006 | Unger | |
| 2006/0242962 A1 | 11/2006 | Johnson | |
| 2009/0223494 A1 | 9/2009 | Williamson | |
| 2011/0271689 A1 | 11/2011 | Lacy et al. | |
| 2012/0023893 A1 | 2/2012 | Yoo et al. | |
| 2012/0118148 A1 | 5/2012 | Culp et al. | |
| 2012/0240599 A1 | 9/2012 | Stolte | |
| 2012/0312889 A1 | 12/2012 | Chandrashekar et al. | |
| 2013/0086927 A1 | 4/2013 | Mills | |
| 2015/0033765 A1 | 2/2015 | Blalock | |
| 2015/0344144 A1 | 12/2015 | Kamath et al. | |
| 2016/0033197 A1 | 2/2016 | Degenstein et al. | |
| 2016/0047561 A1 | 2/2016 | Army, Jr. | |
| 2016/0118863 A1 | 4/2016 | Pal et al. | |
| 2016/0178285 A1 | 6/2016 | Pal et al. | |
| 2016/0201983 A1 * | 7/2016 | Sharma | F25J 1/0052 |
| | | | 95/11 |
| 2017/0129617 A1 | 5/2017 | Shah et al. | |
| 2017/0176015 A1 | 6/2017 | Kapilavai et al. | |
| 2017/0226862 A1 | 8/2017 | Boeller et al. | |
| 2017/0341769 A1 | 11/2017 | Haberbusch et al. | |
| 2017/0356311 A1 | 12/2017 | Burkhart, Sr. | |
| 2018/0050811 A1 | 2/2018 | Niergarth et al. | |
| 2018/0051716 A1 | 2/2018 | Cheung et al. | |
| 2019/0291877 A1 | 9/2019 | Schwarz et al. | |
| 2019/0293346 A1 | 9/2019 | Schwarz et al. | |

FOREIGN PATENT DOCUMENTS

| | | | | |
|---|---|---|---|---|
| DE | 4016897 C1 * | 6/1991 | | F02C 3/36 |
| DE | 4016897 C1 | 6/1991 | | |
| DE | 19527882 A1 | 4/1997 | | |
| DE | 20115995 U1 | 12/2001 | | |
| DE | 102012021155 A1 | 4/2014 | | |
| EP | 0989375 A1 | 9/1999 | | |
| EP | 1309074 A2 | 5/2003 | | |
| EP | 1580123 A2 | 9/2005 | | |
| EP | 2466186 A1 | 6/2012 | | |
| FR | 2489411 A1 | 3/1982 | | |
| FR | 2906605 A1 | 4/2008 | | |
| FR | 2998265 | 5/2014 | | |
| GB | 2548123 | 9/2017 | | |
| JP | 8326554 A | 12/1996 | | |
| JP | 2000291447 | 10/2000 | | |
| KR | 20140025004 | 3/2014 | | |
| WO | 2009141400 A2 | 11/2009 | | |
| WO | 2013167636 | 11/2013 | | |
| WO | 2014127982 A1 | 8/2014 | | |
| WO | 2014180701 A2 | 11/2014 | | |
| WO | 2016146759 A1 | 9/2016 | | |
| WO | 2016195968 | 12/2016 | | |
| WO | 2018015199 | 1/2018 | | |

OTHER PUBLICATIONS

EP Application No. 19165039.9 Extended EP Search Report dated Sep. 2, 2019, 9 pages.
EP Application No. 19165041.5 Extended EP Search Report dated Sep. 5, 2019, 6 pages.

(56) References Cited

OTHER PUBLICATIONS

EP Application No. 19164870.8 Extended EP Search Report dated Jan. 10, 2020, 15 pages.

* cited by examiner

CHILLED WORKING FLUID GENERATION AND SEPARATION FOR AN AIRCRAFT

CROSS-REFERENCE TO RELATED APPLICATION

This application claims the benefit of priority to U.S. Provisional Application No. 62/647,055 filed Mar. 23, 2018, U.S. Provisional Application No. 62/647,060 filed Mar. 23, 2018, U.S. Provisional Application No. 62/653,599 filed Apr. 6, 2018, U.S. Provisional Application No. 62/653,602 filed Apr. 6, 2018, U.S. Provisional Application No. 62/653,604 filed Apr. 6, 2018, U.S. Provisional Application No. 62/656,451 filed Apr. 12, 2018, and U.S. Provisional Application No. 62/656,453 filed Apr. 12, 2018, the disclosures of which are incorporated herein by reference in their entirety.

BACKGROUND

Exemplary embodiments pertain to aircraft systems, and more particularly to systems and methods of chilled working fluid generation and separation for an aircraft.

Gas turbine engines can provide propulsion and power on an aircraft. Aircraft can include separate systems that control propulsion, thermal management, and other functions. Aircraft environmental control systems can be used to remove heat from various aircraft lubrication and electrical systems and/or used to condition aircraft cabin air. Air cycle packs of an aircraft environmental control system can condition outside (fresh) air for cabin heating and cooling. The air temperatures and pressures from air cycle packs can be conditioned to match typical indoor environments deemed comfortable for occupants.

Gas turbine engines can be implemented as Brayton cycle machines with balanced thermodynamic cycles, where work is a function of pressure and volume, and heat transfer is balanced. The net work for a thermodynamic exchange in a gas turbine engine may be expressed as work done on a substance due to expansion minus work done on recompression. Work can be lost at thermodynamic exchanges where a cooling air branch occurs without imparting a motive force to turbomachinery within a gas turbine engine. In some instances, pressures and temperatures within a gas turbine engine are constrained due to material properties, which can result in designs that are less efficient through losses than may otherwise be needed.

Placement and use of gas turbine engines may be limited on or within an aircraft due to constraints on air intake, exhaust, fuel supply, and other factors. Electric propulsion motors can be effective at driving rotating elements but may be limited in use for providing aircraft thrust due to constraints on power density, electric power demand, heating effects, and weight.

BRIEF DESCRIPTION

Disclosed is a system for an aircraft. The system includes an engine bleed source of a gas turbine engine. The system also includes a means for chilling an engine bleed air flow from the engine bleed source to produce a chilled working fluid at a temperature below a boiling point of oxygen and above a boiling point of nitrogen. The system further includes a means for providing the chilled working fluid for an aircraft use.

In addition to one or more of the features described above or below, or as an alternative, further embodiments may include where the means for chilling the engine bleed air flow is a cryogenic cooling system including a compressor operable to further compress the engine bleed air flow as compressed air and at least one turbine operable to expand and cool the compressed air as the chilled working fluid.

In addition to one or more of the features described above or below, or as an alternative, further embodiments may include where the aircraft use includes cooling one or more components of the aircraft.

In addition to one or more of the features described above or below, or as an alternative, further embodiments may include where the aircraft use includes an increased airflow to one or more of: components of the gas turbine engine, a cabin of the aircraft, and electronics of the aircraft.

In addition to one or more of the features described above or below, or as an alternative, further embodiments may include a means for separating gaseous nitrogen from the chilled working fluid as a gaseous nitrogen supply and separating liquid oxygen from the chilled working fluid as a liquid oxygen supply.

In addition to one or more of the features described above or below, or as an alternative, further embodiments may include where the means for separating gaseous nitrogen and liquid oxygen is an impact plate-based separator including an impact plate positioned proximate to an input port to alter a flow direction of the chilled working fluid.

In addition to one or more of the features described above or below, or as an alternative, further embodiments may include where the means for separating gaseous nitrogen and liquid oxygen is an impact plate-based separator comprising an impact plate positioned proximate to an input port to alter a flow direction of the chilled working fluid.

In addition to one or more of the features described above or below, or as an alternative, further embodiments may include where the means for separating gaseous nitrogen and liquid oxygen is a stagnation plate-based separator including a stagnation plate with variations in curvature and flow paths to alter a flow velocity and pressure of the chilled working fluid.

In addition to one or more of the features described above or below, or as an alternative, further embodiments may include where the means for separating gaseous nitrogen and liquid oxygen is a magnetic-based separator including a magnetic field generator operable to produce a magnetic field to attract the liquid oxygen towards a liquid oxygen output port.

In addition to one or more of the features described above or below, or as an alternative, further embodiments may include where at least a portion of the gaseous nitrogen supply is provided to one or more of: a fuel system of the aircraft and a location downstream of a combustor of the gas turbine engine.

In addition to one or more of the features described above or below, or as an alternative, further embodiments may include where at least a portion of the liquid oxygen supply is provided to one or more of: a cabin of the aircraft and a compressor stream of the gas turbine engine.

Also disclosed is a method that includes providing an engine bleed air flow from an engine bleed source of a gas turbine engine to a cryogenic cooling system. The engine bleed air flow is chilled using the cryogenic cooling system to produce a chilled working fluid at a temperature below a boiling point of oxygen and above a boiling point of nitrogen. The chilled working fluid is provided for an aircraft use.

In addition to one or more of the features described above or below, or as an alternative, further embodiments may include compressing the engine bleed air flow as compressed air by a compressor of the cryogenic cooling system, and expanding and cooling the compressed air as the chilled working fluid by at least one turbine of the cryogenic cooling system.

In addition to one or more of the features described above or below, or as an alternative, further embodiments may include where the aircraft use includes cooling and increasing an airflow to one or more components of the aircraft.

In addition to one or more of the features described above or below, or as an alternative, further embodiments may include separating gaseous nitrogen from the chilled working fluid as a gaseous nitrogen supply, and separating liquid oxygen from the chilled working fluid as a liquid oxygen supply.

In addition to one or more of the features described above or below, or as an alternative, further embodiments may include where separating gaseous nitrogen and liquid oxygen is performed using an impact plate-based separator including an impact plate positioned proximate to an input port to alter a flow direction of the chilled working fluid.

In addition to one or more of the features described above or below, or as an alternative, further embodiments may include where separating gaseous nitrogen and liquid oxygen is performed using a stagnation plate-based separator including a stagnation plate with variations in curvature and flow paths to alter a flow velocity and pressure of the chilled working fluid.

In addition to one or more of the features described above or below, or as an alternative, further embodiments may include where separating gaseous nitrogen and liquid oxygen is performed using a magnetic-based separator including a magnetic field generator operable to produce a magnetic field to attract the liquid oxygen towards a liquid oxygen output port.

In addition to one or more of the features described above or below, or as an alternative, further embodiments may include providing at least a portion of the gaseous nitrogen supply to one or more of: a fuel system of the aircraft and a location downstream of a combustor of the gas turbine engine, and providing at least a portion of the liquid oxygen supply to one or more of: a cabin of the aircraft and a compressor stream of the gas turbine engine.

Also disclosed is a system for an aircraft. The system includes a gas turbine engine operable to produce thrust for the aircraft, and a means for cryogenically cooling an engine bleed air flow of the gas turbine engine to produce a chilled working fluid at a temperature below a boiling point of oxygen and above a boiling point of nitrogen for an aircraft use.

In addition to one or more of the features described above or below, or as an alternative, further embodiments may include where the means for cryogenically cooling the engine bleed air flow includes a compressor operable to further compress the engine bleed air flow as compressed air and at least one turbine operable to expand and cool the compressed air as the chilled working fluid.

Disclosed is a system for an aircraft. The system includes an engine bleed source of a gas turbine engine and a means for chilling an engine bleed air flow from the engine bleed source to produce liquid air. The system further includes a means for providing the liquid air for an aircraft use.

In addition to one or more of the features described above or below, or as an alternative, further embodiments may include where the means for chilling the engine bleed air flow is a cryogenic cooling system including a heat exchanger system operable to pre-cool the engine bleed air flow, a compressor operable to further compress the engine bleed air flow as compressed air, and at least one turbine operable to expand and cool the compressed air as a cooled flow.

In addition to one or more of the features described above or below, or as an alternative, further embodiments may include where the cryogenic cooling system further includes a vacuum system and a condensate pump system operable to condense the liquid air from the cooled flow and urge the liquid air through a feeder line.

In addition to one or more of the features described above or below, or as an alternative, further embodiments may include where the heat exchanger system is operable to receive a cooling air intake and further cool the compressed air prior to reaching the at least one turbine.

In addition to one or more of the features described above or below, or as an alternative, further embodiments may include where the means for providing the liquid air for the aircraft use includes at least one pump in fluid communication with the feeder line and a plumbing system comprising one or more lines and valves.

In addition to one or more of the features described above or below, or as an alternative, further embodiments may include a cryogenic air separator operable to separate gaseous nitrogen from the liquid air as a gaseous nitrogen supply and separate liquid oxygen from the liquid air as a liquid oxygen supply.

Also disclosed is a method that includes providing an engine bleed air flow from an engine bleed source of a gas turbine engine to a cryogenic cooling system. The method also includes chilling the engine bleed air flow using the cryogenic cooling system to produce liquid air and pumping the liquid air for an aircraft use.

In addition to one or more of the features described above or below, or as an alternative, further embodiments may include pre-cooling the engine bleed air flow using a heat exchanger system, and compressing the engine bleed air flow as compressed air by a compressor of the cryogenic cooling system. The method also includes expanding and cooling the compressed air as a cooled flow by at least one turbine of the cryogenic cooling system.

In addition to one or more of the features described above or below, or as an alternative, further embodiments may include condensing the liquid air from the cooled flow and urging the liquid air through a feeder line.

In addition to one or more of the features described above or below, or as an alternative, further embodiments may include receiving a cooling air intake at the heat exchanger system and further cooling the compressed air prior to reaching the at least one turbine.

In addition to one or more of the features described above or below, or as an alternative, further embodiments may include where aircraft use includes cooling and increasing an airflow to one or more components of the aircraft.

In addition to one or more of the features described above or below, or as an alternative, further embodiments may include separating gaseous nitrogen from the liquid air as a gaseous nitrogen supply, and separating liquid oxygen from the liquid air as a liquid oxygen supply.

Also disclosed is a system for an aircraft. The system includes a gas turbine engine operable to produce thrust for the aircraft, and a means for cryogenically cooling the aircraft based on an engine bleed source of the gas turbine engine.

In addition to one or more of the features described above or below, or as an alternative, further embodiments may include where the means for cryogenically cooling the aircraft is a cryogenic cooling system including a heat exchanger system operable to pre-cool the engine bleed air flow, a compressor operable to further compress the engine bleed air flow as compressed air, and at least one turbine operable to expand and cool the compressed air as a cooled flow, a vacuum system, and a condensate pump system operable to condense liquid air from the cooled flow and urge the liquid air through a feeder line to cool one or more components of the aircraft.

Disclosed is an engine-driven cryogenic cooling system for an aircraft. The engine-driven cryogenic cooling system includes a first air cycle machine including a plurality of components operably coupled to a gearbox of a gas turbine engine and configured to produce a cooling air stream based on a first engine bleed source of the gas turbine engine. The engine-driven cryogenic cooling system also includes a second air cycle machine operable to output a chilled air stream at a cryogenic temperature based on a second engine bleed source cooled by the cooling air stream of the first air cycle machine. The engine-driven cryogenic cooling system further includes a means for condensing the chilled air stream into liquid air for an aircraft use.

In addition to one or more of the features described above or below, or as an alternative, further embodiments may include where the components of the first air cycle machine include a first compressor section and a first turbine section, and the second air cycle machine includes a second compressor section and a second turbine section.

In addition to one or more of the features described above or below, or as an alternative, further embodiments may include where the first compressor section includes a first compressor wheel operably coupled to the gearbox, the first turbine section includes one or more turbine wheels operably coupled to the gearbox, and the gearbox is operably coupled to a tower shaft of the gas turbine engine.

In addition to one or more of the features described above or below, or as an alternative, further embodiments may include an air-air heat exchanger interposed in fluid communication between the first engine bleed source and the first compressor wheel, and a fuel-air heat exchanger interposed in fluid communication between the air-air heat exchanger and a first turbine wheel of the first turbine section.

In addition to one or more of the features described above or below, or as an alternative, further embodiments may include where an output of the first turbine wheel is selectively provided to a first cooling use of the aircraft, and a second turbine wheel in fluid communication with the first turbine wheel is operable to output the cooling air stream that is selectively provided to a second cooling use and the second air cycle machine.

In addition to one or more of the features described above or below, or as an alternative, further embodiments may include a selection valve interposed in fluid communication between the air-air heat exchanger and the fuel-air heat exchanger, the selection valve is operable to direct an output of the air-air heat exchanger to the first compressor wheel or the fuel-air heat exchanger; and a mixing chamber in fluid communication with the first compressor wheel, a high pressure compressor of the gas turbine engine, and a turbine cooling air input between the high pressure compressor and a combustor of the gas turbine engine.

In addition to one or more of the features described above or below, or as an alternative, further embodiments may include a heat exchanger system operable to pre-cool an air flow from the second engine bleed source prior to entry into the second compressor section of the second air cycle machine and cool the air flow after exiting the second compressor section, and a cooling fan operably coupled to the second compressor section and configured to urge a heat exchanger cooling flow across the heat exchanger system, the heat exchanger cooling flow including the cooling air stream of the first air cycle machine.

In addition to one or more of the features described above or below, or as an alternative, further embodiments may include where the heat exchanger cooling flow provides a cooling source for the aircraft after crossing the heat exchanger system.

In addition to one or more of the features described above or below, or as an alternative, further embodiments may include where the means for condensing the chilled air stream includes a vacuum system configured to receive the chilled air stream and maintain one or more exit conditions of the second turbine section, a liquid air condensate pump system operable to urge the liquid air through a feeder line, and a cryogenic liquid reservoir operably coupled to the feeder line for the aircraft use.

In addition to one or more of the features described above or below, or as an alternative, further embodiments may include a vacuum pump vent operably coupled to the vacuum system operable to the selectively release the chilled air stream for an aircraft cooling use as a cooling fluid.

Also disclosed is a method that includes driving rotation of a plurality of components of a first air cycle machine through a gearbox operably coupled to a shaft of a gas turbine engine to produce a cooling air stream based on a first engine bleed source of the gas turbine engine. A chilled air stream is output at a cryogenic temperature from a second air cycle machine based on a second engine bleed source cooled by the cooling air stream of the first air cycle machine. The chilled air stream is condensed into liquid air for an aircraft use.

In addition to one or more of the features described above or below, or as an alternative, further embodiments may include where a first compressor section of the first air cycle machine includes a first compressor wheel operably coupled to the gearbox, a first turbine section of the first air cycle machine includes one or more turbine wheels operably coupled to the gearbox, and the second air cycle machine includes a second compressor section and a second turbine section.

In addition to one or more of the features described above or below, or as an alternative, further embodiments may include selectively passing a bleed air flow from the engine bleed source through an air-air heat exchanger interposed in fluid communication between the first engine bleed source and the first compressor wheel, and selectively passing the bleed air flow from the air-air heat exchanger to the through a fuel-air heat exchanger interposed in fluid communication between the air-air heat exchanger and a first turbine wheel of the first turbine section.

In addition to one or more of the features described above or below, or as an alternative, further embodiments may include selectively providing an output of the first turbine wheel to a first cooling use of the aircraft, and selectively providing the cooling air stream from a second turbine wheel in fluid communication with the first turbine wheel to a second cooling use and the second air cycle machine.

In addition to one or more of the features described above or below, or as an alternative, further embodiments may include controlling a selection valve interposed in fluid communication between the air-air heat exchanger and the fuel-air heat exchanger to direct an output of the air-air heat exchanger to the first compressor wheel or the fuel-air heat exchanger, and mixing a plurality of flows from the first compressor wheel and a high pressure compressor of the gas turbine engine to provide a turbine cooling air input between the high pressure compressor and a combustor of the gas turbine engine.

In addition to one or more of the features described above or below, or as an alternative, further embodiments may include pre-cooling, by a heat exchanger system, an air flow from the second engine bleed source prior to entry into the second compressor section of the second air cycle machine, cooling, by the heat exchanger system, the air flow after exiting the second compressor section, urging, by a cooling fan, a heat exchanger cooling flow across the heat exchanger system, the heat exchanger cooling flow comprising the cooling air stream of the first air cycle machine, and providing the heat exchanger cooling flow as a cooling source for the aircraft after crossing the heat exchanger system.

In addition to one or more of the features described above or below, or as an alternative, further embodiments may include receiving the chilled air stream at a vacuum system and maintaining one or more exit conditions of the second turbine section, urging the liquid air, by a liquid air condensate pump system, through a feeder line, and collecting the liquid air in a cryogenic liquid reservoir for the aircraft use.

In addition to one or more of the features described above or below, or as an alternative, further embodiments may include selectively releasing, by a vacuum pump vent operably coupled to the vacuum system, the chilled air stream for an aircraft cooling use as a cooling fluid.

Further disclosed is a system for an aircraft. The system includes a gas turbine engine operable to produce thrust for the aircraft, a means for cryogenically cooling the aircraft, and a means for transferring energy from the gas turbine engine to the means for cryogenically cooling the aircraft.

In addition to one or more of the features described above or below, or as an alternative, further embodiments may include where the means for transferring energy is a gearbox operably coupled to a shaft of the gas turbine engine.

In addition to one or more of the features described above or below, or as an alternative, further embodiments may include where the means for cryogenically cooling the aircraft is an engine-driven cryogenic cooling system that includes a first air cycle machine comprising a plurality of components operably coupled to the gearbox and configured to produce a cooling air stream based on a first engine bleed source of the gas turbine engine, a second air cycle machine operable to output a chilled air stream at a cryogenic temperature based on a second engine bleed source cooled by the cooling air stream of the first air cycle machine, and a liquid air collection system operable to condense the chilled air stream into liquid air for an aircraft use.

Disclosed is a gas turbine engine that includes a compressor section and a turbine section operably coupled to the compressor section. The gas turbine engine further includes a means for selectively releasing a cooling fluid flow produced at a cryogenic temperature and a plumbing system in fluid communication with the means for selectively releasing the cooling fluid flow. The plumbing system is configured to route the cooling fluid flow to one or more of the compressor section and the turbine section.

In addition to one or more of the features described above or below, or as an alternative, further embodiments may include where the plumbing system includes tubing routed through one or more components of the gas turbine engine.

In addition to one or more of the features described above or below, or as an alternative, further embodiments may include where the plumbing system includes hollow ceramic lined vanes in one or more components of the gas turbine engine.

In addition to one or more of the features described above or below, or as an alternative, further embodiments may include where the plumbing system is routed to deliver the cooling fluid flow to one or more rim cavities.

In addition to one or more of the features described above or below, or as an alternative, further embodiments may include where the plumbing system is routed to deliver the cooling fluid flow through a diffuser case.

In addition to one or more of the features described above or below, or as an alternative, further embodiments may include where the plumbing system is routed to deliver the cooling fluid flow at or in proximity to a tangential on-board injector flow.

In addition to one or more of the features described above or below, or as an alternative, further embodiments may include where the plumbing system is routed to deliver the cooling fluid flow to one or more buffer cooling locations.

In addition to one or more of the features described above or below, or as an alternative, further embodiments may include where the plumbing system is routed to deliver the cooling fluid flow to one or more of: a high compressor flow, a turbine blade, and a turbine transition duct.

In addition to one or more of the features described above or below, or as an alternative, further embodiments may include where the means for selectively releasing the cooling fluid flow includes a cryogenic cooling system operable to generate liquid air on board the aircraft and a pump operable to urge the cooling fluid flow.

In addition to one or more of the features described above or below, or as an alternative, further embodiments may include where the means for selectively releasing the cooling fluid flow includes a liquid air storage vessel.

Also disclosed is a method that includes determining, by a controller, a flight phase of an aircraft. The controller determines an operating parameter of a gas turbine engine of the aircraft. Liquid air is selectively released from a liquid air source to a plumbing system configured to route a cooling fluid flow from the liquid air source to one or more of a compressor section and a turbine section of the gas turbine engine based on either or both of the flight phase and the operating parameter of the gas turbine engine.

In addition to one or more of the features described above or below, or as an alternative, further embodiments may include where the plumbing system is routed to deliver the cooling fluid flow to one or more of: a rim cavity, a tangential on-board injector flow, a buffer cooling location, a high compressor flow, a turbine blade, and a turbine transition duct.

In addition to one or more of the features described above or below, or as an alternative, further embodiments may include where the liquid air source includes a cryogenic cooling system operable to generate liquid air on board the aircraft and a pump operable to urge the cooling fluid flow.

In addition to one or more of the features described above or below, or as an alternative, further embodiments may include where the liquid air source includes a liquid air storage vessel.

Also disclosed is a system for an aircraft. The system includes a gas turbine engine having a compressor section and a turbine section operably coupled to the compressor section. The system also includes a cryogenic cooling system operable to receive one or more air flows from the gas turbine engine and output a cooling fluid flow produced at a cryogenic temperature. The system further includes a plumbing system in fluid communication with the cryogenic cooling system. The plumbing system is configured to route the cooling fluid flow from the cryogenic cooling system to one or more of the compressor section and the turbine section.

Disclosed is a cryogenic cooling system for an aircraft. The cryogenic cooling system includes a first air cycle machine operable to output a cooling air stream based on a first air source and a second air cycle machine operable to output a chilled air stream at a cryogenic temperature based on a second air source cooled by the cooling air stream of the first air cycle machine. The cryogenic cooling system also includes a means for collecting liquid air from an output of the second air cycle machine.

In addition to one or more of the features described above or below, or as an alternative, further embodiments may include where the first air cycle machine includes a first compressor section and a first turbine section, and the second air cycle machine includes a second compressor section and a second turbine section.

In addition to one or more of the features described above or below, or as an alternative, further embodiments may include where the first compressor section includes a first compressor wheel operably coupled to a first turbine wheel of the first turbine section and a first fan, and the second compressor section includes a second compressor wheel operably coupled to a second turbine wheel of the second turbine section and a second fan.

In addition to one or more of the features described above or below, or as an alternative, further embodiments may include a first heat exchanger system operable to pre-cool a first air flow from the first air source prior to entry into the first compressor wheel and cool the first air flow after exiting the first compressor wheel, and a second heat exchanger system operable to pre-cool a second air flow from the second air source prior to entry into the second compressor wheel and cool the second air flow after exiting the second compressor wheel.

In addition to one or more of the features described above or below, or as an alternative, further embodiments may include where the first fan is operable to urge a first heat exchanger cooling flow across the first heat exchanger system, the second fan is operable to urge a second heat exchanger cooling flow across the second heat exchanger system, and the second heat exchanger cooling flow includes the cooling air stream of the first air cycle machine.

In addition to one or more of the features described above or below, or as an alternative, further embodiments may include a first water separator in fluid communication with an output of the first compressor wheel and an input of the first turbine wheel, the first water separator operable to spray extracted water from the first air flow into the first heat exchanger cooling flow, and a second water separator in fluid communication with an output of the second compressor wheel and an input of the second turbine wheel, the second water separator operable to spray extracted water from the second air flow into the second heat exchanger cooling flow.

In addition to one or more of the features described above or below, or as an alternative, further embodiments may include where the means for collecting liquid air is a liquid air collection system that includes a vacuum system, a liquid air condensate pump system operable to urge the liquid air through a feeder line, and a cryogenic liquid reservoir operably coupled to the feeder line.

In addition to one or more of the features described above or below, or as an alternative, further embodiments may include a cryogenic air separator in fluid communication with the liquid air collection system, the cryogenic air separator operable to separate gaseous nitrogen and liquid oxygen from the liquid air collected by the liquid air collection system, where the cryogenic air separator separates the gaseous nitrogen and liquid oxygen based on one or more of: a temperature-based separator, a stagnation plate-based separator, and a magnetic-based separator.

In addition to one or more of the features described above or below, or as an alternative, further embodiments may include where the gaseous nitrogen is supplied to a fuel system of the aircraft, and the liquid oxygen is supplied to one or more of: a cabin of the aircraft and a compressor stream of a gas turbine engine of the aircraft.

In addition to one or more of the features described above or below, or as an alternative, further embodiments may include where the liquid air is supplied as a cooling fluid to one or more of: an electric fan propulsion motor of the aircraft, an environmental control system of the aircraft, a power system of the aircraft, and a gas turbine engine of the aircraft.

Also disclosed is a method that includes outputting a cooling air stream from a first air cycle machine based on a first air source. A chilled air stream is output at a cryogenic temperature from a second air cycle machine based on a second air source cooled by the cooling air stream of the first air cycle machine. Liquid air is collected in a liquid air collection system from an output of the second air cycle machine.

In addition to one or more of the features described above or below, or as an alternative, further embodiments may include pre-cooling a first air flow from the first air source through a first heat exchanger system prior to entry into the first compressor wheel, cooling the first air flow through the first heat exchanger system after exiting the first compressor wheel, pre-cooling a second air flow from the second air source through a second heat exchanger system prior to entry into the second compressor wheel and cool the second air flow after exiting the second compressor wheel, and cooling the second air flow through the second heat exchanger system after exiting the second compressor wheel.

In addition to one or more of the features described above or below, or as an alternative, further embodiments may include urging, by the first fan, a first heat exchanger cooling flow across the first heat exchanger system, and urging, by the second fan, a second heat exchanger cooling flow across the second heat exchanger system, where the second heat exchanger cooling flow includes the cooling air stream of the first air cycle machine.

In addition to one or more of the features described above or below, or as an alternative, further embodiments may include separating, by a cryogenic air separator, gaseous nitrogen and liquid oxygen from the liquid air collected by the liquid air collection system, where the cryogenic air separator separates the gaseous nitrogen and liquid oxygen based on one or more of: a temperature-based separator, a stagnation plate-based separator, and a magnetic-based separator.

In addition to one or more of the features described above or below, or as an alternative, further embodiments may include supplying the gaseous nitrogen to a fuel system of an aircraft, and supplying the liquid oxygen to one or more of: a cabin of the aircraft and a compressor stream of a gas turbine engine of the aircraft.

In addition to one or more of the features described above or below, or as an alternative, further embodiments may include supplying the liquid air as a cooling fluid to one or more of: an electric fan propulsion motor of an aircraft, an environmental control system of the aircraft, a power system of the aircraft, and a gas turbine engine of the aircraft.

A system for an aircraft includes a gas turbine engine operable to produce thrust for the aircraft and a cryogenic cooling system operable to receive one or more air flows from the gas turbine engine and output a chilled air stream at a cryogenic temperature. A liquid air collection system is in fluid communication with an output of the cryogenic cooling system and operable to receive the chilled air stream. A cryogenic air separator is in fluid communication with the liquid air collection system, where the cryogenic air separator is operable to separate gaseous nitrogen and liquid oxygen from liquid air collected by the liquid air collection system.

In addition to one or more of the features described above or below, or as an alternative, further embodiments may include where the gaseous nitrogen is supplied to a fuel system of the aircraft, and the liquid oxygen is supplied to one or more of: a cabin of the aircraft and a compressor stream of the gas turbine engine of the aircraft.

Disclosed is a propulsion system that includes an electric fan propulsion motor with a plurality of propulsion motor windings. The propulsion system also includes a means for controlling a flow rate of a working fluid through a cryogenic working fluid flow control assembly to the propulsion motor windings.

In addition to one or more of the features described above or below, or as an alternative, further embodiments may include where the cryogenic working fluid flow control assembly includes a manifold and a purge valve proximate to a housing of the electric fan propulsion motor.

In addition to one or more of the features described above or below, or as an alternative, further embodiments may include where the means for cryogenic cooling includes a cryogenic liquid reservoir and a controller operable to supply a pre-cooling flow of the working fluid from the cryogenic liquid reservoir through the cryogenic working fluid flow control assembly to the propulsion motor windings, increase a flow rate of the working fluid to supply a full cooling flow from the cryogenic liquid reservoir through the cryogenic working fluid flow control assembly to the propulsion motor windings, cycle the purge valve to vent a gaseous accumulation of the working fluid, and deliver the working fluid in a liquid state to the propulsion motor windings during operation of the electric fan propulsion motor.

In addition to one or more of the features described above or below, or as an alternative, further embodiments may include where the cryogenic working fluid flow control assembly includes a main flow control valve operable to control the flow rate of the working fluid through a primary cooling line of the cryogenic working fluid flow control assembly to the propulsion motor windings.

In addition to one or more of the features described above or below, or as an alternative, further embodiments may include where the main flow control valve is a variable position valve operable to transition between a closed position, a partially opened position to supply the pre-cooling flow, and a fully opened position to supply the full cooling flow.

In addition to one or more of the features described above or below, or as an alternative, further embodiments may include where the cryogenic working fluid flow control assembly includes a bypass cooling line and a bypass flow control valve configured to selectively provide the pre-cooling flow as a bypass cooling flow around the main flow control valve.

In addition to one or more of the features described above or below, or as an alternative, further embodiments may include one or more temperature sensors, where the controller is operable to control changes in the flow rate of the working fluid and timing of opening and closing the purge valve based on temperature data from the one or more temperature sensors.

In addition to one or more of the features described above or below, or as an alternative, further embodiments may include one or more pressure sensors, where the controller is operable to control changes in the flow rate of the working fluid and timing of opening and closing the purge valve based on pressure data from the one or more pressure sensors.

In addition to one or more of the features described above or below, or as an alternative, further embodiments may include a speed of the electric fan propulsion motor is limited responsive to confirming whether the working fluid is reaching the propulsion motor windings in the liquid state.

In addition to one or more of the features described above or below, or as an alternative, further embodiments may include where the controller is operable to decrease a flow rate of the working fluid from the full cooling flow to a reduced cooling flow prior to disabling a flow of the working fluid from the cryogenic liquid reservoir through the cryogenic working fluid flow control assembly to the propulsion motor windings.

Also disclosed is a method that can include supplying a pre-cooling flow of a working fluid from a cryogenic liquid reservoir through a cryogenic working fluid flow control assembly to a plurality of propulsion motor windings of an electric fan propulsion motor. A flow rate of the working fluid is increased to supply a full cooling flow from the cryogenic liquid reservoir through the cryogenic working fluid flow control assembly to the propulsion motor windings. A purge valve of the cryogenic working fluid flow control assembly is cycled to vent a gaseous accumulation of the working fluid. The working fluid is delivered in a liquid state to the propulsion motor windings during operation of the electric fan propulsion motor.

In addition to one or more of the features described above or below, or as an alternative, further embodiments may include modifying a position of a main flow control valve to control the flow rate of the working fluid through a primary cooling line of the cryogenic working fluid flow control assembly to the propulsion motor windings.

In addition to one or more of the features described above or below, or as an alternative, further embodiments may include where the main flow control valve is a variable position valve operable to transition between a closed position, a partially opened position to supply the pre-cooling flow, and a fully opened position to supply the full cooling flow.

In addition to one or more of the features described above or below, or as an alternative, further embodiments may include opening a bypass flow control valve to provide the pre-cooling flow as a bypass cooling flow through a bypass cooling line around the main flow control valve.

In addition to one or more of the features described above or below, or as an alternative, further embodiments may include changing the flow rate of the working fluid and timing of opening and closing the purge valve based on temperature data from one or more temperature sensors.

In addition to one or more of the features described above or below, or as an alternative, further embodiments may include changing the flow rate of the working fluid and timing of opening and closing the purge valve based on pressure data from one or more pressure sensors.

In addition to one or more of the features described above or below, or as an alternative, further embodiments may include limiting a speed of the electric fan propulsion motor responsive to confirming whether the working fluid is reaching the propulsion motor windings in the liquid state.

In addition to one or more of the features described above or below, or as an alternative, further embodiments may include decreasing a flow rate of the working fluid from the full cooling flow to a reduced cooling flow prior to disabling a flow of the working fluid from the cryogenic liquid reservoir through the cryogenic working fluid flow control assembly to the propulsion motor windings.

Also disclosed is a propulsion system including at least one gas turbine engine, at least one electric generator operable to produce an electric current responsive to rotation driven by the at least one gas turbine engine, an electric fan propulsion motor including a plurality of propulsion motor windings selectively powered responsive to the electric current, and a cryogenic cooling system including a cryogenic liquid reservoir and a cryogenic working fluid flow control assembly in fluid communication with the propulsion motor windings. The cryogenic cooling system is operable to control a flow rate of a working fluid through the cryogenic working fluid flow control assembly to the propulsion motor windings.

In addition to one or more of the features described above or below, or as an alternative, further embodiments may include where the cryogenic cooling system operation is supplemented by a non-cryogenic cooling flow to the propulsion motor windings.

Disclosed is a ground-based cryogenic cooling system that includes a means for cooling an airflow and producing chilled air responsive to a power supply and a liquid air condensate pump system operable to condense the chilled air into liquid air and urge the liquid air through a feeder line. A cryogenic cartridge includes a coupling interface configured to detachably establish fluid communication with the feeder line and a cryogenic liquid reservoir configured to store the liquid air under pressure.

In addition to one or more of the features described above or below, or as an alternative, further embodiments may include where the means for cooling the airflow includes a compressor configured to receive the airflow and produce compressed air, an electric motor operable to drive rotation of the compressor responsive to the power supply, a heat exchanger system in fluid communication with the compressor and configured to cool the compressed air, a means for separating water from the compressed air to produce dried cool air, and a turbine assembly including one or more turbines in fluid communication with the means for separating water, the turbine assembly configured to expand the dried cool air and produce the chilled air.

In addition to one or more of the features described above or below, or as an alternative, further embodiments may include where the means for separating water includes a condenser.

In addition to one or more of the features described above or below, or as an alternative, further embodiments may include where the power supply is an electric power supply from a renewable power source including one or more of: a solar array, a wind turbine system, and a rechargeable battery system.

In addition to one or more of the features described above or below, or as an alternative, further embodiments may include where the cryogenic cartridge includes a rapid release component operable to depressurize the cryogenic liquid reservoir upon impact.

In addition to one or more of the features described above or below, or as an alternative, further embodiments may include a filling station operable to pressurize and store the liquid air in a plurality of cryogenic cartridges.

Also disclosed is a method that can include operating a ground-based cryogenic cooling system to produce a volume of liquid air, pressurizing and storing the liquid air in a cryogenic cartridge, coupling the cryogenic cartridge to a cryogenic liquid distribution system on an aircraft, and selectively releasing the liquid air from the cryogenic cartridge through the cryogenic liquid distribution system for an aircraft use.

In addition to one or more of the features described above or below, or as an alternative, further embodiments may include producing compressed air by a compressor responsive to rotation driven by an electric motor, cooling the compressed air through a heat exchanger system, removing water from the cooled compressed air to produce dried cool air, and expanding the dried cool air through a turbine assembly to produce chilled air.

In addition to one or more of the features described above or below, or as an alternative, further embodiments may include condensing the chilled air into the liquid air and urging the liquid air through a feeder line into the cryogenic cartridge.

In addition to one or more of the features described above or below, or as an alternative, further embodiments may include where the cryogenic cartridge includes a coupling interface configured to detachably establish fluid communication with the feeder line and a cryogenic liquid reservoir configured to store the liquid air under pressure.

In addition to one or more of the features described above or below, or as an alternative, further embodiments may include where the cryogenic cartridge includes a rapid release component operable to depressurize the cryogenic liquid reservoir upon impact.

In addition to one or more of the features described above or below, or as an alternative, further embodiments may include where the electric motor is powered by a renewable power source including one or more of: a solar array, a wind turbine system, and a rechargeable battery system.

In addition to one or more of the features described above or below, or as an alternative, further embodiments may include where the aircraft use includes cryogenically cooling an electric motor.

In addition to one or more of the features described above or below, or as an alternative, further embodiments may include where the aircraft use includes cooling one or more components of a gas turbine engine.

In addition to one or more of the features described above or below, or as an alternative, further embodiments may include where the aircraft use includes cooling power electronics of the aircraft.

In addition to one or more of the features described above or below, or as an alternative, further embodiments may include passing the liquid air through a gas separation system to produce gaseous nitrogen and liquid oxygen, providing the gaseous nitrogen to a fuel tank inerting system, and providing the liquid oxygen to either or both of a breathable oxygen system and a combustion enhancement system.

In addition to one or more of the features described above or below, or as an alternative, further embodiments may include controlling an on-board cryogenic cooler to at least partially recharge the cryogenic cartridge during aircraft operation.

Also disclosed is a cryogenic system for an aircraft. The cryogenic system can include a cryogenic liquid distribution system including one or more cryogenic fluid flow paths. The cryogenic system can also include a cryogenic cartridge having a coupling interface configured to detachably establish fluid communication with the cryogenic liquid distribution system and a cryogenic liquid reservoir configured to store liquid air under pressure as a cryogenic working fluid. The cryogenic system can also include one or more cryogenic usage systems in fluid communication with the one or more cryogenic fluid flow paths and configured to selectively receive the cryogenic working fluid.

In addition to one or more of the features described above or below, or as an alternative, further embodiments may include where the cryogenic cartridge includes a rapid release component operable to depressurize the cryogenic liquid reservoir upon impact.

In addition to one or more of the features described above or below, or as an alternative, further embodiments may include an on-board cryogenic cooler operable to at least partially recharge the cryogenic cartridge during aircraft operation.

A technical effect of systems and methods can be achieved by providing a chilled working fluid generation and separation for on-board uses on an aircraft as described herein. A technical effect of systems and methods can be achieved by providing a cryogenic cooling system for an aircraft to create liquid air and/or separate oxygen and nitrogen supplies for on-board uses as described herein. A technical effect of systems and methods can be achieved by providing an engine-driven cryogenic cooling system for an aircraft to create liquid air for on-board cryogenic uses and/or to supply cooling air for on-board use as described herein. A technical effect of systems and methods can be achieved by providing cryogenic cooling to components of a gas turbine engine as described herein. A technical effect of systems and methods can be achieved by providing a cryogenic cooling system for an aircraft to create liquid air for on-board cryogenic uses and/or to supply isolated sources of gaseous nitrogen and liquid oxygen for on-board use as described herein. A technical effect of systems and methods can be achieved by controlling a flow rate of a working fluid through a cryogenic working fluid flow control assembly to propulsion motor windings of an electric fan propulsion motor for efficient cryogenically cooled operation of the electric fan propulsion motor as described herein. A technical effect of systems and methods can be achieved by generating and storing liquid air in one or more cryogenic cartridges using a ground-based system and providing the cryogenic cartridges for use on an aircraft as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
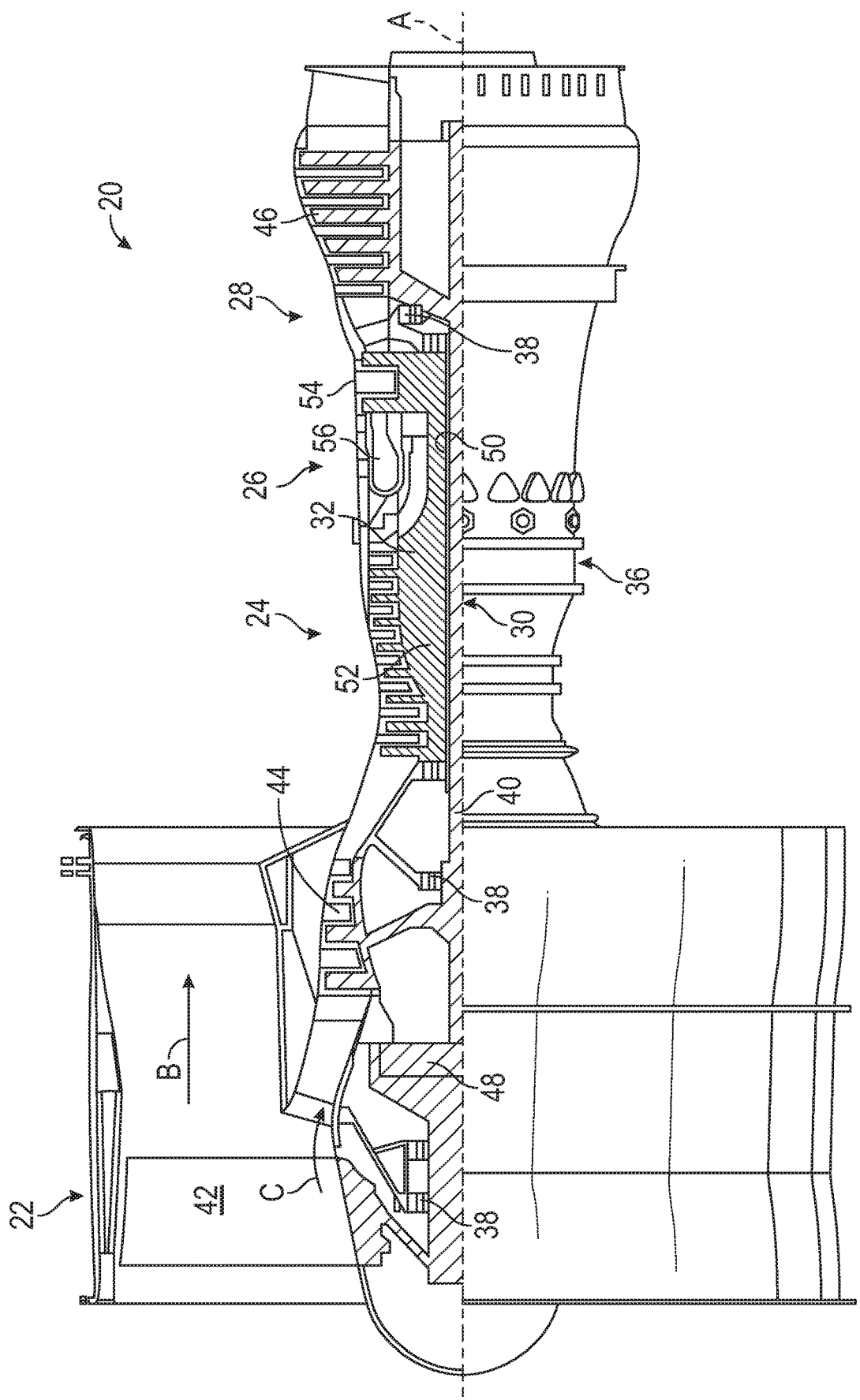
FIG. 1 is a schematic illustration of a gas turbine engine in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 m/sec).

Figure 2:
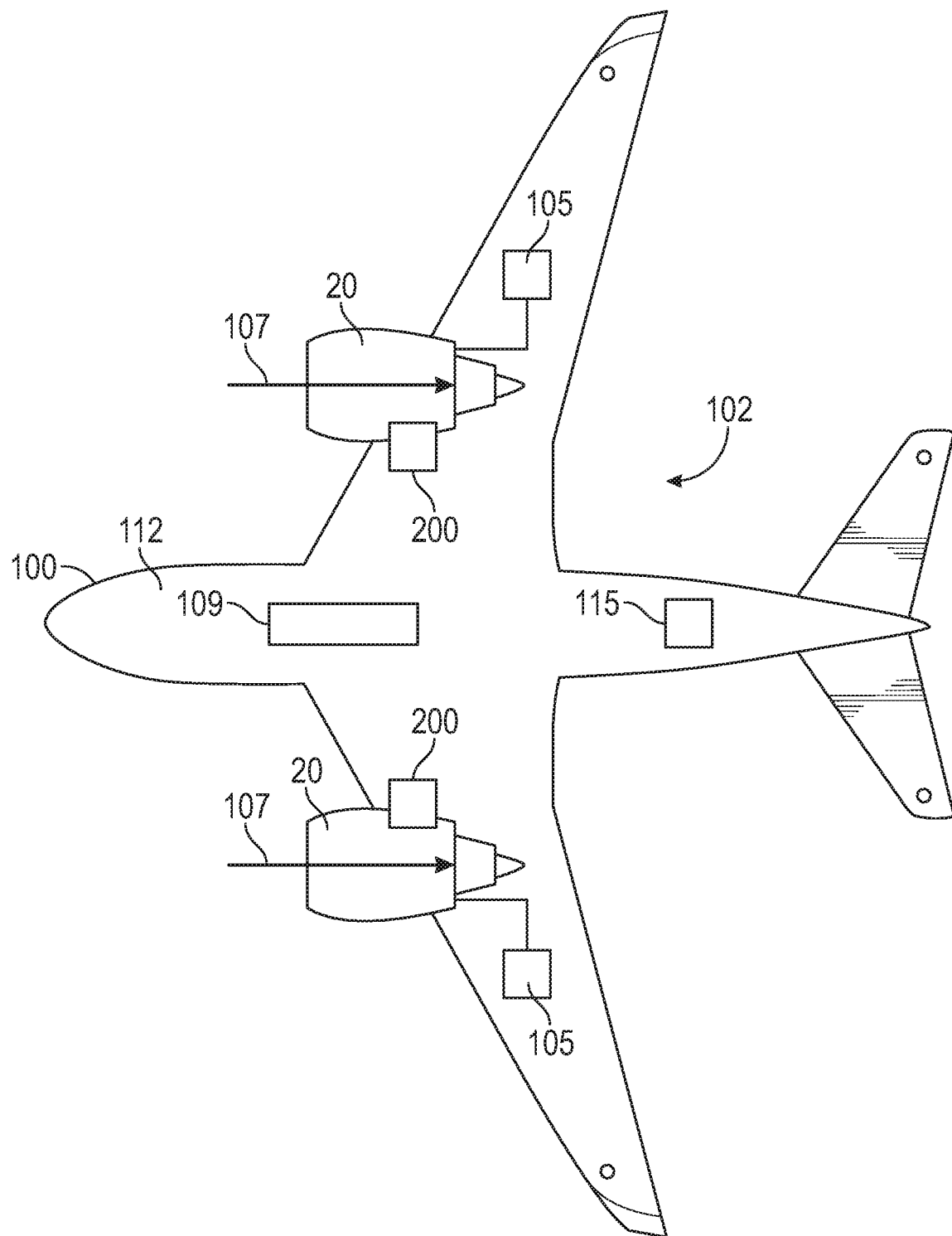
FIG. 2 is a schematic illustration of an aircraft including a propulsion system in accordance with an embodiment of the disclosure.

FIG. 2 schematically illustrates an aircraft 100 with a propulsion system 102. The propulsion system 102 can include one or more gas turbine engines 20 of FIG. 1 and a fuel system 105 operable to provide combustible fuel to the gas turbine engines 20. The gas turbine engines 20 can provide thrust for the aircraft 100 and power for engine accessories. In the example of FIG. 2, the aircraft 100 includes a pair of gas turbine engines 20. Fuel from the fuel system 105 is combusted to produce a compressor stream 107 within each of the gas turbine engines 20. The gas turbine engines 20 can also provide compressed air for an environmental control system 109 to condition a cabin 112 of the aircraft 100, and other uses. The aircraft 100 can also include various systems, such as electronics 115 for control operations, monitoring functions, electric power generation, and the like. In embodiments, the aircraft 100 includes one or more cryogenic cooling systems 200 (e.g., one per gas turbine engine 20) as further described and depicted in FIG. 3. It will be understood that the aircraft 100 includes additional systems not depicted in FIG. 2.

Figure 3:
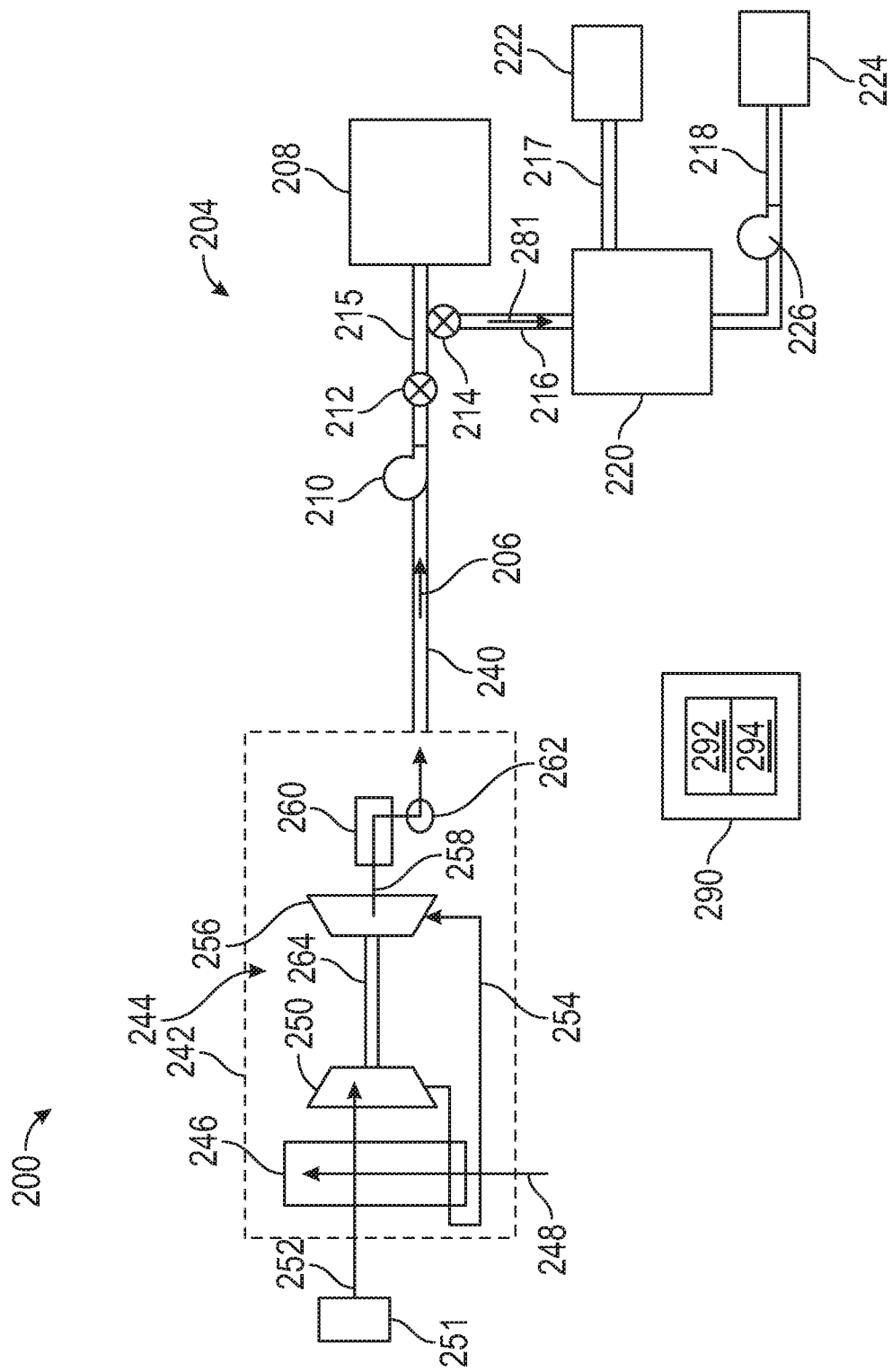
FIG. 3 is a schematic illustration of a cryogenic cooling system in accordance with an embodiment of the disclosure.

FIG. 3 depicts a cryogenic cooling system 200 according to an embodiment and is described with continued reference to FIGS. 1 and 2. The cryogenic cooling system 200 is an example of a means for chilling an engine bleed air flow 252 from an engine bleed source 251 of a gas turbine engine 20. The cryogenic cooling system 200, plumbing system 204, and engine bleed source 251 can collectively form a system of the aircraft 100. Various station locations of the gas turbine engine 20 can be selected as the engine bleed source 251 depending on desired temperature and pressure characteristics of the engine bleed air flow 252 received at the cryogenic cooling system 200. For example, if lower temperature and pressure characteristics of the engine bleed air flow 252 are desired, the engine bleed source 251 can be between the fan 42 and the low pressure compressor 44 or at a location of the low pressure compressor 44. If higher temperature and pressure characteristics of the engine bleed air flow 252 are desired, the engine bleed source 251 can be between the low pressure compressor 44 and the high pressure compressor 52, at a location of the high pressure compressor 52, or between the high pressure compressor 52 and the combustor 56, for example.

The cryogenic cooling system 200 can include a cryogenic cooler 242 operable to chill the engine bleed air flow 252 and produce a working fluid flow 206 for distribution through a plumbing system 204 to cool one or more components 208 of the aircraft 100. In some embodiments, the working fluid flow 206 is chilled below the boiling point of air to produce liquid air. In other embodiments, the working fluid flow 206 is chilled to produce a chilled working fluid at a temperature below the boiling point of oxygen and above the boiling point of nitrogen with respect to the pressure of the working fluid flow 206. Liquid air may be more expensive to produce but easier to pump than a mixed-state or all gas flow. The plumbing system 204 can include tubing that is insulated and/or includes multiple walls to reduce heat transfer. Further, the plumbing system 204 can be routed through one or more components of the gas turbine engine 20 and may be internal and/or external to portions of the gas turbine engine 20 and routed through the aircraft 100 as needed.

The cryogenic cooling system 200 is operable to control a flow rate of the working fluid flow 206 through the plumbing system 204 to one or more components 208 of the aircraft 100. The plumbing system 204 can include one or more pumps, such as pump 210 in fluid communication with a feeder line 240, and the plumbing system 204 can include one or more lines 215, 216, 217, 218, and valves 212, 214. The pump 210 is an example of a means for providing the working fluid flow 206, such as liquid air or a chilled working fluid, for an aircraft use through the plumbing system 204. The pump 210 is operable to urge the working fluid flow 206 through the plumbing system 204 for cooling and/or increasing airflow to one or more components 208 of the aircraft 100 as one or more aircraft uses. Examples of aircraft uses can include cooling components of the gas turbine engine 20, environmental control system 109, cabin 112, electronics 115, and/or other such components and systems. The working fluid flow 206 can also be used for components 208 that may benefit from an increased air flow, such as pneumatic systems.

In embodiments, a combination of valves 212, 214 can be used to control the flow rate of the working fluid flow 206. For example, control valve 212 is operable to control the flow rate of the working fluid flow 206 into the plumbing system 204. One or more control valves, such as valve 214, can be used to direct a portion of the working fluid flow 206 (indicated as flow 281) to a cryogenic air separator 220 that provides a means for separating gaseous nitrogen and liquid oxygen from the working fluid flow 206. For example, the cryogenic air separator 220 may separate liquid air or a chilled working fluid into a gaseous nitrogen supply 222 and a liquid oxygen supply 224. Line 217 may provide gaseous nitrogen from the cryogenic air separator 220 for the gaseous nitrogen supply 222. Line 218 may provide liquid oxygen from the cryogenic air separator 220 for the liquid oxygen supply 224. In some embodiments, a pump 226 can be included at either or both lines 217, 218. In the example of FIG. 3, pump 226 may efficiently urge liquid oxygen through line 218 due to being in a liquid state.

The gaseous nitrogen supply 222 can be used, for example, to sparge fuel in the fuel system 105 to remove oxygen. As such, the gaseous nitrogen supply 222 may obviate the need for a fuel deoxygenation system based on membranes. The nitrogen from the gaseous nitrogen supply 222 can also or alternatively be used to supply inert gas to tanks of the fuel system 105, lowering a combustion risk within the fuel system 105, and eliminating the need for onboard inert gas generating systems on the aircraft 100. As another example, nitrogen from the gaseous nitrogen supply 222 can be injected back into the gas turbine engines 20 downstream of the combustor 56, for instance, at or proximate to the high pressure turbine 54. The addition of nitrogen from the gaseous nitrogen supply 222 at the high pressure turbine 54 can provide cooling and also reduce the risk of combustion occurring in the high pressure turbine 54 should any fuel reach that location. Various instrumentation or equipment of the aircraft 100 that may benefit from an isolated source of nitrogen may also or alternatively receive nitrogen from the gaseous nitrogen supply 222. Other uses of the gaseous nitrogen supply 222 are contemplated, and the description provided herein merely represents several of many possible example uses.

The liquid oxygen supply 224 can be used, for example, to provide intercooling to the gas turbine engines 20. Injection of liquid or cold oxygen in the compressor stream 107 can enhance oxygen concentration upstream from the combustor 56, allowing for higher combustion temperatures without a requirement for the compression and the associated parasitic losses of additional gas volume. Oxygen injection can further enhance thermodynamic efficiency in a Brayton cycle machine. For example, given that oxygen is a minority constituent in the air by $\frac{1}{5}$, just 10% cooled cooling air can result in up to a 50% increase in oxygen available for combustion. Further, oxygen from the liquid oxygen supply 224 can be selectively injected into the gas turbine engine 20 for reductions in acceleration time by providing additional oxidizer independent of the angular moment of inertia associated with spooling up the rotating compression machinery. Further, oxygen from the liquid oxygen supply 224 can be used to supplement or be a primary source of breathable oxygen after conditioning (e.g., temperature and pressure control) for the aircraft 100. Various instrumentation or equipment of the aircraft 100 that may benefit from an isolated source of oxygen may also or alternatively receive oxygen from the liquid oxygen supply 224. Other uses of the liquid oxygen supply 224 are contemplated, and the description provided herein merely represents several of many possible example uses.

In some embodiments, the cryogenic cooler 242 can include one or more air cycle machines 244 operable to compress, chill, expand, pump, and condense an air flow to produce liquid air or a chilled working fluid for use on the aircraft 100. As one example, the cryogenic cooler 242 can include a heat exchanger system 246 operable to receive a cooling air intake 248. A compressor 250 can receive an engine bleed air flow 252 from the gas turbine engine 20 of FIG. 1 as an air flow. Compressed air 254 output by the compressor 250 can pass through the heat exchanger system 246 to at least one turbine 256 as a cooled flow 258 to a vacuum system 260 and a condensate pump system 262 that urges the working fluid flow 206 resulting from chilling the engine bleed air flow 252 through the feeder line 240. The compressor 250 and the at least one turbine 256 may be mechanically linked by a coupling 264, such as a shaft. In some embodiments, the compressor 250 and the at least one turbine 256 are not physically coupled. The compressor 250 can be driven mechanically by the gas turbine engine 20 of FIG. 1 and/or electrically using an electric motor (not depicted). Although one example of the cryogenic cooler 242 is depicted in the example of FIG. 3, it will be understood that additional elements and modifications are contemplated, such as two or more turbine wheels, recirculation paths, water separation, one or more fan sections, intermediate taps, relief valves, and/or other such elements known in the art A controller 290 can interface with and control multiple elements of the cryogenic cooling system 200, such as valve states, flow rates, pressures, temperatures, rotational state of one or more air cycle machines 244, and the like. In an embodiment, the controller 290 includes a memory system 292 to store instructions that are executed by a processing system 294 of the controller 290. The executable instructions may be stored or organized in any manner and at any level of abstraction, such as in connection with a controlling and/or monitoring operation of the cryogenic cooling system 200. The processing system 294 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 292 may include random access memory (RAM), read only memory (ROM), or other electronic, optical, magnetic, or any other computer readable medium onto which is stored data and control algorithms in a non-transitory form.

Figure 4:
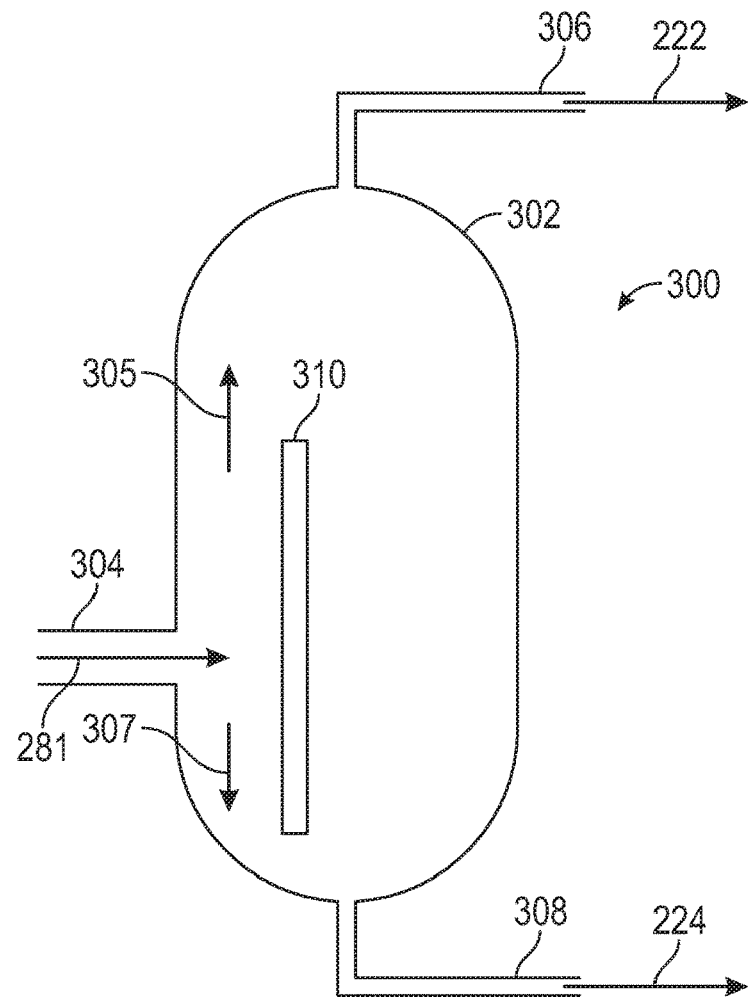
FIG. 4 is a schematic illustration of a cryogenic air separator in accordance with an embodiment of the disclosure.

FIG. 4 depicts a cryogenic air separator 300 as one example of the cryogenic air separator 220 of FIG. 3 in accordance with an embodiment. The cryogenic air separator 300 includes a separation vessel 302 with at least one input port 304, at least one gaseous nitrogen output port 306, and at least one liquid oxygen output port 308. The input port 304 is operable to receive the flow 281 from the cryogenic cooling system 200 of FIG. 3. In some embodiments, the temperature of the flow 281 can be below the boiling points of nitrogen, oxygen, and other constituents of air upon reaching the input port 304 as substantially liquid air. In other embodiments, the flow 281 may reach the input port 304 at a temperature below the boiling point of oxygen and above the boiling point of nitrogen for the respective pressure. The separation vessel 302 can be sized, located, and otherwise temperature controlled to allow nitrogen to boil off or otherwise separate from the flow 281 through the gaseous nitrogen output port 306 as gaseous nitrogen 305 to the gaseous nitrogen supply 222 while liquid oxygen 307 remains and flows out of the liquid oxygen output port 308 to the liquid oxygen supply 224. The separation in the cryogenic air separator 300 can be impact plate-based, where upon the flow 281 striking an impact plate 310 positioned proximate to the input port 304, a flow direction of the flow 281 is altered such that gaseous nitrogen 305 separates (e.g., rises) from the liquid oxygen 307. Due to differences in the boiling points of nitrogen and oxygen, nitrogen can be in a gaseous state while oxygen (and potentially argon) remains liquefied where temperature conditions are above the boiling point of nitrogen but below the boiling point of oxygen. The pressure of the flow 281 can be set/adjusted (e.g., by controller 290 of FIG. 1) to match the separation performance properties of the cryogenic air separator 300, as liquid/gas state is a function of pressure and temperature. Although the example of FIG. 4 includes a single separation vessel 302, it will be understood that other configurations can be implemented, such as a series of separation vessels 302.

Figure 5:
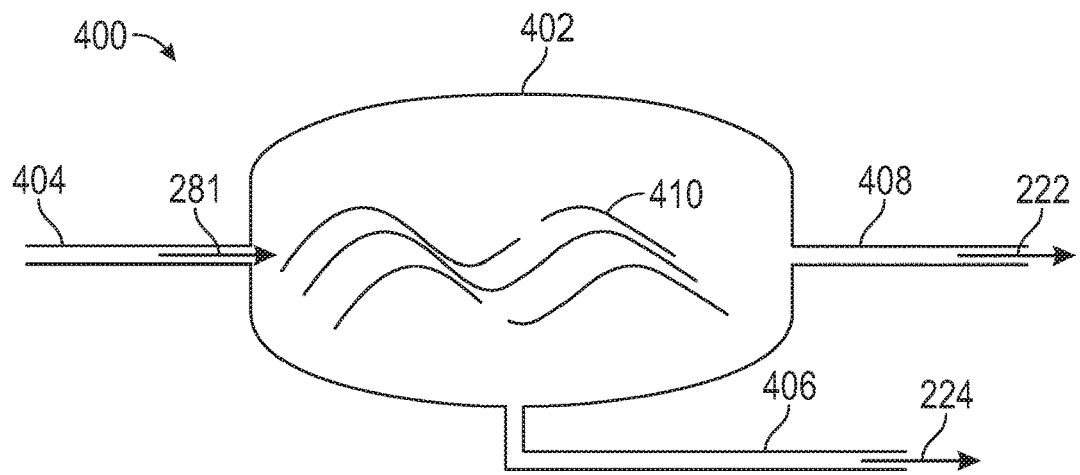
FIG. 5 is a schematic illustration of a cryogenic air separator in accordance with an embodiment of the disclosure.

FIG. 5 depicts a cryogenic air separator 400 as another example of the cryogenic air separator 220 of FIG. 3 in accordance with an embodiment. The cryogenic air separator 400 includes a separation vessel 402 with at least one input port 404, at least one gaseous nitrogen output port 406, at least one liquid oxygen output port 408, and a stagnation plate 410. The cryogenic air separator 400 is referred to as a stagnation plate-based separator, in that the flow 281 received at the input port 404 from the cryogenic cooling system 200 of FIG. 3 strikes the stagnation plate 410 to enhance separation of gaseous nitrogen for the gaseous nitrogen supply 222 and liquid oxygen for the liquid oxygen supply 224. The stagnation plate 410 can include variations in curvature and flow paths, resulting in trapping regions that alter the flow velocity and pressure of the flow 281. In regions where the flow velocity and pressure change, a partial state change can occur where gaseous nitrogen separates from the flow 281 and is output from the gaseous nitrogen output port 406 for the gaseous nitrogen supply 222, while the remaining liquid retains oxygen (and potentially argon) in liquid oxygen is output from the liquid oxygen output port 408 for the liquid oxygen supply 224. Although one example configuration is depicted in FIG. 5, it will be understood that various configurations of the stagnation plate 410 can be implemented in embodiments.

Figure 6:
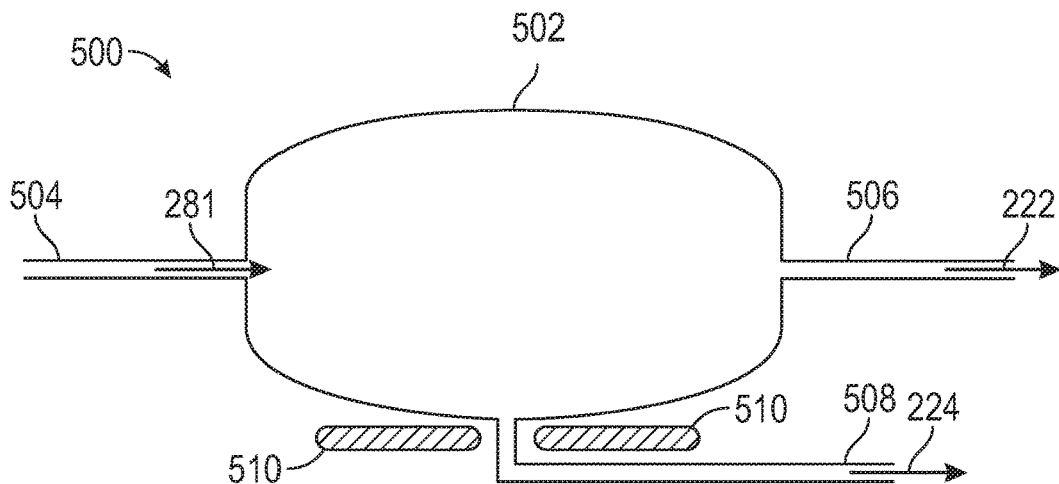
FIG. 6 is a schematic illustration of a cryogenic air separator in accordance with an embodiment of the disclosure.

FIG. 6 depicts a cryogenic air separator 500 as another example of the cryogenic air separator 220 of FIG. 3 in accordance with an embodiment. The cryogenic air separator 500 includes a separation vessel 502 with at least one input port 504, at least one gaseous nitrogen output port 506, at least one liquid oxygen output port 508, and a magnetic field generator 510. The cryogenic air separator 500 is referred to as a magnetic-based separator. The flow 281 received at the input port 504 from the cryogenic cooling system 200 of FIG. 3 may initially separate due to the pressure/temperature conditions within the separation vessel 502 and differences in the boiling points of nitrogen and oxygen. The controller 290 of FIG. 2 may apply a magnetic field by controlling a flow of electric current through the magnetic field generator 510 (e.g., coils of wires). The magnetic field generator 510 can be located proximate to the oxygen output port 508 to take advantage of the paramagnetism of the liquid oxygen to attract/urge the liquid oxygen toward the liquid oxygen output port 508 for the liquid oxygen supply 224, while gaseous nitrogen rises to the gaseous nitrogen output port 506 for the gaseous nitrogen supply 222. In some embodiments, the magnetic field generator 510 can include one or more permanent magnets. Although one example configuration is depicted in FIG. 6, it will be understood that various configurations of the magnetic field generator 510 are contemplated. Further embodiments can combine elements of the cryogenic air separators 300-500 of FIGS. 4-6.

Figure 7:
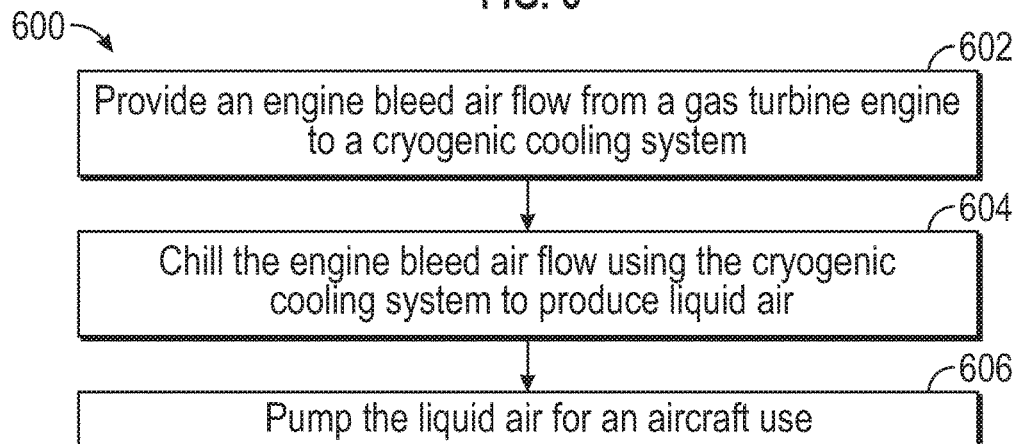
FIG. 7 is a flow chart illustrating a method in accordance with an embodiment of the disclosure.

FIG. 7 is a flow chart illustrating a method 600 in accordance with an embodiment. The method 600 of FIG. 7 is described in reference to FIGS. 1-7 and may be performed with an alternate order and include additional steps. The method 600 can be performed, for example, by the cryogenic cooling system 200 of FIG. 3. In the example of FIG. 7, the method 600 produces liquid air as the working fluid flow 206.

At block 602, an engine bleed air flow 252 can be provided from an engine bleed source 251 of a gas turbine engine 20 to the cryogenic cooling system 200. At block 604, the engine bleed air flow 252 is chilled using the cryogenic cooling system 200 to produce liquid air as a working fluid flow 206. Pre-cooling of the engine bleed air flow 252 can be performed using a heat exchanger system 246. The engine bleed air flow 252 can be compressed as compressed air 254 by a compressor 250 of the cryogenic cooling system 200. Expanding and cooling of the compressed air 254 can be performed by at least one turbine 256 of the cryogenic cooling system 200 to produce a cooled flow 258. A cooling air intake 248 can be received at the heat exchanger system 246, and the heat exchanger system 246 can further cool the compressed air 254 prior to reaching the at least one turbine 256. The cooling air intake 248 can be ambient air, ram air, or other air sources that are cooler than the compressed air 254, for example. In some embodiments, liquid air is condensed from the cooled flow 258.

At block 606, the liquid air in the working fluid flow 206 can be pumped by the pump 210 for an aircraft use. The pump 210 can urge the liquid air through a feeder line 240 to cool and/or increase an air flow to one or more components 208 of the aircraft 100.

All or a portion of the working fluid flow 206 can be provided as flow 281 to a cryogenic air separator 220 operable to separate gaseous nitrogen from the liquid air as a gaseous nitrogen supply 222. The cryogenic air separator 220 can also separate liquid oxygen from the liquid air as a liquid oxygen supply 224. At least a portion of the gaseous nitrogen supply 222 can be provided to one or more of: a fuel system 105 of the aircraft 100 and a location downstream of a combustor 56 of the gas turbine engine 20. At least a portion of the liquid oxygen supply 224 can be provided to one or more of: a cabin 112 of the aircraft 100 and a compressor stream 107 of the gas turbine engine 20.

Figure 8:
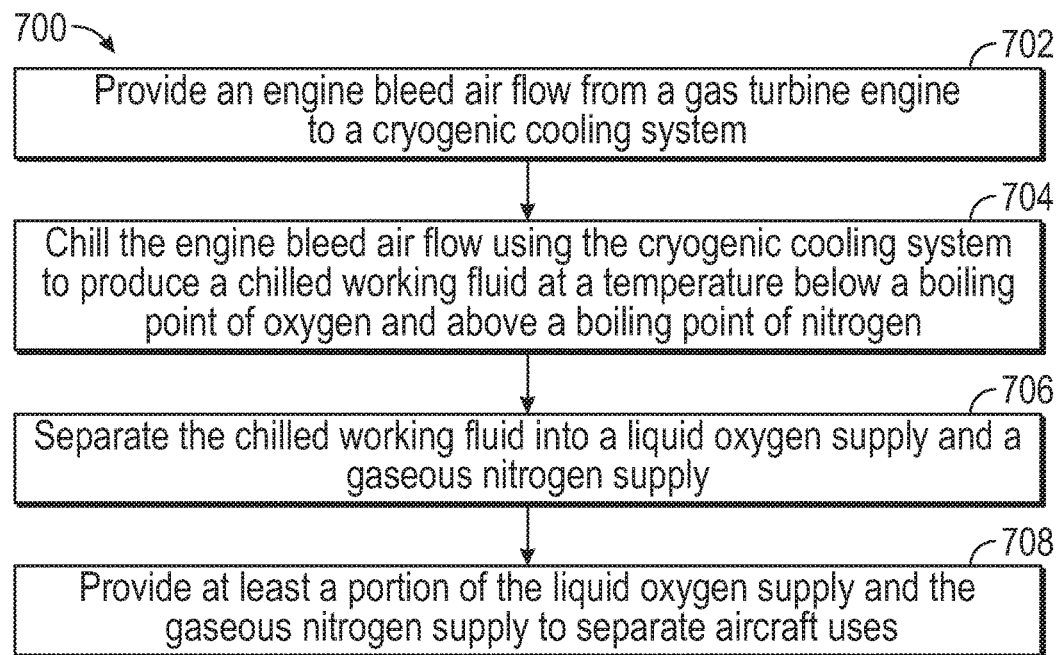
FIG. 8 is a flow chart illustrating a method in accordance with an embodiment of the disclosure.

FIG. 8 is a flow chart illustrating a method 700 in accordance with an embodiment. The method 700 of FIG. 8 is described in reference to FIGS. 1-8 and may be performed with an alternate order and include additional steps. The method 700 can be performed, for example, by the cryogenic cooling system 200 of FIG. 3. In the example of FIG. 8, the method 700 produces a chilled working fluid (e.g., warmer than liquid air) as the working fluid flow 206.

At block 702, an engine bleed air flow 252 can be provided from an engine bleed source 251 of a gas turbine engine 20 to a cryogenic cooling system 200. At block 704, the engine bleed air flow 252 can be chilled using the cryogenic cooling system 200 to produce a chilled working fluid as the working fluid flow 206 at a temperature below a boiling point of oxygen and above a boiling point of nitrogen. The engine bleed air flow 252 can be compressed as compressed air 254 by a compressor 250 of the cryogenic cooling system 200. Expanding and cooling of the compressed air 254 can be performed by at least one turbine 256 of the cryogenic cooling system 200 to produce as the chilled working fluid. The chilled working fluid may be provided as the working fluid flow 206 for an aircraft use. The aircraft use can include cooling and/or increasing an air flow to one or more components 208 of the aircraft 100.

At block 706, gaseous nitrogen can be separated from the chilled working fluid as a gaseous nitrogen supply. For example, all or a portion of the working fluid flow 206 can be provided as flow 281 to a cryogenic air separator 220 operable to separate gaseous nitrogen from the chilled working fluid as a gaseous nitrogen supply 222. At block 708, liquid oxygen can be separated from the chilled working fluid as a liquid oxygen supply 224. In embodiments, separating gaseous nitrogen and liquid oxygen can be performed using an impact plate-based separator, such as cryogenic air separator 300, including an impact plate 310 positioned proximate to an input port 304 to alter a flow direction of the chilled working fluid as the flow 281. Separating gaseous nitrogen and liquid oxygen can alternatively be performed using a stagnation plate-based separator, such as cryogenic air separator 400, including a stagnation plate 410 with variations in curvature and flow paths to alter a flow velocity and pressure of the chilled working fluid as the flow 281. Separating gaseous nitrogen and liquid oxygen may also be performed using a magnetic-based separator, such as cryogenic air separator 500, including a magnetic field generator 510 operable to produce a magnetic field to attract the liquid oxygen towards a liquid oxygen output port 508.

Figure 9:
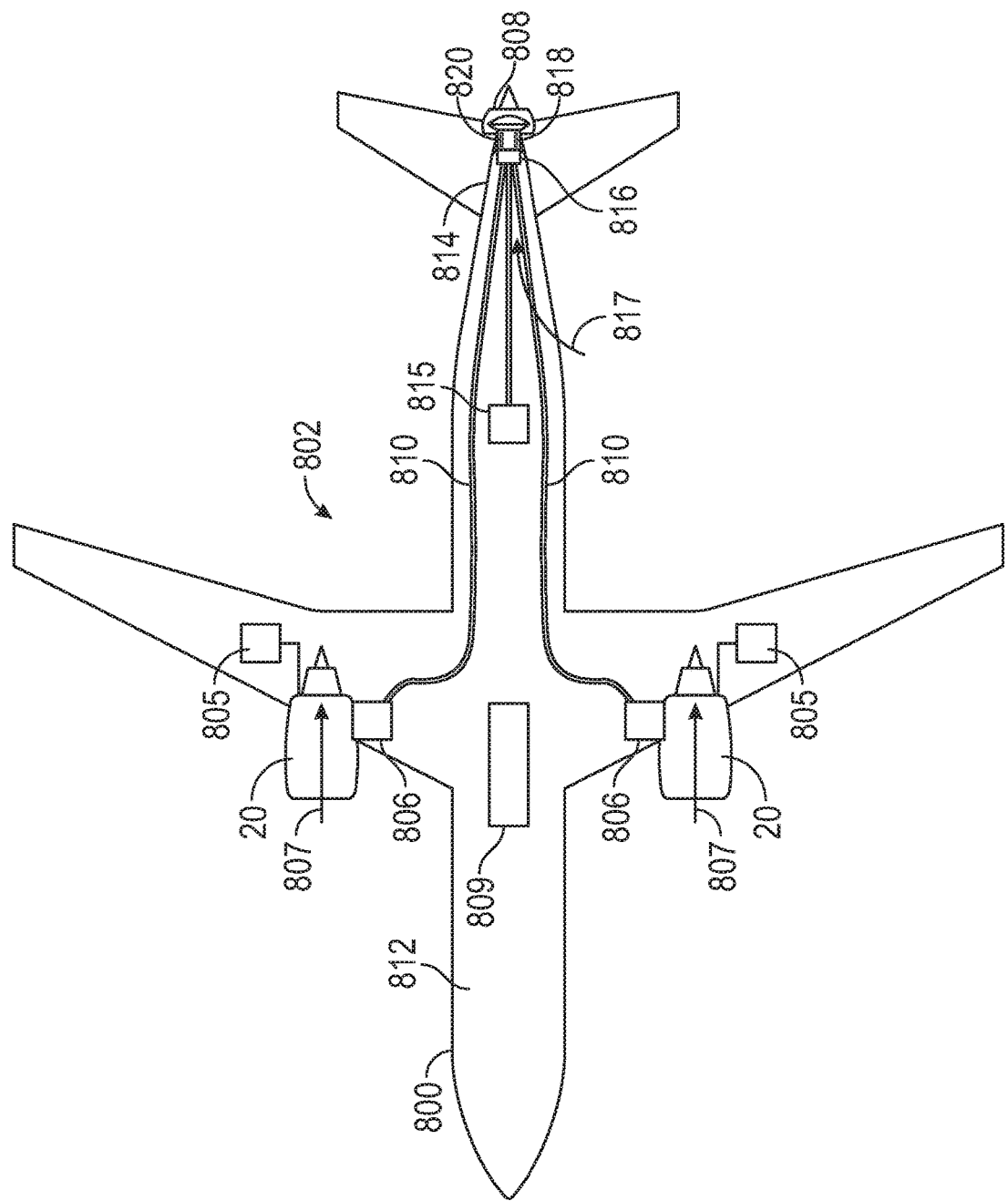
FIG. 9 is a schematic illustration of an aircraft including a propulsion system in accordance with an embodiment of the disclosure.

FIG. 9 schematically illustrates an aircraft 800 with a propulsion system 802. The propulsion system 802 can include one or more gas turbine engines 20 of FIG. 1 and a fuel system 805 operable to provide combustible fuel to the gas turbine engines 20. The gas turbine engines 20 can provide power to engine accessories, such as at least one electric generator 806 operable to produce an electric current. The propulsion system 802 can also include an electric fan propulsion motor system 808 powered responsive to the electric current delivered through a power distribution system 810. In the example of FIG. 9, the aircraft 800 includes a pair of gas turbine engines 20 each having an electric generator 806. A battery system 815 may also or alternatively provide electric current to the electric fan propulsion motor system 808. The gas turbine engines 20 can provide thrust for the aircraft 800, rotary power for the electric generators 806 and other accessories (not depicted), compressed air for an environmental control system 809 to condition a cabin 812 of the aircraft 800, and other uses. Fuel from the fuel system 805 is combusted to produce a compressor stream 807 within each of the gas turbine engines 20.

In some embodiments, the electric fan propulsion motor system 808 can be incorporated in a tail section 814 of the aircraft 800 to provide enhanced thrust under certain operating conditions, such as take-off and/or climb. The electric fan propulsion motor system 808 may also be used to boundary layer air energization and ingestion and drag induced by the aircraft boundary layer at the tail section 814 during operation of the aircraft 800. The electric fan propulsion motor system 808 includes a propulsion motor controller 816 and an electric fan propulsion motor 818 with a plurality of propulsion motor windings 820 selectively powered responsive to electric current. The electric fan propulsion motor 818 may also include its own fan to purge air or chilled air from a propulsion motor housing. The propulsion motor controller 816 is operable to control phase currents of the propulsion motor windings 820 and thereby control a rotational velocity of the electric fan propulsion motor 818. It will be understood that the aircraft 800 includes additional systems not depicted in FIG. 9. In embodiments, efficiency of the electric fan propulsion motor 818 can be enhanced by an engine-driven cryogenic cooling system 900 as further described and depicted in FIG. 10 and/or other examples as provided herein. The electric fan propulsion motor 818 may alternatively or selectively be cooled by other cooling sources, such as ambient air 817.

The electric fan propulsion motor 818 can increase power density, e.g., thrust divided by electric power system weight, at cryogenic temperatures where air liquefies. Embodiments can provide a working fluid flow of liquid air from a cryogenic liquid reservoir through a cryogenic working fluid flow control assembly in fluid communication with propulsion motor windings 820 of the electric fan propulsion motor 818. The working fluid flow can be controlled to pre-cool the cryogenic working fluid flow control assembly and the propulsion motor windings 820 with cooled gaseous air, while liquid air can be used to provide cryogenic cooling of the propulsion motor windings 820 for higher power demand conditions. The working fluid flow and/or generation may be disabled when operation of the electric fan propulsion motor 818 and other systems using the working fluid flow are not needed, such as when the aircraft 800 needs less than maximum thrust.

Figure 10:
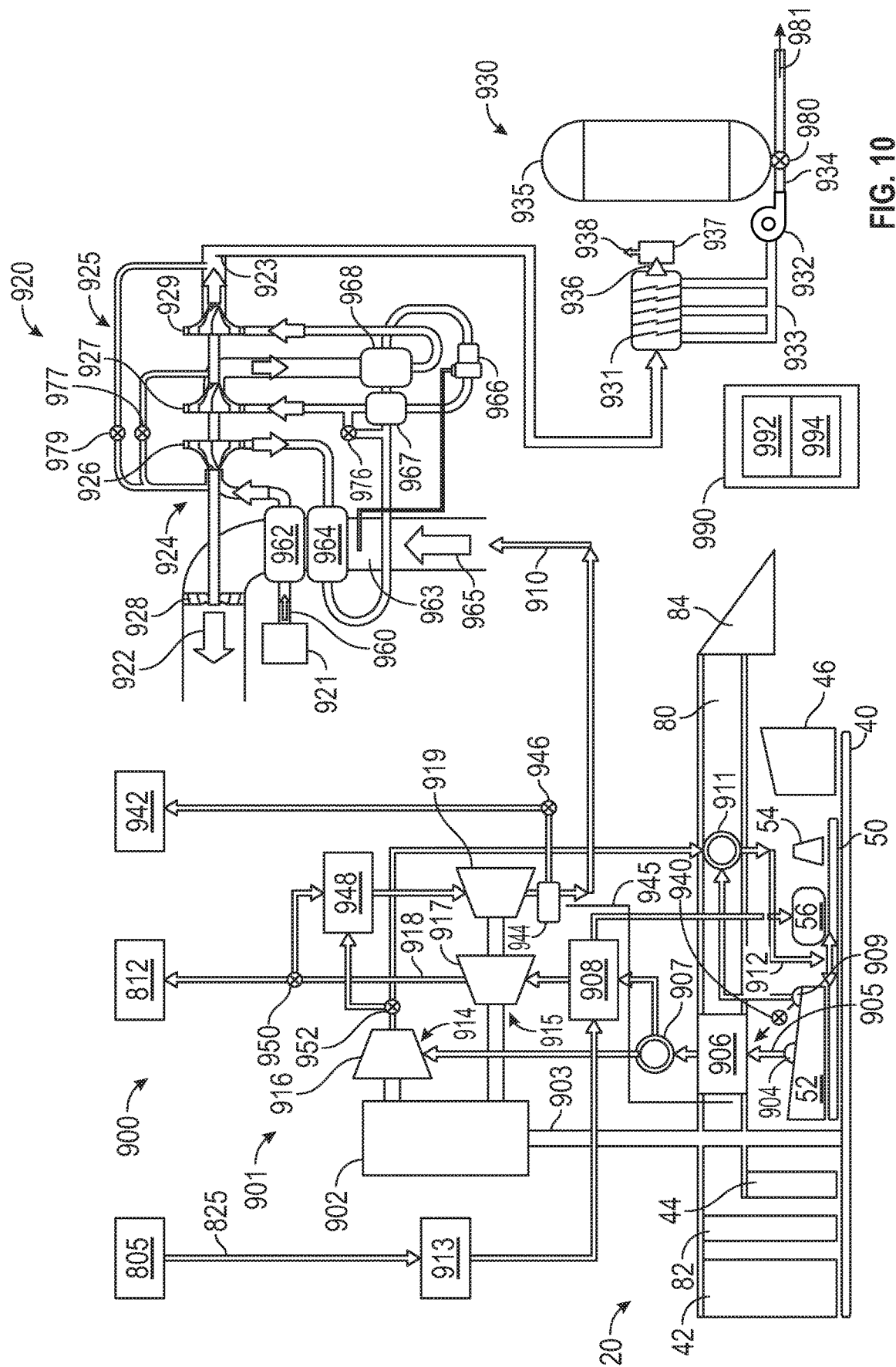
FIG. 10 is a schematic illustration of an engine-driven cryogenic cooling system in accordance with an embodiment of the disclosure.

FIG. 10 depicts an engine-driven cryogenic cooling system 900 according to an embodiment. The engine-driven cryogenic cooling system 900 includes a first air cycle machine 901 operable to produce a cooling air stream 910 based on a first engine bleed source 904. The first air cycle machine 901 can include a plurality of components, such as a first compressor section 914 and a first turbine section 915 operably coupled to a gearbox 902 of the gas turbine engine 20. The gearbox 902 is an example of a means for transferring energy from the gas turbine engine 20 to a means for cryogenically cooling the aircraft 800, such as the engine-driven cryogenic cooling system 900. The gearbox 902 can be operably coupled to a shaft of the gas turbine engine 20, such as inner shaft 40 and tower shaft 903, to drive rotation of the first compressor section 914 responsive to rotation of the tower shaft 903 and/or rotation of the first turbine section 915. The first turbine section 915 can include one or more turbine wheels, such as a first turbine wheel 917 and a second turbine wheel 919 operably coupled to the gearbox 902.

The first engine bleed source 904 can be a mid-compressor bleed or a higher stage bleed of the high pressure compressor 52, for example. A bleed air flow 905 from the engine bleed source 904 can be passed through an air-air heat exchanger 906 to a selection valve 907, which may selectively direct the bleed air flow 905 to a fuel-air heat exchanger 908 or a first compressor wheel 916 of the first compressor section 914. The fuel-air heat exchanger 908 can be interposed in fluid communication between the air-air heat exchanger 906 and the first turbine wheel 917 of the first turbine section 915. The air-air heat exchanger 906 can be positioned, for example, in a duct space 80 between a guide vane section 82 and nozzle portion 84 of the gas turbine engine 20. In some embodiments, a station three bleed 909 can selectively provide bleed air through a valve 940 to the air-air heat exchanger 906 and can also provide engine bleed air from the high pressure compressor 52 to a mixing chamber 911. The mixing chamber 911 can be in fluid communication with the first compressor wheel 916, the high pressure compressor 52 of the gas turbine engine 20, and a turbine cooling air input 912 between the high pressure compressor 52 and the combustor 56 of the gas turbine engine 20. The fuel-air heat exchanger 908 is operable to transfer heat to a fuel flow 825 from the fuel system 805, which may also pass through an airframe heat exchanger 913 before reaching the combustor 56.

In some embodiments, an output 918 of the first turbine wheel 917 is selectively provided to a first cooling use of the aircraft 800, such as the cabin 812 of FIG. 9. The second turbine wheel 919 can be in fluid communication with the first turbine wheel 917 and operable to output a cooling air stream 910 that is selectively provided to a second cooling use 942 and the second air cycle machine 920. For example, an output of the second turbine wheel 919 may pass through a water separator 944, with water 945 extracted and returned (e.g., as a mist spray) proximate to the air-air heat exchanger 906, and a valve 946 can control whether a portion of the cooling air stream 910 is provided with the second cooling use 942 at a temperature below the first cooling use provided to the cabin 812. The water separator 944 may use a condenser, such as a cyclonic separator or similar structure that can swirl air over an impingement surface to cause moisture condensation, for instance, using centrifugal force to extract the water 945. In some embodiments, a heat-adding heat exchanger 948 can be interposed between the first turbine wheel 917 and the second turbine wheel 919 with a control valve 950 operable to control a flow between the first turbine wheel 917 and the second turbine wheel 919. A valve 952 can selectively control a flow of an output of the first compressor wheel 916 to the heat-adding heat exchanger 948 to add heat to a flow between the first turbine wheel 917 and the second turbine wheel 919 if needed.

The engine-driven cryogenic cooling system 900 also includes a second air cycle machine 920 operable to output a chilled air stream 923 at a cryogenic temperature based on a second engine bleed source 921 of the gas turbine engine 20 cooled by the cooling air stream 910 of the first air cycle machine 901. Cryogenic temperatures can refer to temperatures where air, nitrogen, and/or oxygen can exist in a liquid state with respect to pressure. The second air cycle machine 920 can include a second compressor section 924 and a second turbine section 925 operably coupled to the gearbox 902 of the gas turbine engine 20. The engine-driven cryogenic cooling system 900 may also include a liquid air collection system 930 in fluid communication with an output of the second air cycle machine 920. An air flow 960 from the second engine bleed source 921 can be pre-cooled through a heat exchanger system 963 prior to entry into compressor wheel 926 and cool the air flow 960 after exiting the compressor wheel 926. The second engine bleed source 921 can be an engine source from the gas turbine engine 20 of FIG. 1, such as a mid-compressor bleed, fan air, inlet air, or ambient air. The heat exchanger system 963 can include multiple stages, such as a primary heat exchanger 962 and a secondary heat exchanger 964. The air flow 960 can be cooled through the heat exchanger system 963 after exiting the compressor wheel 926. A cooling fan 928 can urge a heat exchanger cooling flow 965 across the heat exchanger system 963, with the heat exchanger cooling flow 965 providing a cooling source 922 for the aircraft 800 of FIG. 9 after crossing the heat exchanger system 963 or dumped overboard. The heat exchanger cooling flow 965 can be or include the cooling air stream 910 of the first air cycle machine 901. The air flow 960 can pass through additional heat exchangers 967, 968 to a water separator 966 in fluid communication with an output of the compressor wheel 926 and an input of the turbine wheel 927. The water separator 966 is operable to spray extracted water from the air flow 960 into the heat exchanger cooling flow 965 upstream from the heat exchanger system 963. A bypass valve 976 may be included to bypass the heat exchangers 967, 968 and water separator 966. An output of the turbine wheel 927 can be in fluid communication with the heat exchanger 968 which is further coupled to an input of the turbine wheel 929. Valves 977, 979 can be included to provide temperature control/anti-icing at an output of the turbine wheels 927, 929, for example, by selectively allowing a portion of the air flow 960 to be bypassed from an input of the compressor wheel 926.

The liquid air collection system 930 can include a vacuum system 931 configured to receive the chilled air stream 923 and maintain one or more exit conditions of the second turbine section 925, a liquid air condensate collection header 933, and a liquid air condensate pump system 932 that urges liquid air through a feeder line 934 for storage in the cryogenic liquid reservoir 935 operably coupled to the feeder line 934. In embodiments, liquid air can be stored under pressure in the cryogenic liquid reservoir 935. In some embodiments, the cryogenic liquid reservoir 935 is a cartridge that can be installed with an initial supply of liquid air and be refilled or supplemented with liquid air produced by the engine-driven cryogenic cooling system 900. Further, the cryogenic liquid reservoir 935 can be configured to accept a refill of liquid air from an alternate source, such as a ground-based recharge of the cryogenic liquid reservoir 935.

In embodiments, a vacuum pump valve 936 can be selectively controlled to pass the chilled air stream 923 after pressurization (which may include liquid air) through a vacuum pump vent 937 for an aircraft cooling use 938 as a cooling fluid. The aircraft cooling use 938 can be, for example, the environmental control system 809 of the aircraft 800 of FIG. 9, cooling selected components of the gas turbine engine 20 of FIG. 1, cooling a power system of the aircraft 800 such as the electric generators 806 and/or battery system 815, and/or other uses. A liquid air flow 981 provided from the cryogenic liquid reservoir 935 through valve 980 or as produced by the engine-driven cryogenic cooling system 900 can be routed to one or more cryogenic uses. For example, the liquid air flow 981 can be selectively provided to the propulsion motor windings 820 of the electric fan propulsion motor 818 of FIG. 9. The liquid air flow 981 can also or alternatively be routed to other electronic loads or portions of the gas turbine engine 20. Other valve and plumbing arrangements are contemplated.

A controller 990 can interface with and control multiple elements of the engine-driven cryogenic cooling system 900, such as valve states, flow rates, pressures, temperatures, rotational state of air cycle machines 901, 920, and the like. In an embodiment, the controller 990 includes a memory system 992 to store instructions that are executed by a processing system 994 of the controller 990. The executable instructions may be stored or organized in any manner and at any level of abstraction, such as in connection with a controlling and/or monitoring operation of the engine-driven cryogenic cooling system 900. The processing system 994 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 992 may include random access memory (RAM), read only memory (ROM), or other electronic, optical, magnetic, or any other computer readable medium onto which is stored data and control algorithms in a non-transitory form.

Although one example of the engine-driven cryogenic cooler system 900 is depicted in the example of FIG. 10, it will be understood that additional elements and modifications are contemplated, such as only one turbine wheel in either or both of the air cycle machines 901, 920, recirculation paths, pumps, intermediate taps, relief valves, and/or other such elements known in the art.

Figure 11:
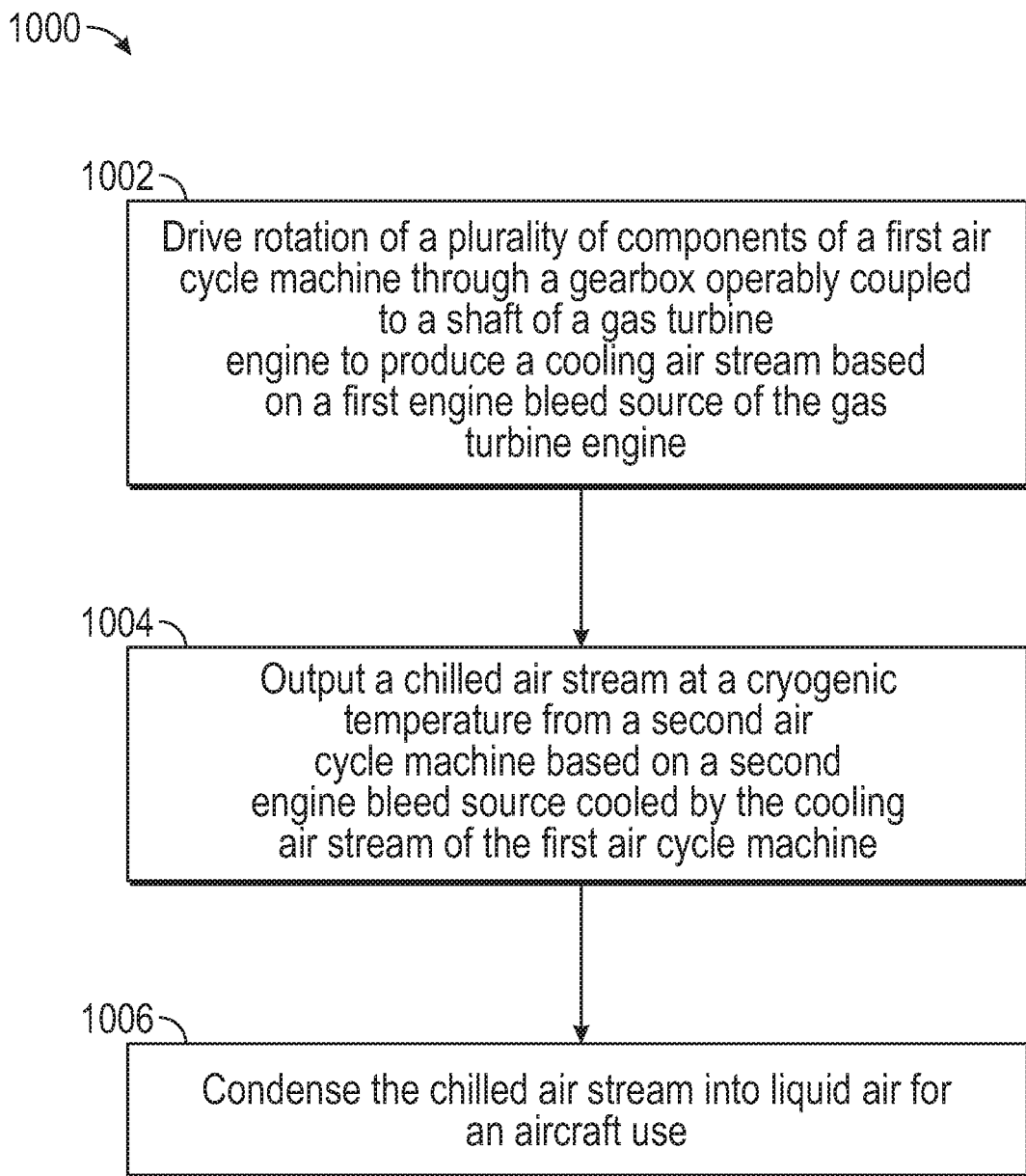
FIG. 11 is a flow chart illustrating a method in accordance with an embodiment of the disclosure.

FIG. 11 is a flow chart illustrating a method 1000 of engine-driven cryogenic cooling fluid generation in accordance with an embodiment. The method 1000 of FIG. 11 is described in reference to FIGS. 1-11 and may be performed with an alternate order and include additional steps. The method 1000 can be performed, for example, by the engine-driven cryogenic cooling system 900 of FIG. 10.

At block 1002, rotation of a plurality of components of a first air cycle machine 901 is driven through a gearbox 902 operably coupled to a shaft (e.g., a tower shaft 903) of a gas turbine engine 20 to produce a cooling air stream 910 based on a first engine bleed source 904 of the gas turbine engine 20.

A bleed air flow 905 can be selectively passed from the engine bleed source 904 through an air-air heat exchanger 906 interposed in fluid communication between the first engine bleed source 904 and the first compressor wheel 916. The bleed air flow 905 can be selectively passed from the air-air heat exchanger 906 to the through a fuel-air heat exchanger 908 interposed in fluid communication between the air-air heat exchanger 906 and a first turbine wheel 917 of the first turbine section 915.

An output 918 of the first turbine wheel 917 can be selectively provided to a first cooling use of the aircraft 800, such as the cabin 812. The cooling air stream 910 can be selectively provided from a second turbine wheel 919 in fluid communication with the first turbine wheel 917 to a second cooling use 942 and the second air cycle machine 920.

A selection valve 907 interposed in fluid communication between the air-air heat exchanger 906 and the fuel-air heat exchanger 908 is operable to direct an output of the air-air heat exchanger 906 to the first compressor wheel 916 or the fuel-air heat exchanger 908. A plurality of flows from the first compressor wheel 916 and a high pressure compressor 52 of the gas turbine engine 20 can be mixed to provide a turbine cooling air input 912 between the high pressure compressor 52 and the combustor 56 of the gas turbine engine 20.

A heat exchanger system 963 can precool an air flow 960 from the second engine bleed source 921 prior to entry into the second compressor section 924 of the second air cycle machine 920. The heat exchanger system 963 can cool the air flow 960 after exiting the second compressor section 924. A cooling fan 928 can urge a heat exchanger cooling flow 965 across the heat exchanger system 963, where the heat exchanger cooling flow 965 includes the cooling air stream 910 of the first air cycle machine 901. The heat exchanger cooling flow 965 can be provided as a cooling source 922 for the aircraft 800 after crossing the heat exchanger system 963.

At block 1004, a chilled air stream 923 is output at a cryogenic temperature from the second air cycle machine 920 based on the second engine bleed source 921 cooled by the cooling air stream 910 of the first air cycle machine 901. At block 1006, the chilled air stream 923 is condensed into liquid air for an aircraft use using a means for condensing the chilled air stream 923, such as the liquid air collection system 930. The chilled air stream 923 can be received at a vacuum system 931 to maintain one or more exit conditions (e.g., pressure) of the second turbine section 925. A vacuum pump valve 936 is operably coupled to the vacuum system 931 and can selectively release the chilled air stream 923 for an aircraft cooling use 938 as a cooling fluid. The liquid air collected in the liquid air condensate collection header 933 can be urged by a liquid air condensate pump system 932 through a feeder line 934. Liquid air may be collected in a cryogenic liquid reservoir 935 for the aircraft use, such as cooling one or more components of the aircraft 800.

Figure 12:
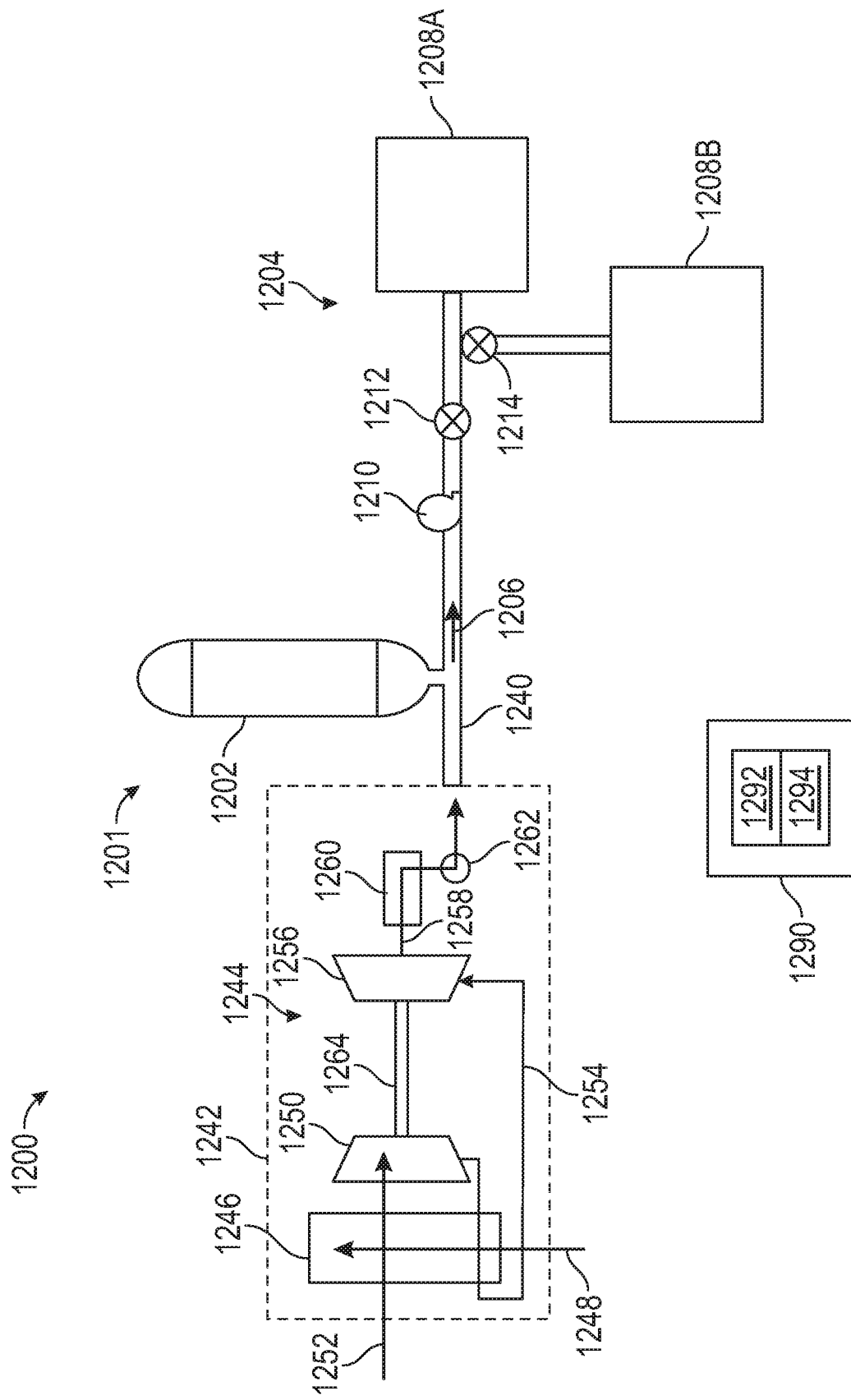
FIG. 12 is a schematic illustration of a cryogenic cooling system in accordance with an embodiment of the disclosure.

FIG. 12 depicts a cryogenic cooling system 1200 according to an embodiment. The cryogenic cooling system 1200 can include one or more liquid air storage vessel 1202 and/or a cryogenic cooler 1242. A means for selectively releasing a cooling fluid flow can include the liquid air storage vessel 1202 and cryogenic cooler 1242 as examples of a liquid air source 1201, where liquid air can be generated for immediate consumption by the cryogenic cooler 1242 and/or released from the liquid air storage vessel 1202. The liquid air storage vessel 1202 is configured to selectively release a cooling fluid flow 1206 produced at a cryogenic temperature. Cryogenic temperatures can refer to temperatures where air, nitrogen, and/or oxygen can exist in a liquid state with respect to pressure. In some embodiments, the liquid air storage vessel 1202 is absent and liquid air produced by the cryogenic cooler 1242 is allowed to flow as cooling fluid flow 1206 directly to a plumbing system 1204 in fluid communication with the liquid air source 1201 for cooling one or more components of the gas turbine engine 20. Although referred to as a liquid air storage vessel, the liquid air storage vessel 1202 can, in some embodiments, store liquid nitrogen, liquid oxygen, and/or a combination thereof, such as a mixture of liquid oxygen and gaseous nitrogen. In other embodiments, the cryogenic cooler 1242 is absent, and liquid air released by the liquid air storage vessel 1202 selectively flows as cooling fluid flow 1206 to the plumbing system 1204. In a further embodiment, the liquid air storage vessel 1202 is recharged by the cryogenic cooler 1242. The plumbing system 1204 can include tubing that is insulated and/or includes multiple walls to reduce heat transfer. Further, the plumbing system 1204 can be routed through one or more components of the gas turbine engine 20 and may be internal and/or external to portions of the gas turbine engine 20.

The cryogenic cooling system 1200 is operable to control a flow rate of the cooling fluid flow 1206 through the plumbing system 1204 to one or more components 1208A, 1208B of the gas turbine engine 20 of FIG. 1. In the example of FIG. 12, a pump 1210 is operable to urge the cooling fluid flow 1206 to the control a flow rate of the cooling fluid flow 1206 through the plumbing system 1204 to the one or more components 1208A, 1208B. The pump 1210 can be a liquid pump that efficiently pumps the cooling fluid flow 1206 in a liquid or mixed state. For instance, depending upon the cryogenic temperature and corresponding pressure, the cooling fluid flow 1206 may be any of a combination of liquid, gas, and supercritical fluid as the cooling fluid flow 1206 flows through the plumbing system 1204. The cooling fluid flow 1206 can absorb heat at as it passes through the plumbing system 1204, resulting in increased compression/pressure and possible state changes. As one example, the cooling fluid flow 1206 may reach a pressure of 60 atmospheres or higher due to heat absorption through a case and/or plumbing system 1204 of the gas turbine engine 20. The release of the cooling fluid flow 1206 can be modulated at a desired duty cycle to conserve liquid air produced and/or stored in the cryogenic cooling system 1200.

The cooling fluid flow 1206 can be liquid air released from the liquid air storage vessel 1202, cool gaseous air, and/or a mix of liquid and gaseous air. For example, the liquid air can be stored under pressure in the liquid air storage vessel 1202 and may change to a gaseous state upon entering a warmer environment of the plumbing system 1204. Further, the flow coursing through entire system to an exit point can experience a continuously lowering pressure causing liquid air to boil into gaseous air in the cooling fluid flow 1206.

A combination of valves can be used to control the flow rate of the cooling fluid flow 1206. For example, a control valve 1212 is operable to control the flow rate of the cooling fluid flow 1206 into the plumbing system 1204. One or more control valves, such as valve 1214, can be used to modify a flow rate between the one or more components 1208A, 1208B.

In embodiments, the liquid air storage vessel 1202 can include one or more removable/rechargeable containers or can be integrated within the cryogenic cooling system 1200. The liquid air storage vessel 1202 can have a 5000 pounds-per-square-inch (PSI) pressure rating. In the example of FIG. 12, the liquid air storage vessel 1202 is coupled in fluid communication with a feeder line 1240. In some embodiments, the feeder line 1240 enables an external source to recharge the liquid air storage vessel 1202 with liquid air. In some embodiments, the cryogenic cooling system 1200 includes at least one cryogenic cooler 1242 operable to generate and produce liquid air for immediate use and/or storage in the liquid air storage vessel 1202 during operation of the gas turbine engine 20 of FIG. 1. For example, the cryogenic cooler 1242 can include one or more air cycle machines 1244 operable to compress, chill, expand, pump, and condense an air flow to produce liquid air for storage in the liquid air storage vessel 1202 and/or immediate use.

As one example, the cryogenic cooler 1242 can include a heat exchanger system 1246 operable to receive a cooling air intake 1248. A compressor 1250 can receive bleed air 1252 from the gas turbine engine 20 of FIG. 1 as an air flow. Compressed air 1254 output by the compressor 1250 can pass through the heat exchanger system 1246 to at least one turbine 1256 as a cooled flow 1258 to a vacuum system 1260 and a liquid air condensate pump system 1262 that urges liquid air through the feeder line 1240 for storage in the liquid air storage vessel 1202. The compressor 1250 and the at least one turbine 1256 may be mechanically linked by a coupling 1264, such as a shaft. In some embodiments, the compressor 1250 and the at least one turbine 1256 are not physically coupled. The compressor 1250 can be driven mechanically by the gas turbine engine 20 of FIG. 1 and/or electrically using an electric motor (not depicted). Although one example of the cryogenic cooler 1242 is depicted in the example of FIG. 12, it will be understood that additional elements and modifications are contemplated, such as two or more turbine wheels, recirculation paths, water separation, one or more fan sections, intermediate taps, relief valves, and/or other such elements known in the art.

A controller 1290 can interface with and control multiple elements of the cryogenic cooling system 1200, such as valve states, flow rates, pressures, temperatures, rotational state of one or more air cycle machines 1244, and the like.

In an embodiment, the controller 1290 includes a memory system 1292 to store instructions that are executed by a processing system 1294 of the controller 1290. The executable instructions may be stored or organized in any manner and at any level of abstraction, such as in connection with a controlling and/or monitoring operation of the cryogenic cooling system 1200. The processing system 1294 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 1292 may include random access memory (RAM), read only memory (ROM), or other electronic, optical, magnetic, or any other computer readable medium onto which is stored data and control algorithms in a non-transitory form.

Figure 13:
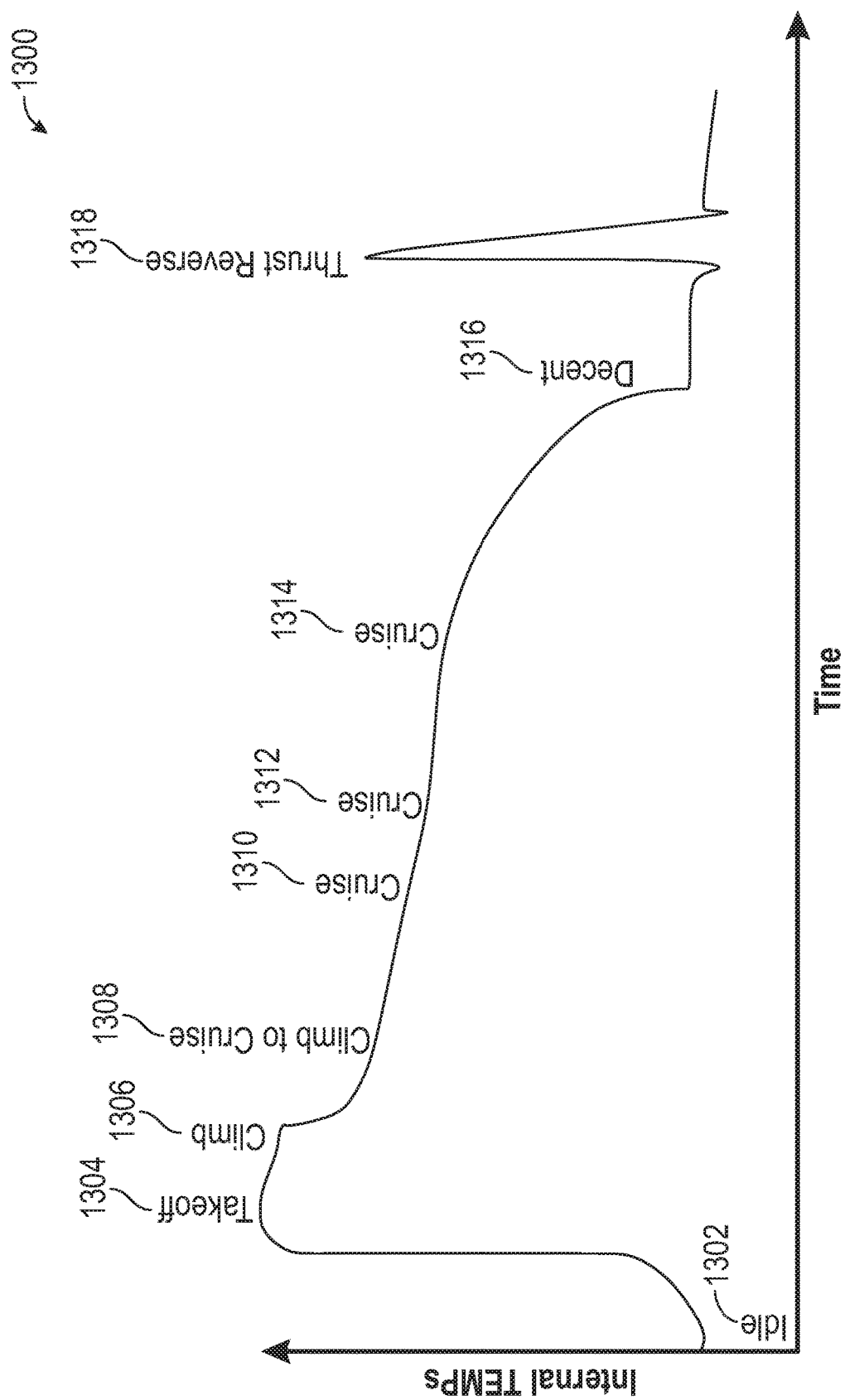
FIG. 13 is a plot of relative internal temperature changes vs. time for a various flight phases in accordance with an embodiment of the disclosure.

FIG. 13 depicts a plot 1300 of relative internal temperature changes vs. time for a various flight phases in accordance with an embodiment. The plot 1300 can be established for nominal conditions of the gas turbine engine 20 of FIG. 1 and further augmented based on one or more operating parameters of the gas turbine engine 20. For example, by monitoring pressures and temperatures of the gas turbine engine 20, it can be determined how closely a particular instance of the gas turbine engine 20 follows the plot 1300, and the use of plot 1300 for control actions can be augmented based on variations observed in one or more operating parameters of the gas turbine engine 20.

In the example of FIG. 13, an internal temperature of the gas turbine engine 20 is relatively low at idle 1302 and climbs rapidly at takeoff power 1304. At climb 1306, climb to cruise 1308, and subsequent cruise states 1310, 1312, 1314, the internal temperature of the gas turbine engine 20 may gradually reduce as the power demand is reduced and the gas turbine engine 20 is surrounded by cooler ambient air at altitude. The internal temperature of the gas turbine engine 20 can be further reduced at decent 1316. A temporary spike in the internal temperature of the gas turbine engine 20 may be experienced during a thrust reverse 1318 operation prior to shut down.

Figure 14:
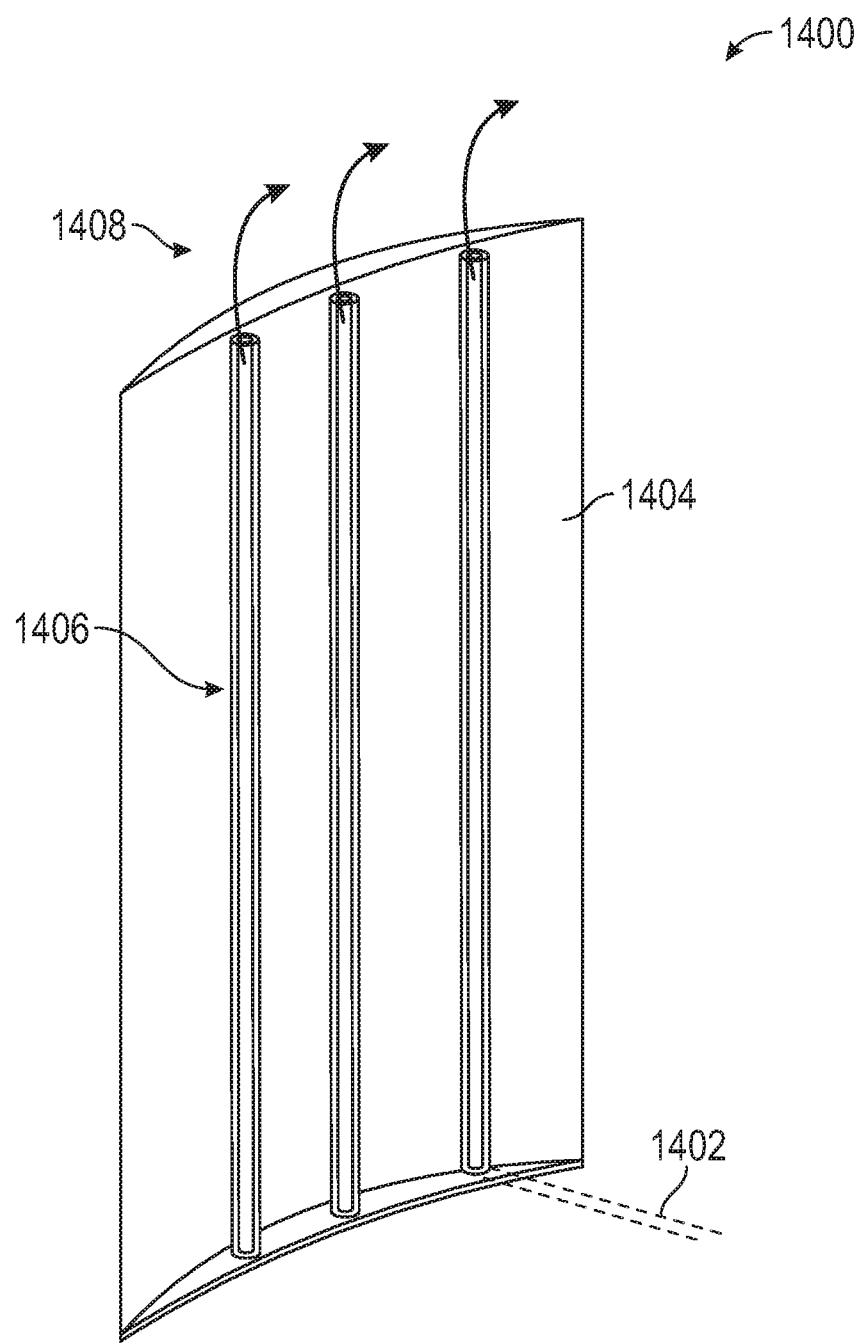
FIG. 14 is a schematic illustration of a gas turbine engine component in accordance with an embodiment of the disclosure.

FIG. 14 is a schematic illustration of a gas turbine engine component 1400 in accordance with an embodiment. The gas turbine engine component 1400 is an example of a component within the gas turbine engine 20 of FIG. 1, such as a vane, where a feeder tube 1402 is operable to receive the cooling fluid flow 1206 of FIG. 12. For example, the gas turbine engine component 1400 can be one of the components 1208A, 1208B of FIG. 12 in the compressor section 24 or the turbine section 28 of the gas turbine engine 20. A body 1404 of the gas turbine engine component 1400 can include a plurality of lines 1406 to transfer a portion 1408 of the cooling fluid flow 1206 to a desired location within the gas turbine engine 20. The lines 1406 can be hollow and ceramic lined to insulate the cooling fluid flow 1206.

Figure 15:
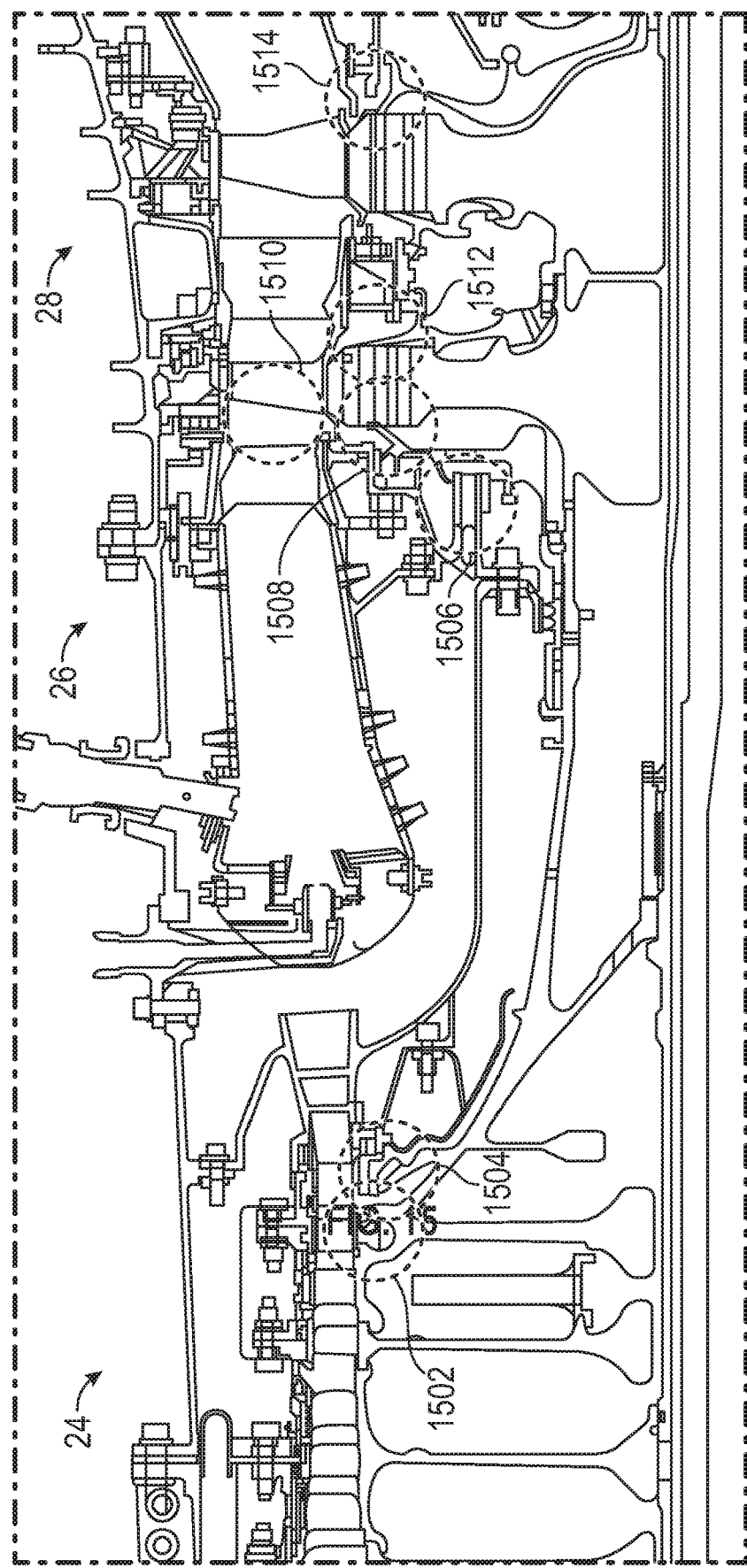
FIG. 15 is a schematic illustration of portions of a gas turbine engine configured to receive a cooling fluid flow in accordance with an embodiment of the disclosure.

FIG. 15 is a schematic illustration of portions of the gas turbine engine 20 configured to receive the cooling fluid flow 1206 of FIG. 12 in accordance with an embodiment. The cooling fluid flow 1206 can be sent to one or more locations of the gas turbine engine 20 to enhance cooling effects and increase engine efficiency. Example locations as depicted in FIG. 15 can include a rear compressor rim cavity 1502, a rear high pressure compressor flow from the front 1504 of a diffuser case, a location at or in proximity to a tangential on-board injector (TOBI) flow such as a TOBI flow proximate to a first disk rim cavity 1506 routed from the diffuser case, a front side plate and/or outer cavity area 1508 cooling flow to mitigate recirculation of gas path air, a first blade cooling flow 1510 from the TOBI flow, a front cavity 1512 of the turbine section 28, a front low pressure turbine transition duct cooling location 1514, and other such locations.

Figure 16:
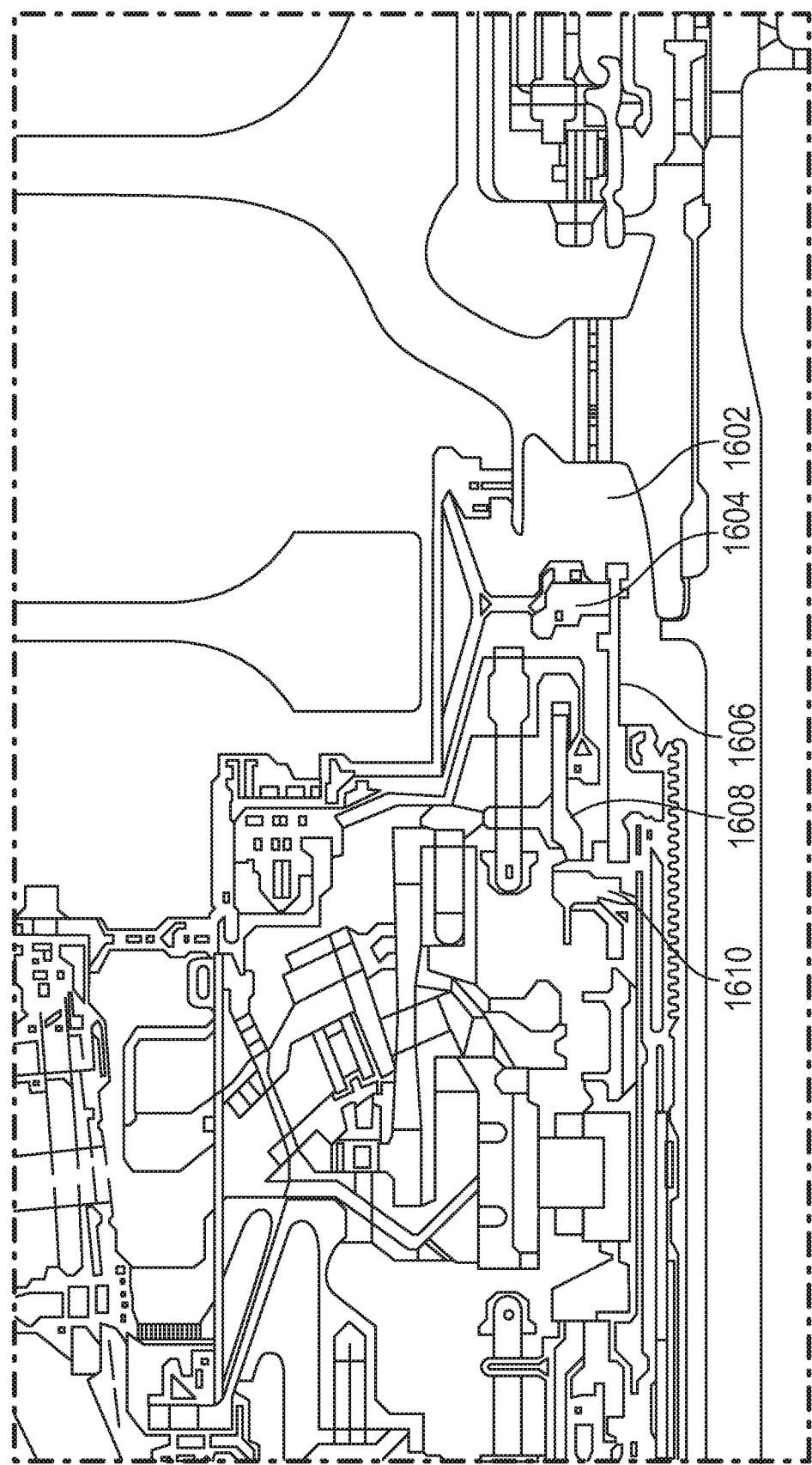
FIG. 16 is a schematic illustration of portions of a gas turbine engine configured to receive a cooling fluid flow in accordance with an embodiment of the disclosure.

FIG. 16 is a schematic illustration of portions of the gas turbine engine 20 configured to receive the cooling fluid flow 1206 of FIG. 12. One or more buffer cooling locations 1602 are configured to receive chilled air delivered from the cooling fluid flow 1206 of FIG. 12. The buffer cooling locations 1602 can be plenums established relative to a stationary outer seal 1604, a rotating outer seal land 1606, a stationary inner seal 1608, and a rotating inner seal 1610.

Figure 17:
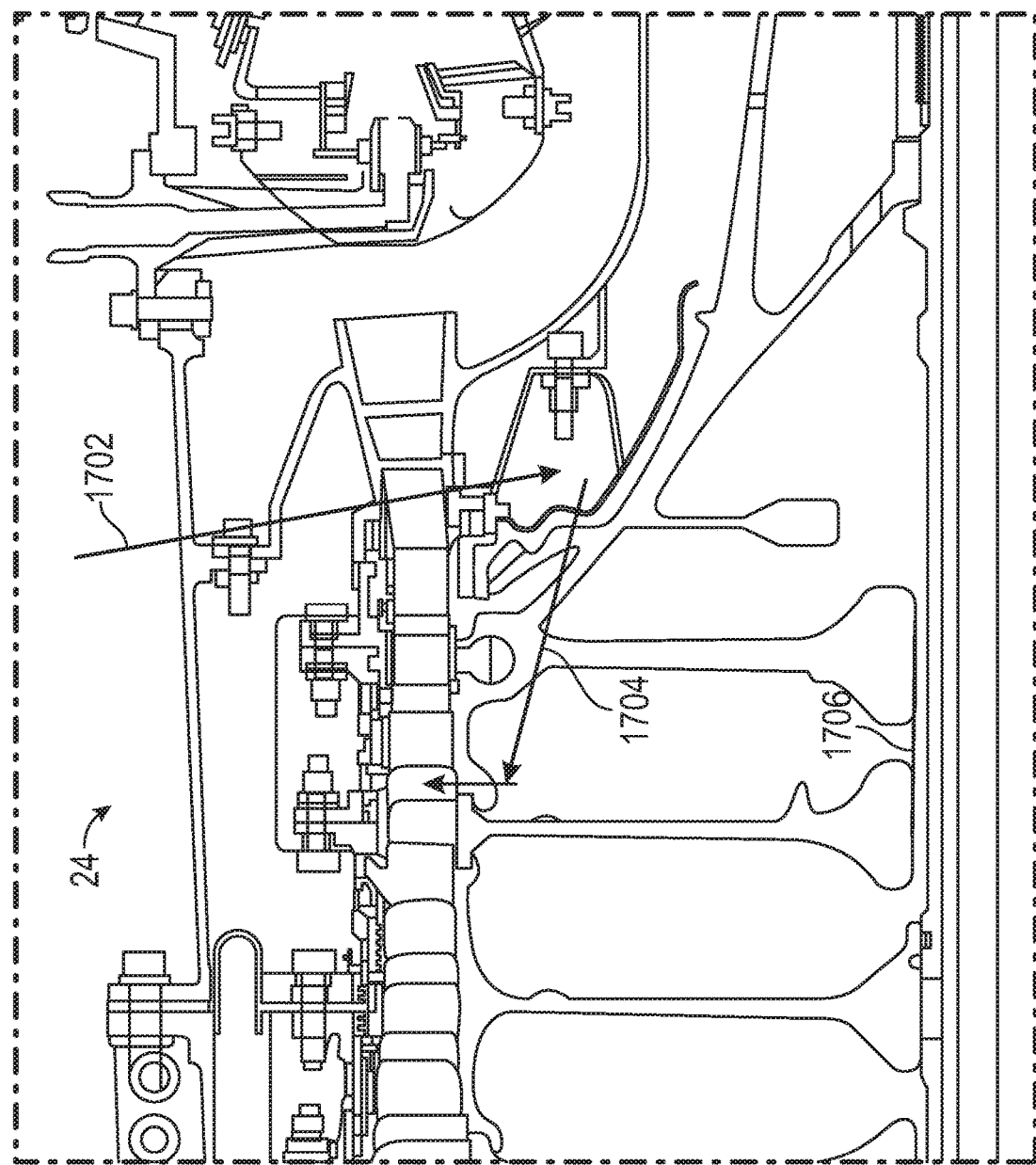
FIG. 17 is a schematic illustration of portions of a gas turbine engine configured to receive a cooling fluid flow in accordance with an embodiment of the disclosure.

FIG. 17 is a schematic illustration of portions of gas turbine engine 20 configured to receive the cooling fluid flow 1206 of FIG. 12 in accordance with an embodiment. In the example of FIG. 17, a rear high pressure compressor flow at the compressor section 24 can be delivered from tubes 1702 in front of a diffuser case. The rear high pressure compressor flow can pass through holes and/or slots 1704 toward a drum. One or more covers 1706 can be incorporated to prevent the cooling fluid flow 1206 from escaping. Other flow control options are contemplated.

Figure 18:
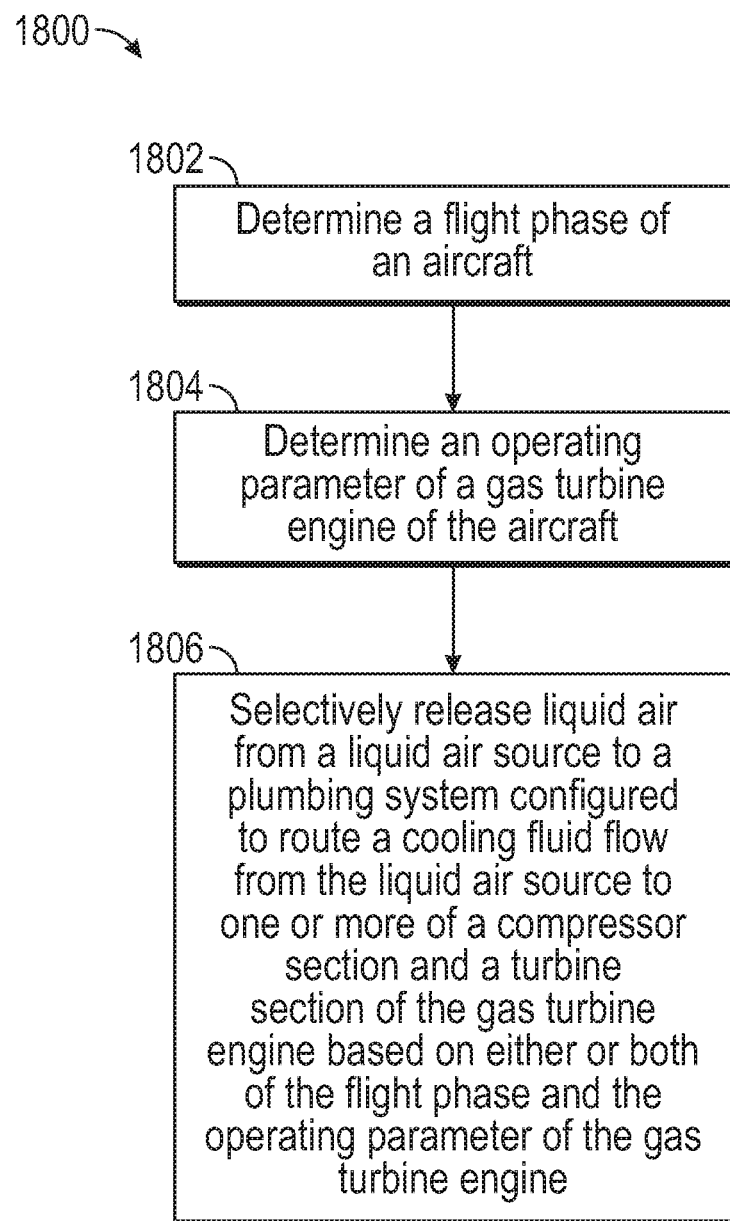
FIG. 18 is a flow chart illustrating a method in accordance with an embodiment of the disclosure.

FIG. 18 is a flow chart illustrating a method 1800 of cooling components of a gas turbine engine in accordance with an embodiment. The method 1800 of FIG. 18 is described in reference to FIGS. 1-18 and may be performed with an alternate order and include additional steps. The method 1800 can be performed, for example, by the cryogenic cooling system 1200 of FIG. 12.

At block 1802, controller 1290 determines a flight phase of an aircraft. For example, the flight phase can be determined in reference to the plot 1300. At block 1804, controller 1290 determines an operating parameter of a gas turbine engine 20 of the aircraft. The operating parameter can be one or more of a pressure and/or temperature within the gas turbine engine 20. At block 1806, liquid air is selectively released from a liquid air source 1201 to a plumbing system 1204 configured to route a cooling fluid flow 1206 from the liquid air source 1201 to one or more of a compressor section 24 and a turbine section 28 of the gas turbine engine 20 based on either or both of the flight phase and the operating parameter of the gas turbine engine 20. The plumbing system 1204 can be routed to deliver the cooling fluid flow 1206 to one or more of: a high compressor flow, a turbine blade, and a turbine transition duct.

Figure 19:
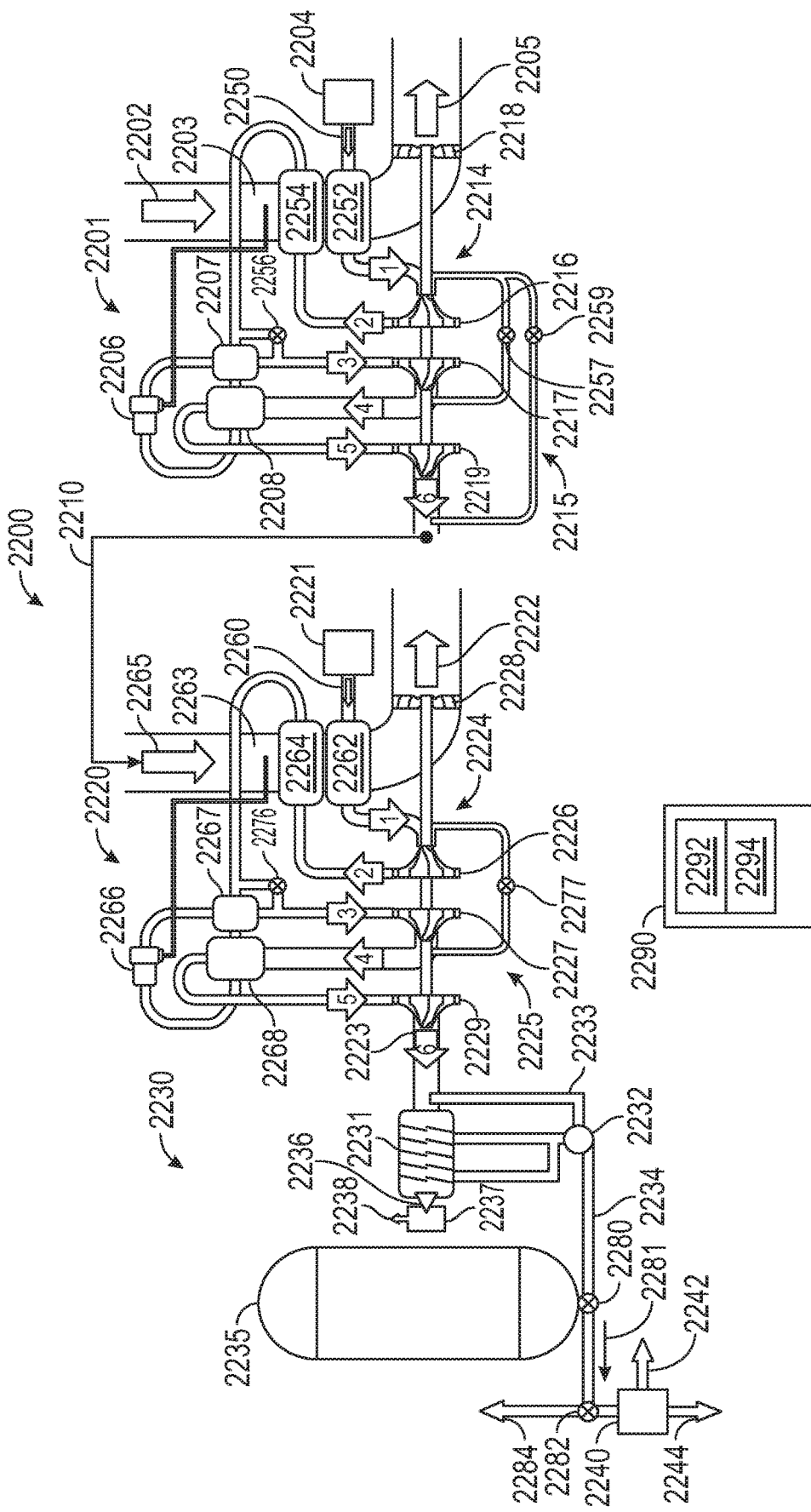
FIG. 19 is a schematic illustration of a cryogenic cooling system in accordance with an embodiment of the disclosure.

FIG. 19 depicts a cryogenic cooling system 2200 according to an embodiment. The cryogenic cooling system 2200 includes a first air cycle machine 2201 operable to output a cooling air stream 2210 based on a first air source 2204, a second air cycle machine 2220 operable to output a chilled air stream 2223 at a cryogenic temperature based on a second air source 2221 cooled by the cooling air stream 2210 of the first air cycle machine 2201, a liquid air collection system 2230 in fluid communication with an output of the second air cycle machine 2220, and a cryogenic air separator 2240 in fluid communication with the liquid air collection system 2230. The cryogenic air separator 2240 is operable to separate gaseous nitrogen 2242 and liquid oxygen 2244 from liquid air collected by the liquid air collection system 2230. The gaseous nitrogen 2242 can be used for various systems of the aircraft 800, such as inerting of the fuel system 805 of FIG. 9. The liquid oxygen 2244 can also be used for various systems of the aircraft 800, such as supplying liquid oxygen 2244 to the cabin 812 of the aircraft 800 and/or in a compressor stream 807 of a gas turbine engine 20 to enhance combustion efficiency.

In the example of FIG. 19, the first air cycle machine 2201 includes a compressor section 2214 and a turbine section 2215 (referred to as first sections), and the second air cycle machine 2220 includes a compressor section 2224 and a turbine section 2225 (referred to as second sections). The compressor section 2214 can include a compressor wheel 2216 operably coupled to a turbine wheel 2217 of the turbine section 2215 and a fan 2218. The turbine section 2215 can also include another turbine wheel 2219 operatively coupled to the turbine wheel 2217. Similarly, the compressor section 2224 can include a compressor wheel 2226 operably coupled to a turbine wheel 2217 of the turbine section 2225 and a fan 2228. The turbine section 2225 can also include another turbine wheel 2229 operatively coupled to the turbine wheel 2227.

A first air flow 2250 from the first air source 2204 can be urged through a heat exchanger system 2203 prior to entry into the compressor wheel 2216 to pre-cool the first air flow 2250. The first air source 2204 can be an engine bleed source from the gas turbine engines 20 of FIG. 1, such as a high stage bleed. The heat exchanger system 2203 can include multiple stages, such as a primary heat exchanger 2252 and a secondary heat exchanger 2254. The first air flow 2250 can be cooled through the heat exchanger system 2203 after exiting the compressor wheel 2216. The fan 2218 can urge a heat exchanger cooling flow 2202 across the heat exchanger system 2203, with heated air 2205 dumped overboard. The first air flow 2250 can pass through additional heat exchangers 2207, 2208 to a water separator 2206 in fluid communication with an output of the first compressor wheel 2216 and an input of the first turbine wheel 2217. The water separator 2206 is operable to spray extracted water from the first air flow 2250 into the first heat exchanger cooling flow 2202 upstream from the heat exchanger system 2203. A bypass valve 2256 may be included to bypass the heat exchangers 2207, 2208 and water separator 2206. An output of the turbine wheel 2217 can be in fluid communication with the heat exchanger 2208 which is further coupled to an input of the turbine wheel 2219. Valves 2257, 2259 can be included to provide temperature control/anti-icing at outputs of the turbine wheels 2217, 2219 respectively, for example, by selectively allowing a portion of the first air flow 2250 to be bypassed from an input of the compressor wheel 2216.

Similarly, a second air flow 2260 from the second air source 2221 can be pre-cooled through a heat exchanger system 2263 prior to entry into the compressor wheel 2226 and cool the second air flow 2260 after exiting the second compressor wheel 2226. The second air source 2221 can be an engine source from the gas turbine engines 20 of FIG. 1, such as a mid-compressor bleed, fan air, inlet air, or ambient air. The heat exchanger system 2263 can include multiple stages, such as a primary heat exchanger 2262 and a secondary heat exchanger 2264. The second air flow 2260 can be cooled through the heat exchanger system 2263 after exiting the compressor wheel 2226. The fan 2228 can urge a heat exchanger cooling flow 2265 across the heat exchanger system 2263, with cool air 2222 used onboard the aircraft 800 of FIG. 9 (e.g., by environmental control system 809 of FIG. 9) or dumped overboard. The second heat exchanger cooling flow 2265 can be or include the cooling air stream 2210 of the first air cycle machine 2201. The second air flow 2260 can pass through additional heat exchangers 2267, 2268 to a water separator 2266 in fluid communication with an output of the compressor wheel 2226 and an input of the turbine wheel 2227. The water separator 2266 is operable to spray extracted water from the second air flow 2260 into the heat exchanger cooling flow 2265 upstream from the heat exchanger system 2263. A bypass valve 2276 may be included to bypass the heat exchangers 2267, 2268 and water separator 2266. An output of the turbine wheel 2227 can be in fluid communication with the heat exchanger 2268 which is further coupled to an input of the turbine wheel 2229. Valve 2277 can be included to provide temperature control/anti-icing at an output of the turbine wheel 2227, for example, by selectively allowing a portion of the second air flow 2260 to be bypassed from an input of the compressor wheel 2226.

The liquid air collection system 2230 can include a vacuum system 2231, a liquid air condensate collection header 2233, and a liquid air condensate pump system 2232 that urges liquid air through a feeder line 2234 for storage in the cryogenic liquid reservoir 2235 operably coupled to the feeder line 2234. In embodiments, liquid air can be stored under pressure in the cryogenic liquid reservoir 2235. In some embodiments, the cryogenic liquid reservoir 2235 is a cartridge that can be installed with an initial supply of liquid air and be refilled or supplemented with liquid air produced by the cryogenic cooling system 2200. Further, the cryogenic liquid reservoir 2235 can be configured to accept a refill of liquid air from an alternate source, such as a ground-based recharge of the cryogenic liquid reservoir 2235.

In embodiments, a valve 2236 can be selectively controlled to pass the chilled air stream 2223 after pressurization (which may include liquid air) through a vacuum pump vent 2237 for an aircraft cooling use 2238 as a cooling fluid. The aircraft cooling use 2238 can be, for example, the environmental control system 809 of the aircraft 800 of FIG. 9, cooling selected components of the gas turbine engines 20 of FIG. 1, cooling a power system of the aircraft 800 such as the electric generators 806 and/or battery system 815, and/or other uses. A liquid air flow 2281 provided from the cryogenic liquid reservoir 2235 through valve 2280 or as produced by the cryogenic cooling system 2200 can be routed to one or more cryogenic uses. For example, a valve 2282 may control the liquid air flow 2281 to a cryogenic working fluid flow control assembly 2284 in fluid communication with the propulsion motor windings 820 of the electric fan propulsion motor 818 of FIG. 9. The liquid air flow 2281 can also or alternatively be routed to other electronic loads. Further, the valve 2282 may also control the liquid air flow 2281 to the cryogenic air separator 2240. Other valve and plumbing arrangements are contemplated.

A controller 2290 can interface with and control multiple elements of the cryogenic cooling system 2200, such as valve states, flow rates, pressures, temperatures, rotational state of air cycle machines 2201, 2220, and the like. In an embodiment, the controller 2290 includes a memory system 2292 to store instructions that are executed by a processing system 2294 of the controller 2290. The executable instructions may be stored or organized in any manner and at any level of abstraction, such as in connection with a controlling and/or monitoring operation of the cryogenic cooling system 2200. The processing system 2294 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 2292 may include random access memory (RAM), read only memory (ROM), or other electronic, optical, magnetic, or any other computer readable medium onto which is stored data and control algorithms in a non-transitory form.

Although one example of the cryogenic cooler system 2200 is depicted in the examples of FIG. 19, it will be understood that additional elements and modifications are contemplated, such as only one turbine wheel in either or both of the air cycle machines 2201, 2220, recirculation paths, pumps, intermediate taps, relief valves, and/or other such elements known in the art.

Figure 20:
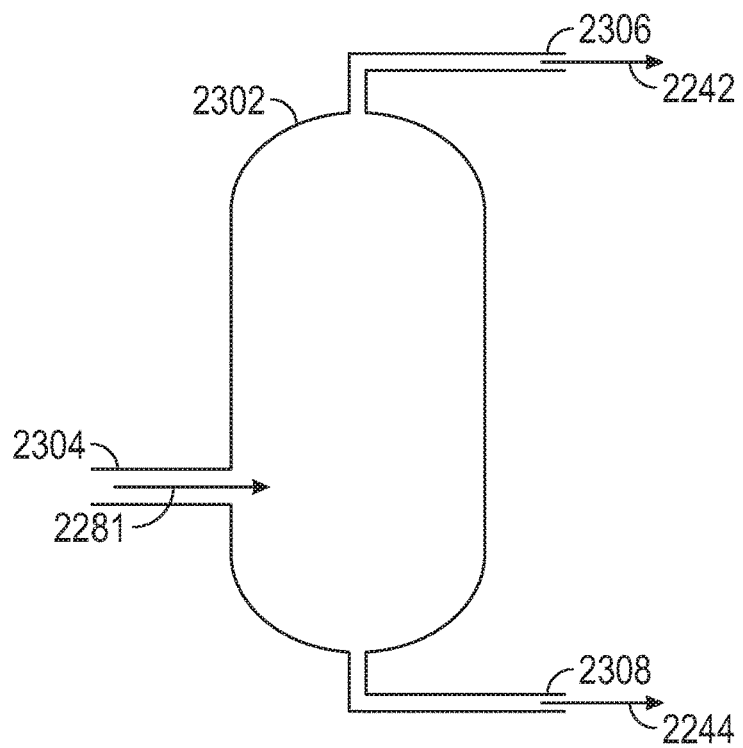
FIG. 20 is a schematic illustration of a cryogenic air separator in accordance with an embodiment of the disclosure.

FIG. 20 depicts a cryogenic air separator 2300 as one example of the cryogenic air separator 2240 of FIG. 19 in accordance with an embodiment. The cryogenic air separator 2300 includes a separation vessel 2302 with at least one liquid air input port 2304, at least one gaseous nitrogen output port 2306, and at least one liquid oxygen output port 2308. The liquid air input port 2304 is operable to receive the liquid air flow 2281 from the liquid air collection system 2230 of FIG. 19. The temperature of the liquid air flow 2281 can be below the boiling points of nitrogen, oxygen, and other constituents of air upon reaching liquid air input port 2304. The separation vessel 2302 can be sized, located, and otherwise temperature controlled to allow nitrogen to boil off from the liquid air flow 2281 through the gaseous nitrogen output port 2306 as gaseous nitrogen 2242 while liquid oxygen 2244 remains and flows out of the liquid oxygen output port 2308. For instance, in reference to an example at ambient atmospheric pressure, as the liquid air flow 2281 is warmed from about −200 degrees C., nitrogen would boil off at temperatures at or above −195.8 degrees C., leaving liquid oxygen or an oxygen-rich liquid if the temperature remains below −183 degrees C., for example. The separation in the cryogenic air separator 2300 is temperature-based in that differences in boiling points of nitrogen and oxygen allow for nitrogen to transition into a gaseous state while oxygen (and potentially argon) remains liquefied while the temperature of the liquid air flow 2281 rises upon entry into the separation vessel 2302. The pressure of the liquid air flow 2281 can be set/adjusted (e.g., by controller 2290 of FIG. 19) to match the separation performance properties of the cryogenic air separator 2300, as liquid/gas state is a function of pressure and temperature. Although the example of FIG. 20 includes a single separation vessel 2302, it will be understood that other configurations can be implemented, such as a series of separation vessels 2302.

Figure 21:
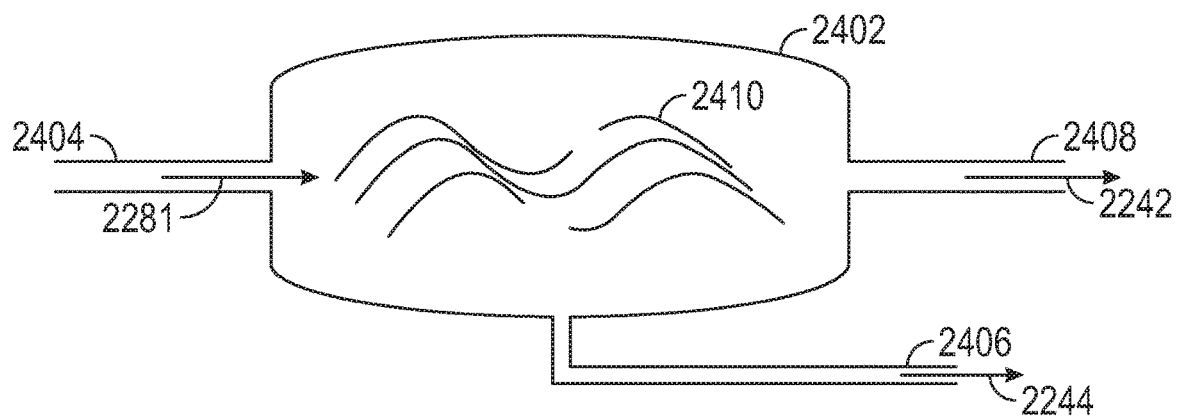
FIG. 21 is a schematic illustration of a cryogenic air separator in accordance with an embodiment of the disclosure.

FIG. 21 depicts a cryogenic air separator 2400 as another example of the cryogenic air separator 2240 of FIG. 19 in accordance with an embodiment. The cryogenic air separator 2400 includes a separation vessel 2402 with at least one liquid air input port 2404, at least one gaseous nitrogen output port 2406, at least one liquid oxygen output port 2408, and a stagnation plate 2410. The cryogenic air separator 2400 is referred to as a stagnation plate-based separator, in that the liquid air flow 2281 received at the liquid air input port 2404 from the liquid air collection system 2230 of FIG. 19 strikes the stagnation plate 2410 to enhance separation of the gaseous nitrogen 2242 and the liquid oxygen 2244. The stagnation plate 2410 can include variations in curvature and flow paths, resulting in trapping regions that alter the flow velocity and pressure of the liquid air flow 2281. In regions where the flow velocity and pressure change, a partial state change can occur where the gaseous nitrogen 2242 is released (boiled) from the liquid air flow 2281 and output from the gaseous nitrogen output port 2406, while the remaining liquid retains oxygen (and potentially argon) in the liquid oxygen 2244 is output from the liquid oxygen output port 2408. Although one example configuration is depicted in FIG. 21, it will be understood that various configurations of the stagnation plate 2410 can be implemented in embodiments.

Figure 22:
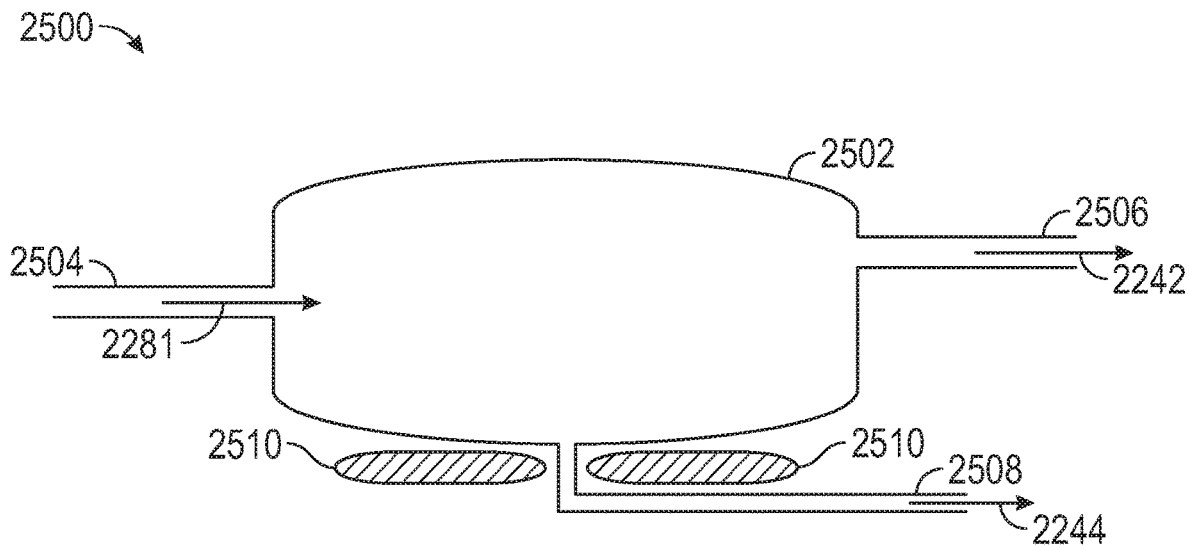
FIG. 22 is a schematic illustration of a cryogenic air separator in accordance with an embodiment of the disclosure.

FIG. 22 depicts a cryogenic air separator 2500 as another example of the cryogenic air separator 2240 of FIG. 19 in accordance with an embodiment. The cryogenic air separator 2500 includes a separation vessel 2502 with at least one liquid air input port 2504, at least one gaseous nitrogen output port 2506, at least one liquid oxygen output port 2508, and a magnetic field generator 2510. The cryogenic air separator 2500 is referred to as a magnetic-based separator. The liquid air flow 2281 received at the liquid air input port 2504 from the liquid air collection system 2230 of FIG. 19 may initially separate due to the pressure/temperature change within the separation vessel 2502 and differences in the boiling points of nitrogen and oxygen. The controller 2290 of FIG. 19 may apply a magnetic field by controlling a flow of electric current through the magnetic field generator 2510 (e.g., coils of wires). The magnetic field generator 2510 can be located proximate to the oxygen output port 2508 to take advantage of the paramagnetism of the liquid oxygen 2244 to attract/urge the liquid oxygen 2244 toward the liquid oxygen output port 2508 while the gaseous nitrogen 2242 rises to the gaseous nitrogen output port 2506. Although one example configuration is depicted in FIG. 22, it will be understood that various configurations of the magnetic field generator 2510 are contemplated. Further embodiments can combine elements of the cryogenic air separators 2300-2500 of FIGS. 20-22.

Figure 23:
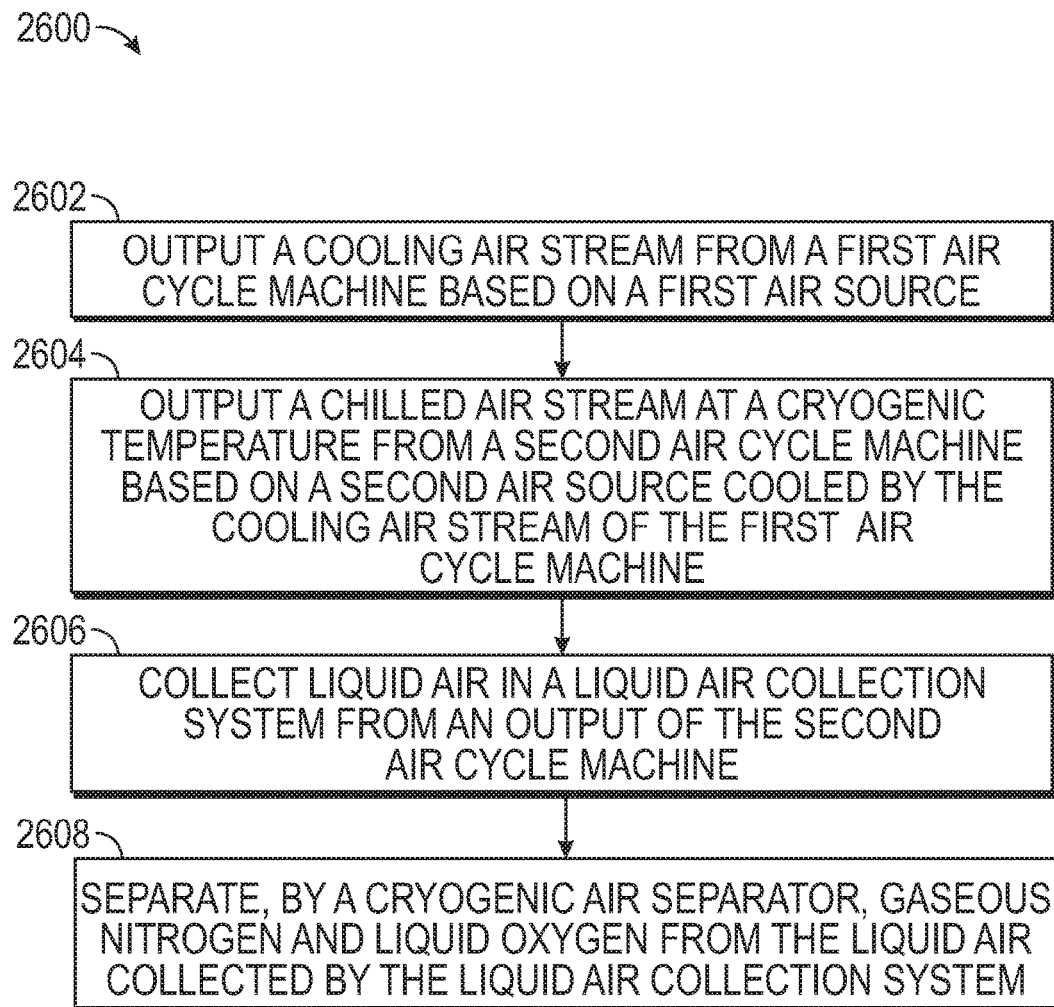
FIG. 23 is a flow chart illustrating a method in accordance with an embodiment of the disclosure.

FIG. 23 is a flow chart illustrating a method 2600 of propulsion system cooling control in accordance with an embodiment. The method 2600 of FIG. 23 is described in reference to FIGS. 1-23 and may be performed with an alternate order and include additional steps. The method 2600 can be performed, for example, by the cryogenic cooling system 2200 of FIG. 19.

At block 2602, a cooling air stream 2210 is output from a first air cycle machine 2201 based on a first air source 2204. At block 2604, a chilled air stream 2223 is output at a cryogenic temperature from a second air cycle machine 2220 based on a second air source 2221 cooled by the cooling air stream 2210 of the first air cycle machine 2201. At block 2606, liquid air is collected in a liquid air collection system 2230 from an output of the second air cycle machine 2220. At block 2608, the cryogenic air separator 2240 can be used to separate gaseous nitrogen 2242 and liquid oxygen 2244 from the liquid air collected by the liquid air collection system 2230. The cryogenic air separator 2240 can separate the gaseous nitrogen 2242 and liquid oxygen 2244 based on one or more of: a temperature-based separator 2300, a stagnation plate-based separator 2400, and a magnetic-based separator 2500.

In embodiments, the gaseous nitrogen 2242 can be supplied to a fuel system 805 of an aircraft 800. The gaseous nitrogen 2242 can be used to be used to sparge the fuel and remove oxygen, which may eliminate the need for a fuel deoxygenation system based on membranes. The liquid oxygen 2244 can be supplied to one or more of: a cabin 812 of the aircraft 800 and a compressor stream 807 of a gas turbine engine 20 of the aircraft 800. The liquid air can be supplied as a cooling fluid to one or more of: an electric fan propulsion motor 818 of the aircraft 800, an environmental control system 809 of the aircraft 800, a power system (e.g., electric generators 806, power distribution system 810, and/or battery system 815) of the aircraft 800, and a gas turbine engine 804 of the aircraft 800. Using the gaseous nitrogen 2242 and liquid oxygen 2244 produced by the cryogenic cooling system 2200 can reduce the storage and/or alternate generation needs of nitrogen and oxygen on the aircraft 800. Further, injection of liquid or cooled oxygen into the compressor stream 807 can provide intercooling with enhanced oxygen concentration for higher combustion temperatures without requiring additional compression and the associated parasitic losses of additional gas volume. This may further enhance thermodynamic efficiency in a Brayton cycle machine. For example, given that oxygen is a minority constituent in air by ⅕, just 10% cooled cooling air can result in up to a 50% increase in oxygen available for combustion. Further, oxygen injection into the compressor stream 807 can result in acceleration time reductions by providing an additional oxidizer independent of the angular moment of inertia associated with spooling up the rotating compression machinery of the gas turbine engines 20.

A propulsion system that includes at least one electric fan propulsion motor can increase power density, e.g., thrust divided by electric power system weight, at cryogenic temperatures where air liquefies. Embodiments control a working fluid flow of liquid air from a cryogenic liquid reservoir through a cryogenic working fluid flow control assembly in fluid communication with propulsion motor windings of an electric fan propulsion motor. The working fluid flow can be controlled to pre-cool the cryogenic working fluid flow control assembly and the propulsion motor windings with cooled gaseous air, while liquid air can be used to provide cryogenic cooling of the propulsion motor windings for higher power demand conditions. Further the embodiments of the disclosed system facilitate the rapid transition of the electric fan propulsion motor from low power to maximum power which assists an aircraft in circumstances including the transition from idle to takeoff without damaging the propulsion motor. The working fluid flow and/or generation may be disabled when operation of the electric fan propulsion motor is not needed, such as when the aircraft needs less than maximum thrust.

Figure 24:
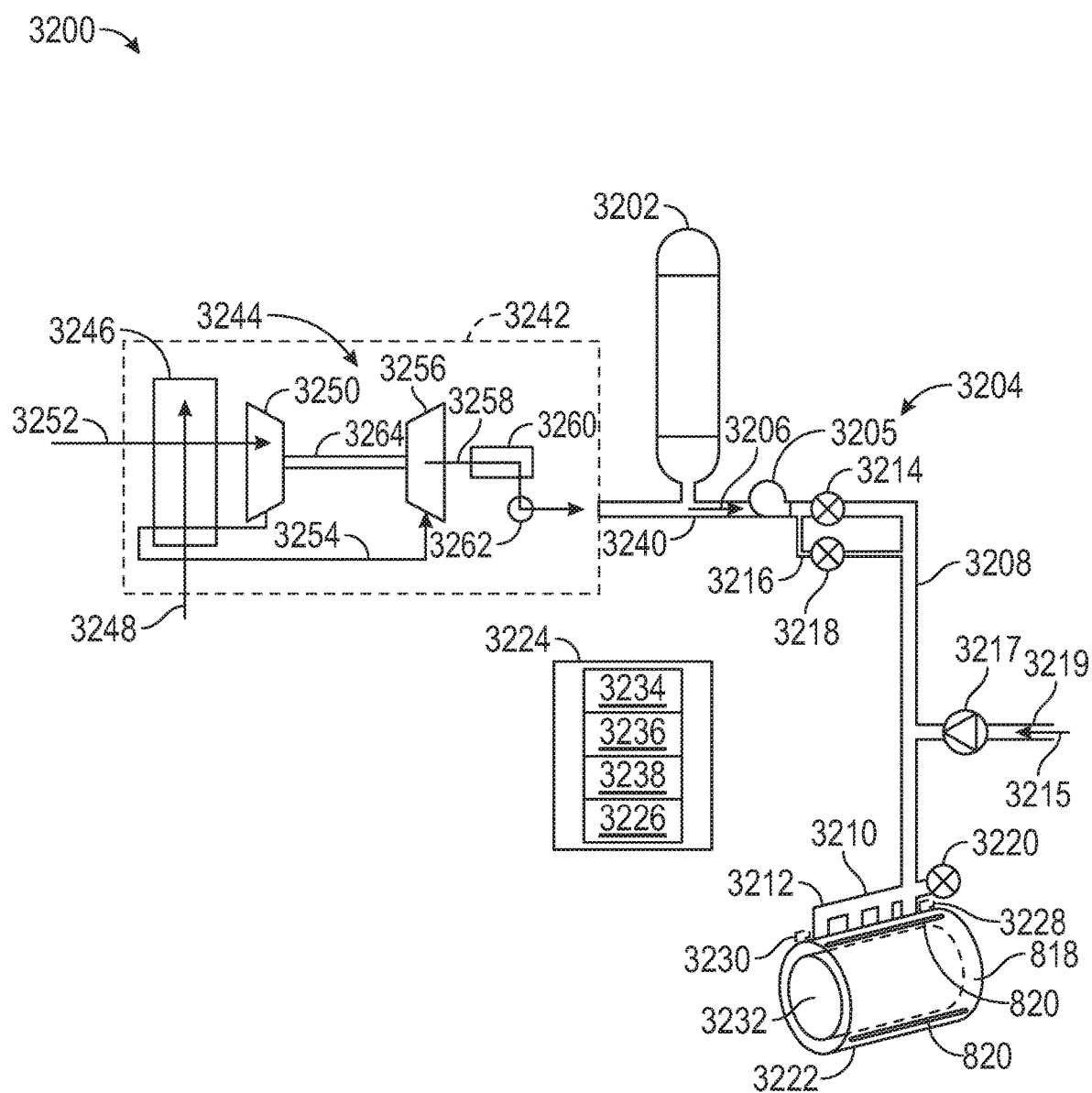
FIG. 24 is a schematic illustration of a cryogenic cooling system in accordance with an embodiment of the disclosure.

FIG. 24 depicts a cryogenic cooling system 3200 according to an embodiment. The cryogenic cooling system 3200 can include one or more cryogenic liquid reservoir 3202 and a cryogenic working fluid flow control assembly 3204 in fluid communication with the propulsion motor windings 820 of the electric fan propulsion motor 818. The cryogenic cooling system 3200 is a means for controlling a flow rate of a working fluid 3206 through the cryogenic working fluid flow control assembly 3204 to the propulsion motor winding 820. The cryogenic cooling system 3200 is operable to control a flow rate of a working fluid 3206 through the cryogenic working fluid flow control assembly 3204 to the propulsion motor windings 820. The cryogenic cooling system 3200 can include a pump 3205 operable to urge the working fluid 3206 into the cryogenic working fluid flow control assembly 3204 and maintain a desired pressure. The working fluid 3206 can be liquid air released from the cryogenic liquid reservoir 3202, cool gaseous air, and/or a mix of liquid and gaseous air. For example, the liquid air can be stored under pressure in the cryogenic liquid reservoir 3202 and may change to a gaseous state upon entering a warmer environment of the cryogenic working fluid flow control assembly 3204. Further the flow coursing through entire system from the cryogenic liquid reservoir 3202 to an exit will see a continuously lowering pressure causing the liquid air to boil into gaseous air, and this change of state largely occurring in certain passages in the electric fan propulsion motor 818 can be advantageous. As the cryogenic working fluid flow control assembly 3204 is cooled, the working fluid 3206 may pass through a primary cooling line 3208 and reach a manifold 3210 of the cryogenic working fluid flow control assembly 3204 as liquid air to cryogenically chill the propulsion motor windings 820. The manifold 3210 can include multiple taps 3212 to flow the working fluid 3206 into close proximity with the propulsion motor windings 820.

In a transient situation of an aircraft at the beginning of the runway, it is desirable to have all engines at takeoff power within about six seconds. In that circumstance the electric propulsion motor controller 816 may regulate the rate of change of electricity flow to the electric fan propulsion motor 818, but this rate of change to achieve full takeoff power is by definition very rapid. Cooling system mass flow rate and temperatures presented to the electric fan propulsion motor 818 can also be about as rapid to protect the electric fan propulsion motor 818 from damage or deterioration over time.

A combination of valves can be used to control the flow rate of the working fluid 3206. For example, a main flow control valve 3214 is operable to control the flow rate of the working fluid 3206 through a primary cooling line 3208 of the cryogenic working fluid flow control assembly 3204 to the propulsion motor windings 820. In some embodiments, the main flow control valve 3214 is a variable position valve operable to transition between a closed position, a partially opened position to supply a pre-cooling flow, and a fully opened position to supply a full cooling flow. The terms "full" and "fully" refer to a sufficient level to meet a demand and need not be the maximum level attainable. In other embodiments, the main flow control valve 3214 is a discrete on/off valve that can be commanded to either a fully opened or a fully closed position. The cryogenic working fluid flow control assembly 3204 can also include a bypass cooling line 3216 and a bypass flow control valve 3218 configured to selectively provide a pre-cooling flow as a bypass cooling flow around the main flow control valve 3214. The cryogenic cooling system 3200 of FIG. 24 is an example of a system that includes the bypass cooling line 3216 and bypass flow control valve 3218, while a cryogenic cooling system 3300 of FIG. 25 includes the same elements as the cryogenic cooling system 3200 of FIG. 24 but excludes the bypass cooling line 3216 and bypass flow control valve 3218. Thus, the main flow control valve 3214 of the cryogenic cooling system 3300 of FIG. 25 can be implemented as a variable position valve. In some embodiments, a non-cryogenic cooling flow 3215 can be supplied to the propulsion motor windings 820 of the electric fan propulsion motor 818 through a check valve 3217 in fluid communication with the manifold 3210. The non-cryogenic cooling flow 3215 can be provided by a cooling source 3219, such as ambient air 817, air from the environmental control system 809 of FIG. 9, or another source (not depicted).

Figure 25:
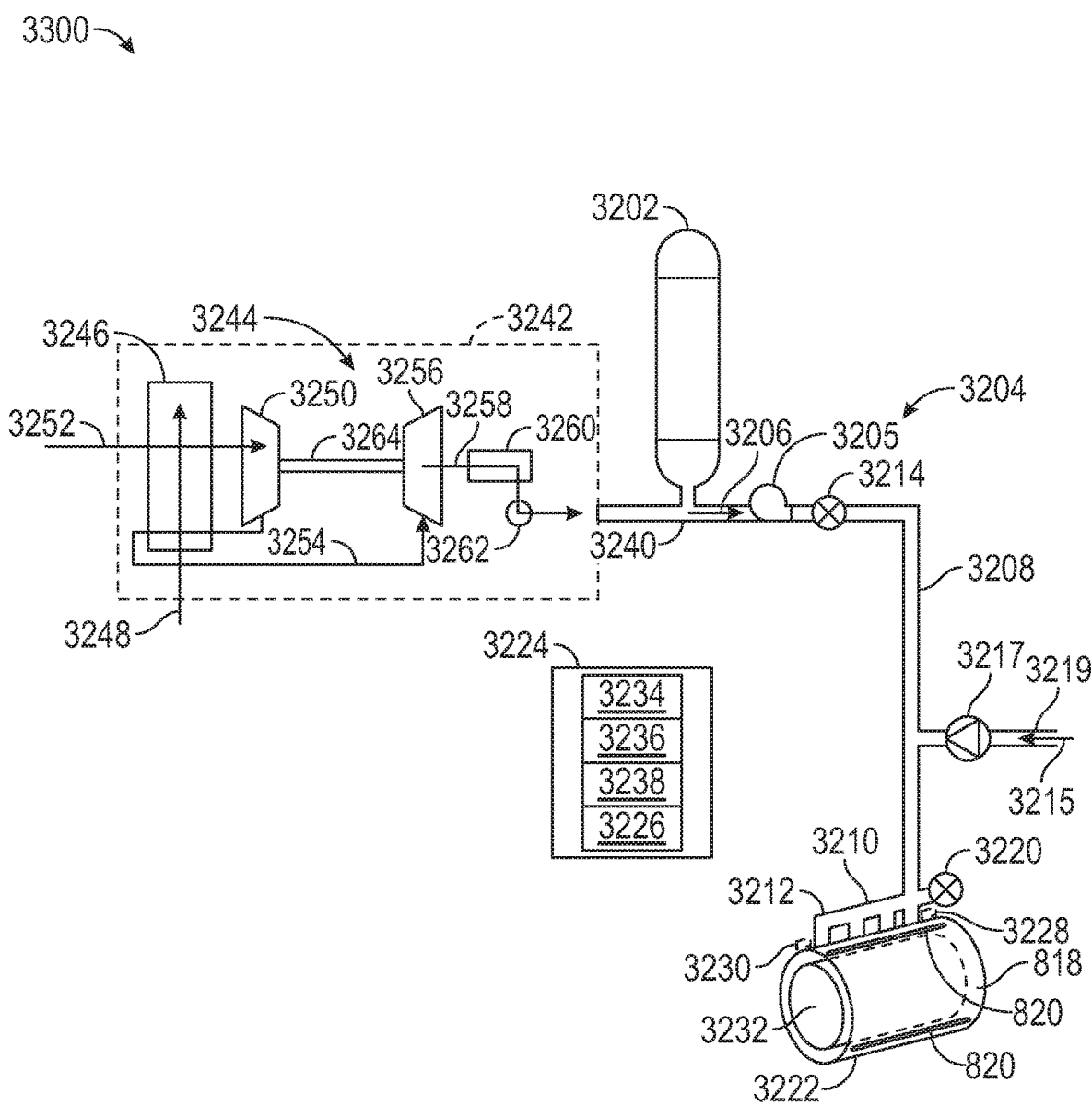
FIG. 25 is a schematic illustration of a cryogenic cooling system in accordance with an embodiment of the disclosure.

With continued reference to FIGS. 24 and 25, a purge valve 3220 can be coupled to the manifold 3210 proximate to a housing 3222 of the electric fan propulsion motor 818. The purge valve 3220 can be controlled to release gaseous air that has accumulated in the cryogenic working fluid flow control assembly 3204 as part of a process of supplying a pre-cooling flow of the working fluid 3206 from the cryogenic liquid reservoir 3202 through the cryogenic working fluid flow control assembly 3204 to the propulsion motor windings 820.

The cryogenic cooling system 3200 and/or cryogenic cooling system 3300 can also include a controller 3224. The controller 3224 can interface with the main flow control valve 3214, the bypass flow control valve 3218, and the purge valve 3220 through an input/output interface 3226.

The controller 3224 can also interface with one or more sensors, such as one or more temperature sensors 3228 and/or one or more pressure sensors 3230. Temperature sensors 3228 can be located proximate to the purge valve 3220, proximate to one or more taps 3212 of the manifold 3210, and/or at other locations to determine a temperature within the manifold 3210, an exit temperature, or other temperatures. Although depicted proximate to the housing 3222 and manifold 3210, the pressure sensors 3230 can be located remotely from the housing 3222 and manifold 3210 if pressure taps and ducting are used. The controller 3224 can be combined with the propulsion motor controller 816 of FIG. 9, or the controller 3224 may be separate from the propulsion motor controller 816.

In embodiments, the controller 3224 is operable to control changes in the flow rate of the working fluid 3206 and timing of opening and closing the purge valve 3220 based on temperature data from the one or more temperature sensors 3228. The controller 3224 may alternatively or additionally be operable to control changes in the flow rate of the working fluid 3206 and timing of opening and closing the purge valve 3220 based on pressure data from the one or more pressure sensors 3230. In some embodiments, a speed of rotation of a rotor 3232 of the electric fan propulsion motor 818 is limited responsive to confirming whether the working fluid 3206 is reaching the propulsion motor windings 820 in a liquid state. Temperature and/or pressure data from the temperature sensors 3228 and pressure sensors 3230 can be used to confirm whether the working fluid 3206 is in a liquid state. The propulsion motor controller 816 of FIG. 9 can set or limit the electric current provided to the propulsion motor windings 820 based on determining whether the working fluid 3206 is in the liquid state at the propulsion motor windings 820. When implemented as separate controllers, a communication interface 3234 of the controller 3224 can send a limit signal, a liquid state confirmation signal, and/or other signals to the propulsion motor controller 816 of FIG. 9.

In an embodiment, the controller 3224 also includes a memory system 3236 to store instructions that are executed by a processing system 3238 of the controller 3224. The executable instructions may be stored or organized in any manner and at any level of abstraction, such as in connection with a controlling and/or monitoring operation of the cryogenic cooling system 3200, 3300. The processing system 3238 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 3236 may include random access memory (RAM), read only memory (ROM), or other electronic, optical, magnetic, or any other computer readable medium onto which is stored data and control algorithms in a non-transitory form.

In embodiments, the cryogenic liquid reservoir 3202 can include one or more removable/rechargeable containers or can be integrated within the cryogenic cooling system 3200. The cryogenic liquid reservoir 3202 can have a 5000 pounds-per-square-inch (PSI) pressure rating. In the examples of FIGS. 24 and 25, the cryogenic liquid reservoir 3202 is coupled in fluid communication with a feeder line 3240. In some embodiments, the feeder line 3240 enables an external source to recharge the cryogenic liquid reservoir 3202 with liquid air. In some embodiments, the aircraft 800 of FIG. 9 includes at least one cryogenic cooler system 3242 operable to generate and produce liquid air for storage in the cryogenic liquid reservoir 3202 during operation of the at least one gas turbine engine 20 of FIG. 9. For example, the cryogenic cooler system 3242 can include one or more air cycle machines 3244 operable to compress, chill, expand, pump, and condense an air flow to produce liquid air for storage in the cryogenic liquid reservoir 3202.

As one example, the cryogenic cooler system 3242 can include a heat exchanger system 3246 operable to receive a cooling air intake 3248. A compressor 3250 can receive bleed air 3252 from one of the gas turbine engines 20 of FIG. 9. Compressed air 3254 output by the compressor 3250 can pass through the heat exchanger system 3246 to at least one turbine 3256 as a cooled flow 3258 to a vacuum system 3260 and a liquid air condensate pump system 3262 that urges liquid air through the feeder line 3240 for storage in the cryogenic liquid reservoir 3202. The compressor 3250 and the at least one turbine 3256 may be mechanically linked by a coupling 3264, such as a shaft. In some embodiments, the compressor 3250 and the at least one turbine 3256 are not physically coupled. The compressor 3250 can be driven mechanically by one of the gas turbine engines 20 of FIG. 9 and/or electrically using another electric propulsion motor (not depicted). Although one example of the cryogenic cooler system 3242 is depicted in the examples of FIGS. 24 and 25, it will be understood that additional elements and modifications are contemplated, such as two or more turbine wheels, recirculation paths, water separation, one or more fan sections, intermediate taps, relief valves, and/or other such elements known in the art. Further, the working fluid 3206 can be provided to cool other systems of the aircraft 800 of FIG. 9, such as other electronic loads or gas turbine engine components (not depicted).

Figure 26:
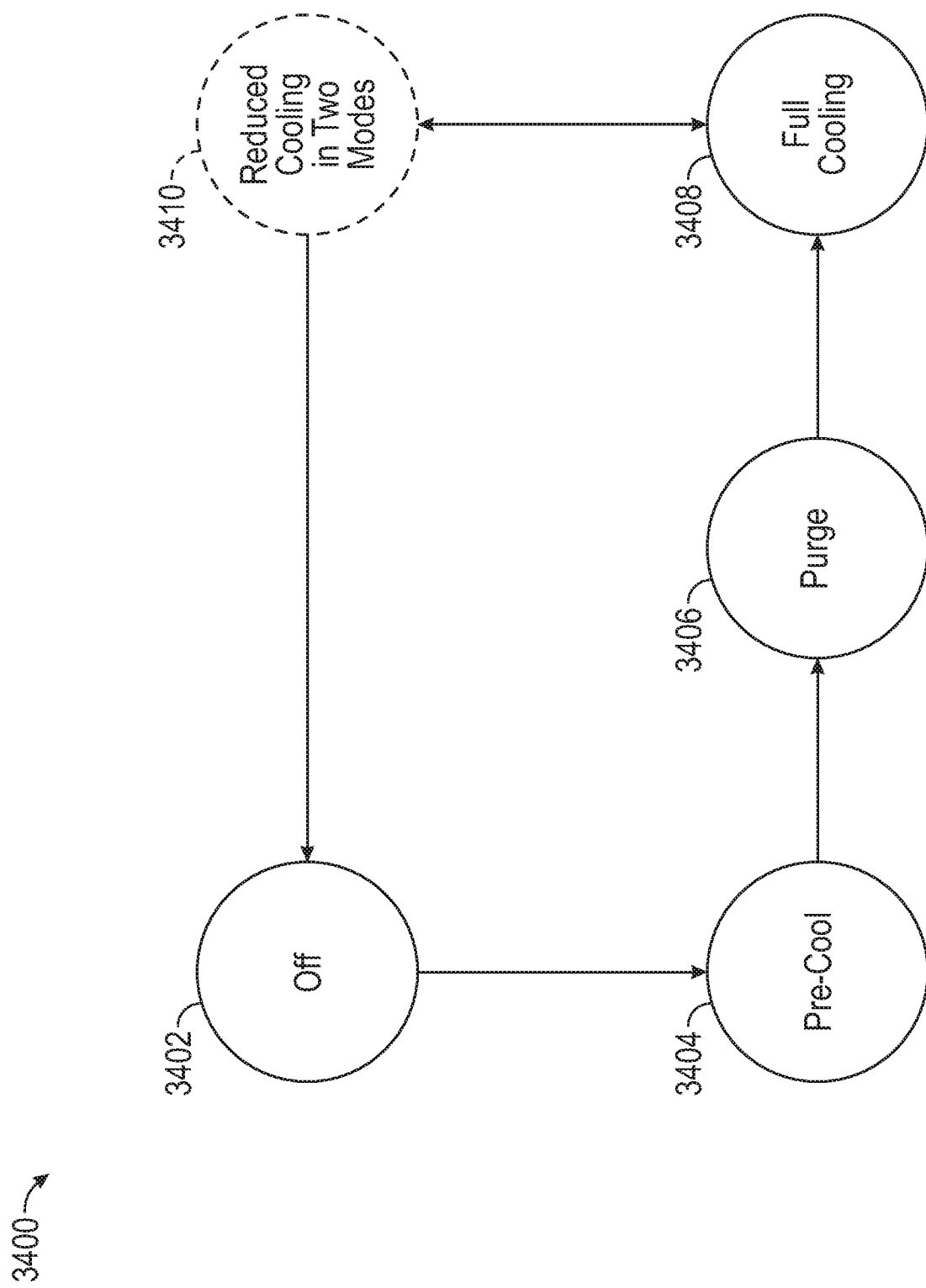
FIG. 26 is a state transition diagram in accordance with an embodiment of the disclosure.

FIG. 26 depicts a state transition diagram 3400 of the cryogenic cooling system 3200 of FIG. 24 and/or the cryogenic cooling system 3300 of FIG. 25 in accordance with an embodiment. The cryogenic cooling system 3200, 3300 can remain in an off state 3402 during a ferry mode of the aircraft 800 of FIG. 9 to conserve range, fuel, and/or battery life. In the off state 3402, the cryogenic cooler system 3242 can be disabled, for instance, until the aircraft 800 reaches an operational state conducive to efficient cryogenic liquid air generation, such as at cruise. In the off state 3402, the bypass flow control valve 3218 and the main flow control valve 3214 remain closed in the cryogenic cooling system 3200. In the cryogenic cooling system 3300, the main flow control valve 3214 remains closed in the off state 3402. When transitioning to a low-power mode or otherwise preparing to operate the electric fan propulsion motor 818 in a higher power mode of operation, the cryogenic cooling system 3200, 3300 optionally and desirably transitions to a pre-cool state 3404. The precooling can assist an aircraft in taxing mode by precooling ducting and the electric fan propulsion motor 818 itself such that, during an ensuing six second acceleration to takeoff power, there is reduced time lag and reduced temperature excursion to be dealt with by all surfaces that come into contact with the cryogenic fluid be it liquid or gas. For cryogenic cooling system 3200, the controller 3224 can open the bypass flow control valve 3218 while the main flow control valve 3214 remains closed in the pre-cool state 3404. In cryogenic cooling system 3300, the controller 3224 can partially open the main flow control valve 3214 in the pre-cool state 3404. The cryogenic cooler system 3242 can be active during the pre-cool state 3404 to further supply liquid air. The purge valve 3220 can also remain closed in the pre-cool state 3404. The working fluid 3206 may be in the form of cold gaseous air (e.g., cooled to about −182 deg. C.). The propulsion motor windings 820 and rotor 3232 may also be cooled to about −182 deg. C. in the pre-cool state 3404.

Shortly before higher/full power is applied to the electric fan propulsion motor 818, the cryogenic cooling system 3200, 3300 transitions from the pre-cool state 3404 to a purge state 3406. The purge state 3406 opens the main flow control valve 3214 to increase a flow rate of the working fluid 3206 to supply a full cooling flow from the cryogenic liquid reservoir 3202 through the cryogenic working fluid flow control assembly 3204 to the propulsion motor windings 820. The purge valve 3220 is opened to vent a gaseous accumulation of the working fluid 3206 from the cryogenic working fluid flow control assembly 3204. The purge valve 3220 can be closed after a predetermined time (e.g., in milliseconds) and/or a detected condition (e.g., temperature and/or pressure) confirms the gas has been substantially purged. Transitioning the purge valve 3220 from closed to opened to closed is referred to as "cycling" the purge valve 3220. Upon closing the purge valve 3220, the cryogenic cooling system 3200, 3300 transitions from the purge state 3406 to the full cooling state 3408. In the full cooling state 3408, the working fluid 3206 is delivered in a liquid state to the propulsion motor windings 820 during operation of the electric fan aircraft propulsion motor 818.

In some embodiments, if the power demand of the electric fan propulsion motor 818 is reduced during operation or upon a shutdown event of the electric fan propulsion motor 818, the cryogenic cooling system 3200, 3300 can transition from the full cooling state 3408 to a reduced cooling state 3410. In embodiments where the main flow control valve 3214 is a variable position valve, the position of the main flow control valve 3214 can be set to a partially opened state to reduce consumption of liquid air in the reduced cooling state 3410 until a transition back to the full cooling state 3408 is needed. Further, either or both of the main flow control valve 3214 and the bypass flow control valve 3218 can be modulated, for instance, using pulse width modulation to repeatedly open and close the main flow control valve 3214 and/or the bypass flow control valve 3218 in the reduced cooling state 3410 to reduce a flow rate of the liquid air to the electric fan propulsion motor 818. The reduced cooling state 3410 can be used after the electric fan propulsion motor 818 is depowered to slowly increase the temperature of the electric fan propulsion motor 818 and reduce thermal transient effects. The cryogenic cooling system 3200, 3300 can transition from the reduced cooling state 3410 to the off state 3402 or the full cooling state 3408. In some embodiments, the reduced cooling state 3410 is equivalent to the pre-cool state 3404. The reduced cooling state 3410 may also or alternatively supply the non-cryogenic cooling flow 3215 to the propulsion motor windings 820 to conserve cryogenic resources and enable a lower power operation of the electric fan propulsion motor 818.

Figure 27:
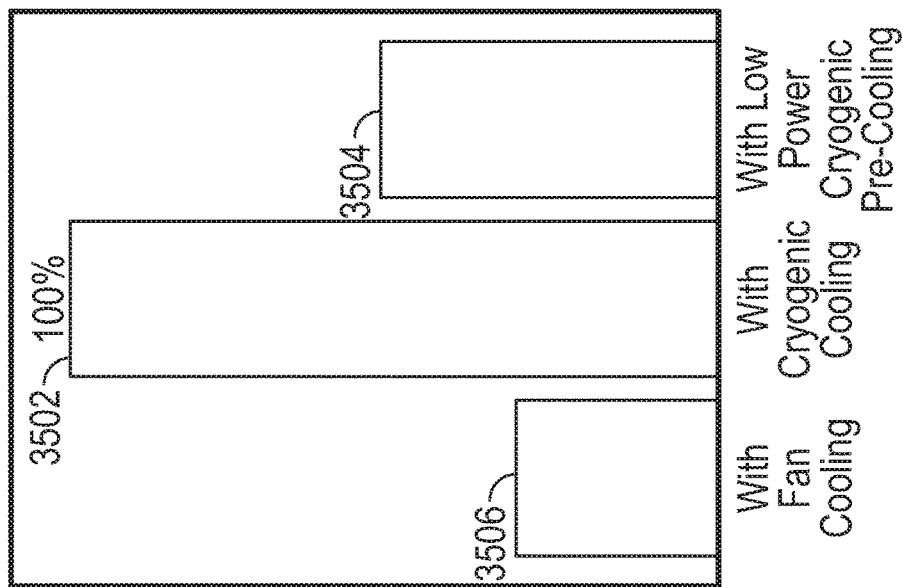
FIG. 27 is a system response plot in accordance with an embodiment of the disclosure.

In FIG. 27 a plot 3500 depicts three possible thrust outputs from the electric fan propulsion motor 818. The highest output level 3502, up to the full capability of the electric fan propulsion motor 818 is where the full cryogenic cooling capability is presented and a 100% thrust capability is realized. Much less thrust is available if a low flow of cryogenic gaseous air at a reduced level 3504 is provided but the aircraft system holds the biggest part of its cryogenic resource in reserve and it is not wasted. Finally, depending on the motor design, there may be a fan integral with the electric fan propulsion motor 818 or powered separately such that ambient air 817 is used for cooling and none of the cryogenic resource is used at a lowest level 3506 with the electric fan propulsion motor 818 at its lowest thrust.

Figure 28:
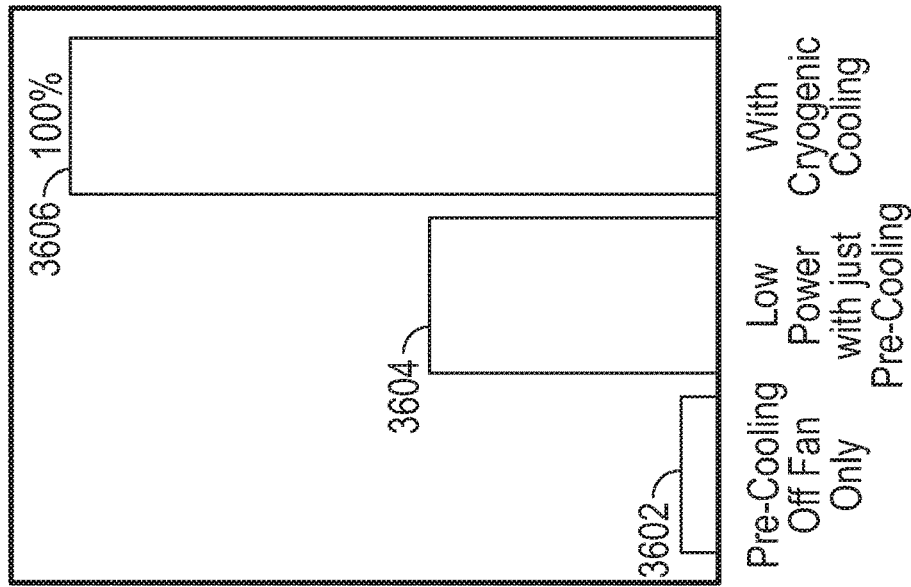
FIG. 28 is a system response plot in accordance with an embodiment of the disclosure.

In plot 3600 of FIG. 28, the cryogenic flows are "off" if the electric fan propulsion motor 818 is designed to pull some ambient airflow into the motor housing for low thrust operation at a lowest level 3602. Second, the low cryogenic airflow is provided while still conserving the cryogenic resource to the greatest extent possible at level 3604, and lastly the full flow is provided for maximum propulsion motor thrust at a highest level 3606.

Figure 29:
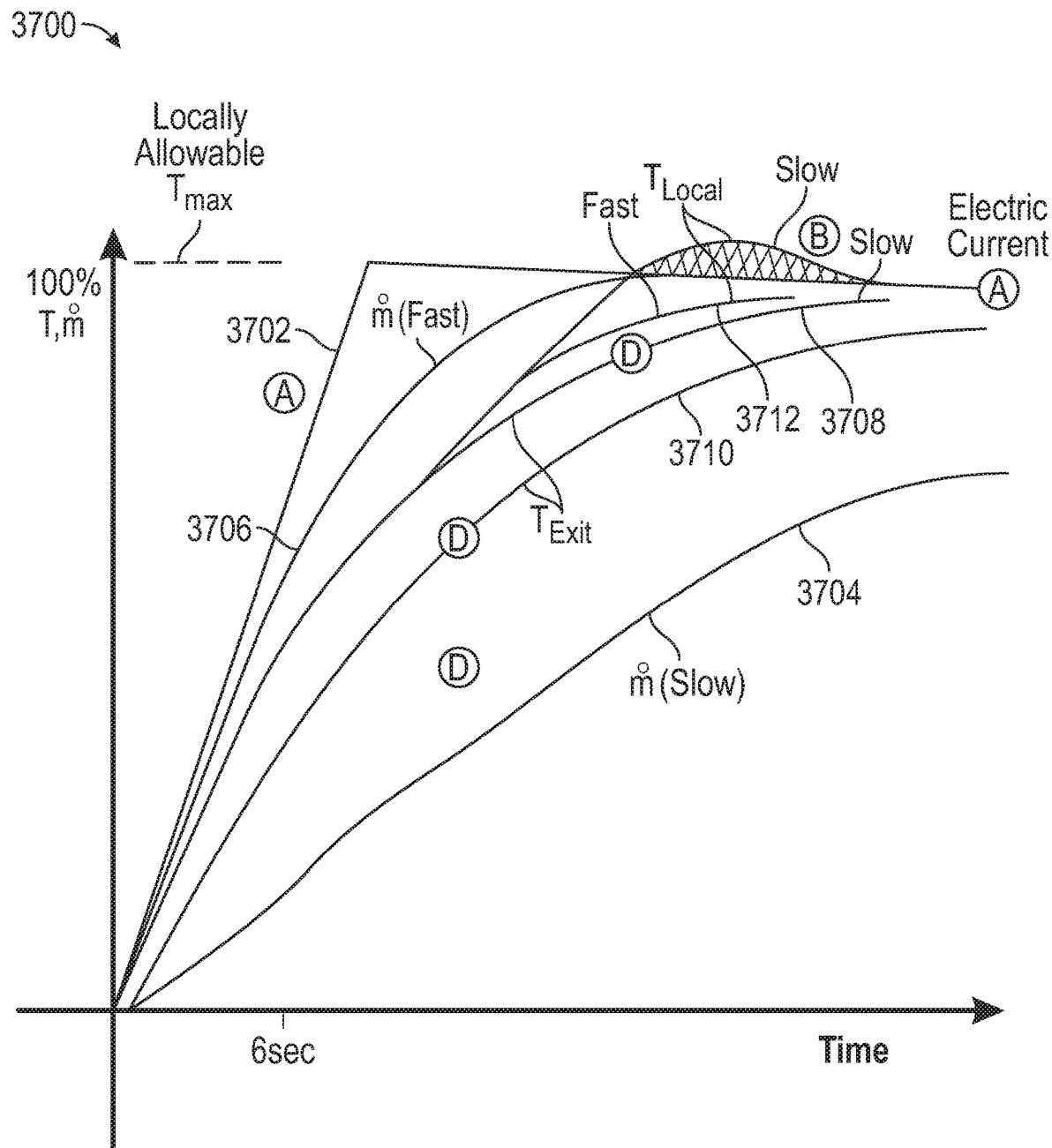
FIG. 29 is a system response plot in accordance with an embodiment of the disclosure.

Turning to FIG. 29, there is a transient representation of the electric current in the curve 3702 marked (a) in plot 3700, where the full current is applied in about 6 seconds, but the application of full current is not necessarily instantaneous and may be applied gradually with as much of a time lag as is shown by the electric current ramp and labeled by (a) since electricity is faster to course through the electric fan propulsion motor 818 than cooling fluid can ramp up. Next is shown two scenarios labeled mdot(slow) 3704 and mdot (fast) 3706. In the case of mdot(slow) 3704, the Texit temperature of the electric fan propulsion motor 818 changes and is hotter than the other case with mdot(fast) 3706 which is the desirable circumstance in that the Texit temperature is stipulated to be acceptable for the purposes of this example. However, the slow introduction of cooling may not be well characterized by the Texit parameter since Texit is a bulk average temperature and may not well represent a hottest part of the electric fan propulsion motor 818. This hottest part, called there Tlocal, may be simply an internal feature that has the most mass or is at a disadvantaged location relative to some part of cryogenic stream manifold introduction. Nevertheless, damage to the electric fan propulsion motor 818 and the long term durability of the electric fan propulsion motor 818 is dependent on the health of the motor component at Tlocal. Plot 3700 shows two scenarios 3708, 3710 for Tlocal, one of which is associated with mdot(slow) 3704 at scenario 3708 which locally exceeds the maximum temperature allowed for undamaged operation and is marked by cross hatches 3712. If however mdot (fast) 3706 is employed in embodiments, the Tlocal temperature does not exceed damage limits. It is possible for a control standpoint to empirically and analytically relate Tlocal to Texit by monitoring Texit and by correlating Tlocal to Texit and modifying the correlation by a relationship that includes the recent past history of Texit to adjust for some amount of lag in the rate in which Tlocal cools from a previous power condition.

Figure 30:
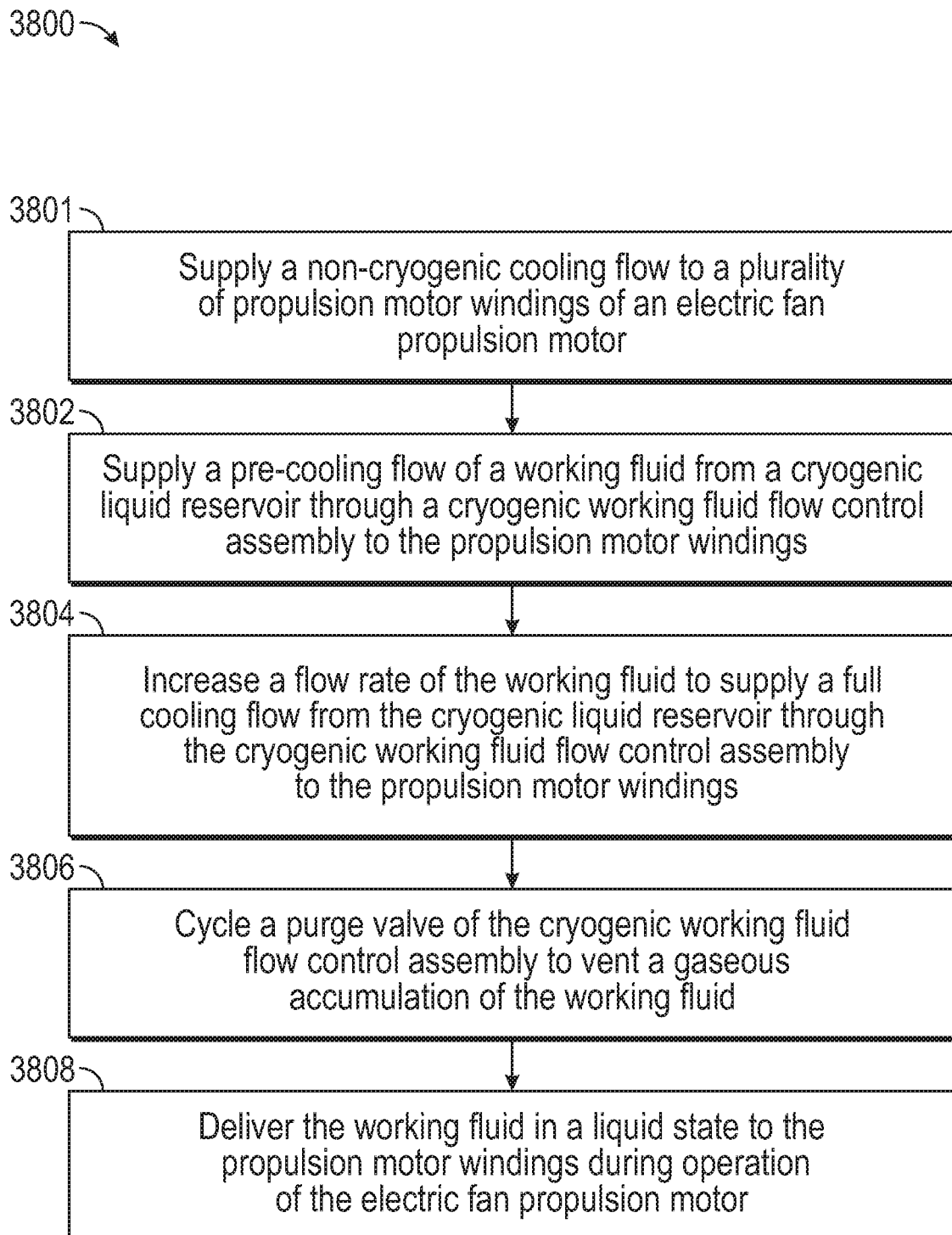
FIG. 30 is a flow chart illustrating a method in accordance with an embodiment of the disclosure.

FIG. 30 is a flow chart illustrating a method 3800 of propulsion system cooling control in accordance with an embodiment. The method 3800 of FIG. 30 is described in reference to FIGS. 1-30 and may be performed with an alternate order and include additional steps. The method 3800 can be performed, for example, by cryogenic cooling system 3200, cryogenic cooling system 3300, or other variations.

At block 3801, a non-cryogenic cooling flow 3215 can be supplied to a plurality of propulsion motor windings 820 of an electric fan propulsion motor 818 to provide a lower level of operability to the electric fan propulsion motor 818. The cooling source 3219 of the non-cryogenic cooling flow 3215 can be ambient air 817 or air that is taken from an exit of an air cycle machine on board the aircraft 800 for environmental cooling of the cabin 812.

At block 3802, a pre-cooling flow of working fluid 3206 is supplied from a cryogenic liquid reservoir 3202 through a cryogenic working fluid flow control assembly 3204 to a plurality of propulsion motor windings 820 of an electric fan propulsion motor 818. Controller 3224 can open a bypass flow control valve 3218 to provide the pre-cooling flow as a bypass cooling flow through a bypass cooling line 3216 around the main flow control valve 3214. Alternatively, the controller 3224 can partially open the main flow control valve 3214 to provide the pre-cooling flow.

At block 3804, a flow rate of the working fluid 3206 is increased to supply a full cooling flow from the cryogenic liquid reservoir 3202 through the cryogenic working fluid flow control assembly 3204 to the propulsion motor windings 820. A position of the main flow control valve 3214 can be modified responsive to the controller 3224 to control the flow rate of the working fluid 3206 through a primary cooling line 3208 of the cryogenic working fluid flow control assembly 3204 to the propulsion motor windings 820. For instance, the main flow control valve 3214 can be commanded to fully open to increase the working fluid 3206 flow rate.

Optionally, a further, low power source can be provided, as the non-cryogenic cooling flow 3215, where a cool temperature but not cryogenic temperature source of cooling is provided so as to give the aircraft 800 the opportunity to operate the electric fan propulsion motor 818 without using up any cryogenic resources at low power and for an unlimited time.

At block 3806, controller 3224 can cycle a purge valve 3220 of the cryogenic working fluid flow control assembly 3204 from closed to opened to closed to vent a gaseous accumulation of the working fluid 3206.

At block 3808, the working fluid 3206 is delivered in a liquid state to the propulsion motor windings 820 during operation of the electric fan propulsion motor 818 to increase power density with a larger electric current supported during cryogenic operating conditions. A flow rate of the working fluid 3206 can be decreased from the full cooling flow to a reduced cooling flow prior to disabling a flow of the working fluid 3206 from the cryogenic liquid reservoir 3202 through the cryogenic working fluid flow control assembly 3204 to the propulsion motor windings 820. As previously described, the reduction can be achieved by partially closing the main flow control valve 3214, if supported, or modulating either or both of the main flow control valve 3214 and the bypass flow control valve 3218 between commanding opened and closed valve positions.

On board an aircraft, there are typically multiple systems that use various gases. Some types of gases are generated on-board an aircraft and others are carried in pressurized storage containers. For example, an on-board inert gas generating system can produce nitrogen-enriched air and supply the nitrogen-enriched air to on-board fuel storage tanks to reduce fuel vapor flammability. Oxygen gas may be stored on-board an aircraft for use by passengers and crew members in the event of cabin pressurization loss. Dedicated resources for oxygen gas storage and nitrogen generation can add to aircraft weight, complexity, and fuel consumption.

Figure 31:
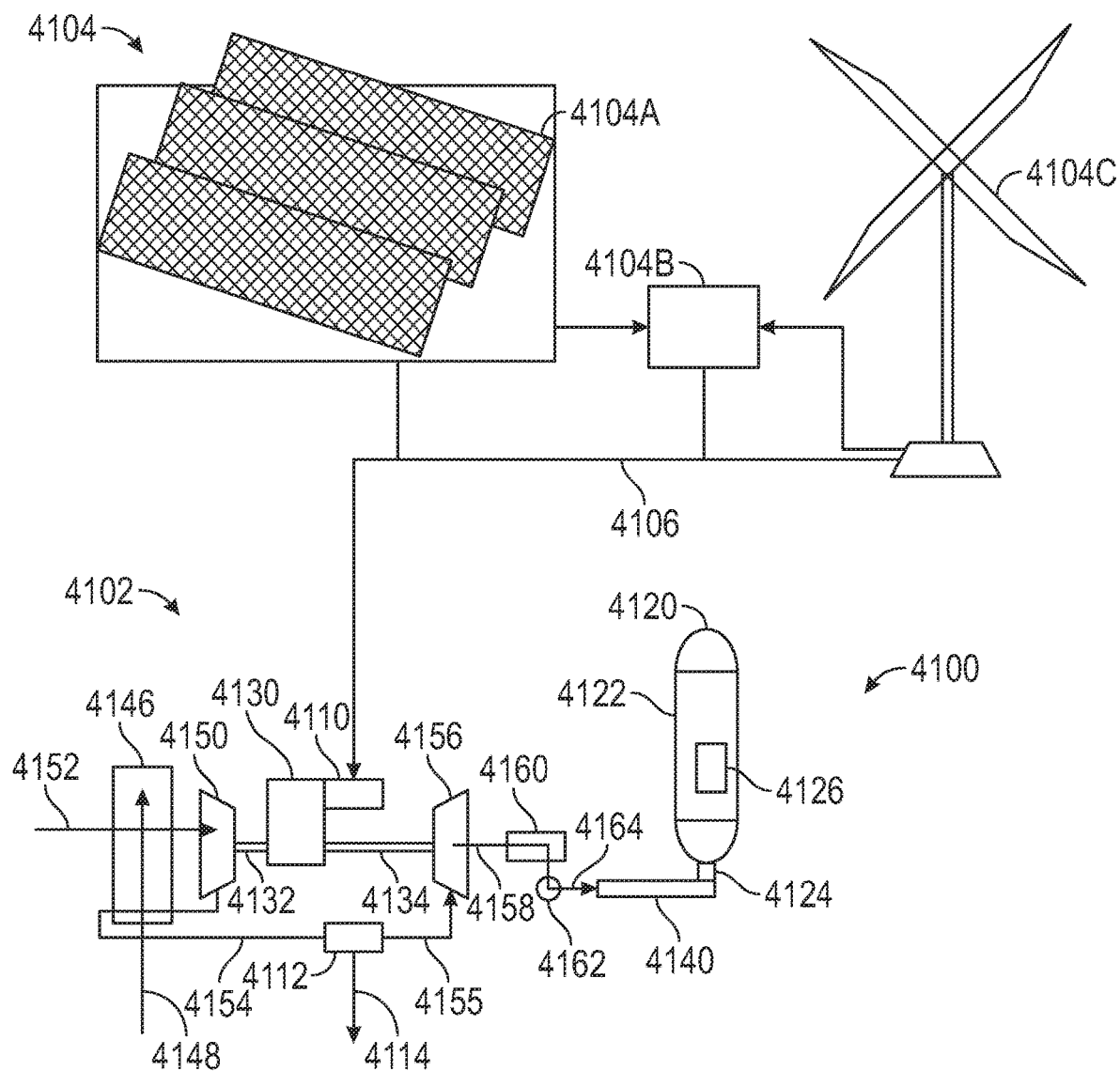
FIG. 31 is a schematic illustration of a ground-based cryogenic liquid generation system in accordance with an embodiment of the disclosure.

FIG. 31 schematically illustrates a ground-based cryogenic cooling system 4100 including a cryogenic cooler 4102 that can be powered by a power supply 4104 through a power distribution system 4106. The power supply 4104 can be an electric power supply from one or more renewable power supplies of "green" power. For example, a solar array 4104A, a rechargeable battery system 4104B, a wind turbine system 4104C, and/or other known types of renewable power supplies can be used to power the cryogenic cooler 4102. In the example of FIG. 31, electric current produced by the solar array 4104A and/or the wind turbine system 4104C can be stored in the rechargeable battery system 4104B when the cryogenic cooler 4102 is not operating, or the cryogenic cooler 4102 is actively drawing less current than is produced by the solar array 4104A and/or the wind turbine system 4104C. Alternatively, the system can be used to absorb the extra capacity of a nuclear power, hydro or wind plant in times when less than peak loads are being serviced by the energy grid in order to reduce the emission of carbon into the atmosphere during high electric grid use.

The cryogenic cooler 4102 is an example of a means for cooling an airflow to produce chilled air. The cryogenic cooler 4102 can include a heat exchanger system 4146 operable to receive a cooling air intake 4148 that can be drawn by a fan (not depicted). A compressor 4150 can receive an airflow 4152, for instance, from a fan (not depicted) and produce compressed air 4154. An electric motor 4110 is operable to drive rotation of the compressor 4150 responsive to electric current from the power supply 4104. Compressed air 4154 that is output by the compressor 4150 can pass through the heat exchanger system 4146 and through a water separator 4112 to produce dried cool air 4155. The water separator 4112 is a means for separating water vapor using a condenser, such as a cyclonic separator or similar structure that can swirl air over an impingement surface to cause moisture condensation, for instance, using centrifugal force. Water 4114 extracted at the water separator 4112 can be discarded or may be sprayed proximate to an intake of the heat exchanger system 4146 to further cool the cooling air intake 4148. A turbine assembly 4156 can include one or more turbines in fluid communication with the water separator 4112, where the turbine assembly 4156 is configured to expand the dried cool air 4155 and produce chilled air 4158. The chilled air 4158 can pass through a vacuum system 4160 and a liquid air condensate pump system 4162 that condenses the chilled air 4158 into liquid air 4164 and urges the liquid air 4164 through a feeder line 4140 for storage in a cryogenic liquid reservoir 4122 of a cryogenic cartridge 4120.

The cryogenic cartridge 4120 includes a coupling interface 4124 configured to detachably establish fluid communication with the feeder line 4140, and the cryogenic liquid reservoir 4122 is configured to store the liquid air 4164 under pressure. As one example, the cryogenic liquid reservoir 4122 can have a 5000 pounds-per-square-inch (PSI) pressure rating. The cryogenic cartridge 4120 can also include a rapid release component 4126 operable to depressurize the cryogenic liquid reservoir 4122 upon impact. For example, the rapid release component 4126 can include a venting system or a blow-out panel configured to release contents of the cryogenic liquid reservoir 4122 upon a substantial impact to the cryogenic cartridge 4120, such as a crash event.

In some embodiments, the electric motor 4110 can drive the compressor 4150 through a gearbox 4130 that drives a shaft 4132 coupled to the compressor 4150. Rotation of the turbine assembly 4156 may drive a shaft 4134 that provides another input to the gearbox 4130. In alternate embodiments, there is no mechanical coupling between the compressor 4150 and the turbine assembly 4156. For example, the electric motor 4110 can directly drive the shaft 4132 and work output on the shaft 4134 can drive rotation of another element (not depicted).

Although one example of the cryogenic cooler 4102 is depicted in the example of FIG. 31, it will be understood that additional elements and modifications are contemplated, such as two or more turbine wheels, recirculation paths, one or more fan sections, intermediate taps, relief valves, and/or other such elements known in the art. For instance, the chilled air 4158 may be recirculated through the cryogenic cooler 4102 to progressively reduce the temperature to cryogenic temperatures to support liquefaction of air. Further, the cryogenic cooler 4102 may support filling of multiple cryogenic cartridges 4120 as depicted in the example of FIG. 32.

Figure 32:
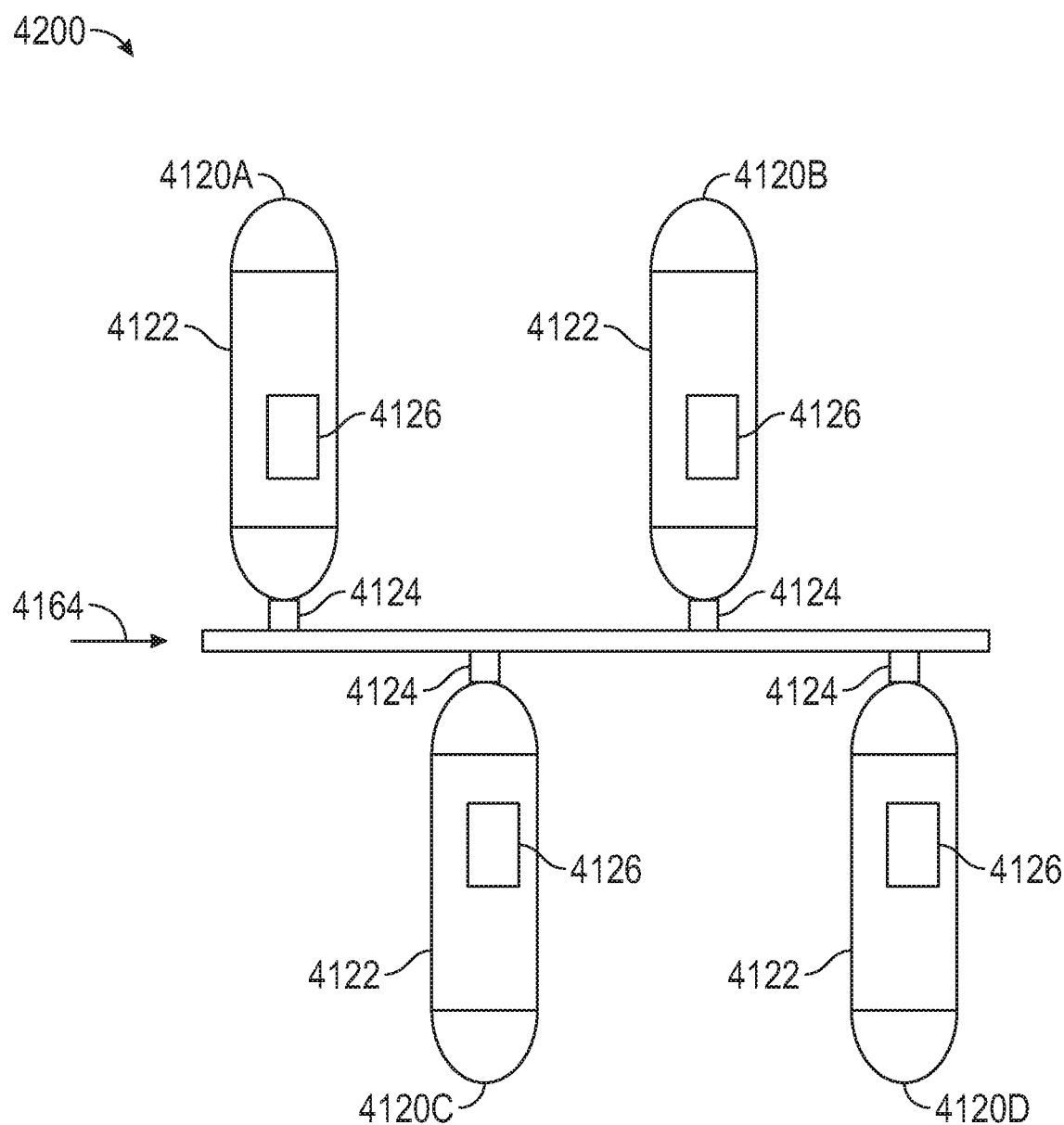
FIG. 32 is a schematic illustration of a filling station in accordance with an embodiment of the disclosure.

FIG. 32 is a schematic illustration of a filling station 4200 operable to pressurize and store the liquid air 4164 of FIG. 31 in a plurality of cryogenic cartridges 4120A, 4120B, 4120C, 4120D. For example, when the cryogenic cooler 4102 is actively producing liquid air 4164, multiple cryogenic cartridges 4120A-4120D can be filled in parallel. The cryogenic cartridges 4120A-4120D can be detached for transport/use as needed. As cryogenic cartridges 4120A-4120D are emptied and returned, the cryogenic cartridges 4120A-4120D can be refilled at the filling station 4200, which may be an extension of the feeder line 4140 of FIG. 31. In some embodiments, a pressure monitoring system and/or weight monitoring system can be used determine the fill state of the cryogenic cartridges 4120A-4120D. In an embodiment, when conditions are favorable for electric current output by one or more of power supply 4104, such as a sunny day or a windy day, any of the cryogenic cartridges 4120A-4120D docked at the filling station 4200 can be at least partially recharged with liquid air 4164 as needed. Although the example of FIG. 32 depicts four cryogenic cartridges 4120A-4120D at the filling station 4200, any number of cryogenic cartridges 4120 can be supported depending upon design constraints.

Figure 33:
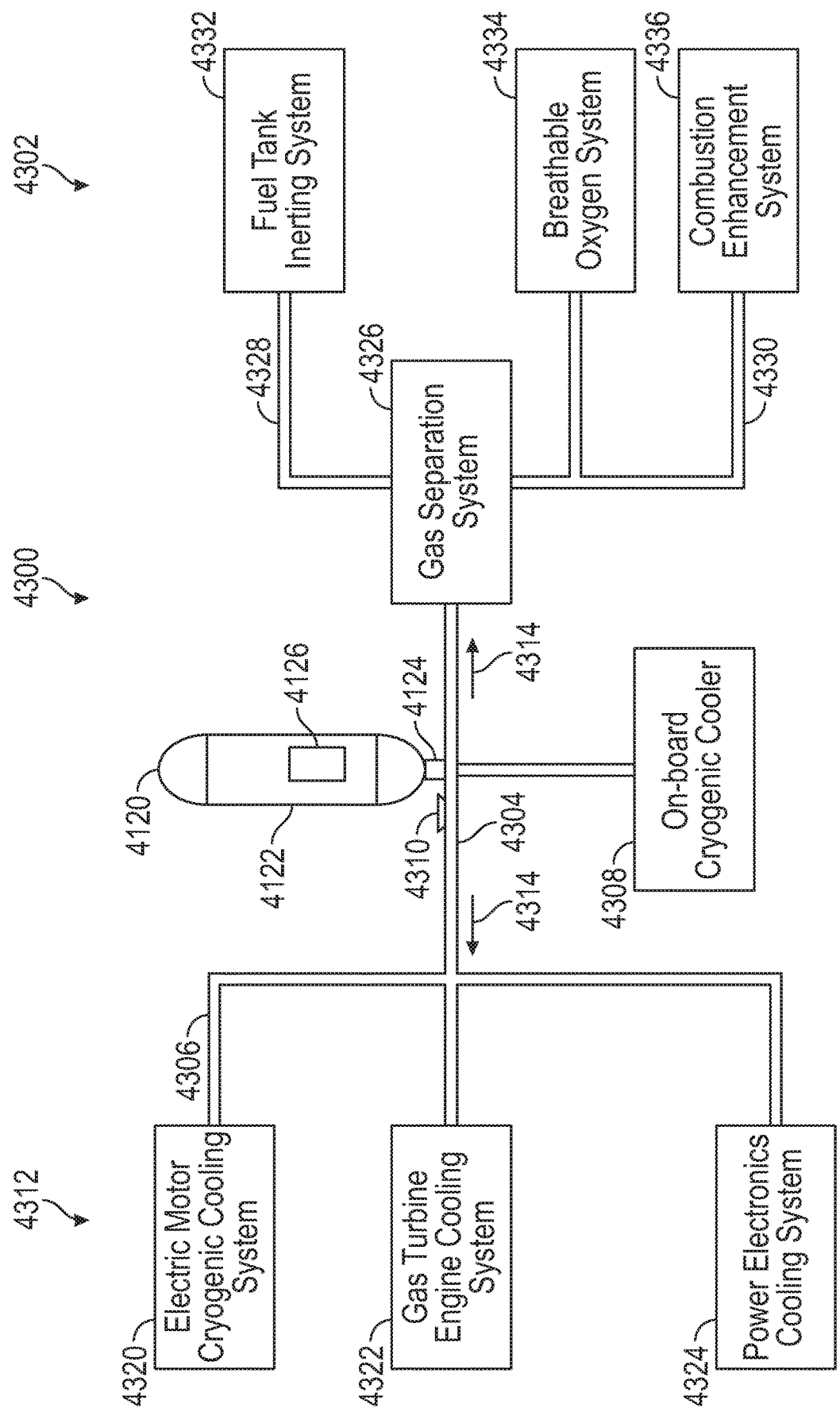
FIG. 33 is a schematic illustration of a cryogenic system for an aircraft in accordance with an embodiment of the disclosure.

FIG. 33 is a schematic illustration of a cryogenic system 4300 for an aircraft 4302. The cryogenic system 4300 includes a cryogenic liquid distribution system 4304 with one or more cryogenic fluid flow paths 4306. The coupling interface 4124 of the cryogenic cartridge 4120 of FIG. 31 can be attached to the cryogenic liquid distribution system 4304 to establish fluid communication with the cryogenic liquid distribution system 4304. Once the cryogenic liquid reservoir 4122 configured to store liquid air under pressure as a cryogenic working fluid 4314 is substantially depleted, the coupling interface 4124 can be used to detach the cryogenic cartridge 4120 and reattach one of the cryogenic cartridges 4120A-4120D of FIG. 32 that has previously been filled. In some embodiments, the cryogenic liquid reservoir 4122 can be at least partially refilled while coupled to the cryogenic liquid distribution system 4304 using an on-board cryogenic cooler 4308, if available, and/or a filling port 4310. When available on the aircraft 4302, the on-board cryogenic cooler 4308 is operable to at least partially recharge the cryogenic cartridge 4120 during aircraft operation, for instance, while operating in a cruise or descent flight phase. The cryogenic cartridge 4120 can be positioned within the aircraft 4302 at a serviceable location that enables attachment and detachment of the cryogenic cartridge 4120 by a ground service crew during routine ground servicing operations, e.g., fueling the aircraft 4302. The cryogenic cartridge 4120 may be positioned such that liquid air discharged by the rapid release component 4126 during an impact event reduces the risk of an adverse result to other components and/or a cabin area of the aircraft 4302.

One or more cryogenic usage systems 4312 can be in fluid communication with the one or more cryogenic fluid flow paths 4306 and configured to selectively receive a cryogenic working fluid 4314 discharged through the coupling interface 4124 of the cryogenic cartridge 4120. Depending upon the temperature and placement of the cryogenic usage systems 4312, the cryogenic working fluid 4314 may initially be received as cooling air or a mixture of liquid air and cooling air. Examples of the cryogenic usage systems 4312 include an electric motor cryogenic cooling system 4320, a gas turbine engine cooling system 4322, and a power electronics cooling system 4324. The electric motor cryogenic cooling system 4320, gas turbine engine cooling system 4322, and power electronics cooling system 4324 can include a combination of plumbing lines and control valves to target particular components and systems with a cooling fluid flow. The cryogenic working fluid 4314 may alternatively or additionally be selectively provided to a gas separation system 4326. The gas separation system 4326 may receive the cryogenic working fluid 4314 as liquid air and produce gaseous nitrogen 4328 and liquid oxygen 4330, for example. The gaseous nitrogen 4328 can be provided to a fuel tank inerting system 4332 as a main supply or supplement to an on-board inert gas generation system, for instance, to reduce fuel vapor flammability. The liquid oxygen 4330 may be provided to either or both of a breathable oxygen system 4334 and a combustion enhancement system 4336. Liquid oxygen 4330 can supplement or be a primary source of breathable oxygen after conditioning (e.g., temperature and pressure control) for the aircraft 4302. Liquid oxygen 4330 may also or alternatively be used by a combustion enhancement system 4336 to provide oxygen-enriched air to a compressor section of a gas turbine engine of the aircraft 4302 prior to combustion. Other uses on the aircraft 4302 are contemplated. Although multiple cryogenic usage systems 4312 are depicted as aircraft uses in FIG. 33, it will be understood that a subset (one or more) of the cryogenic usage systems 4312 may be implemented on the aircraft 4302. Further, the cryogenic usage systems 4312 may have separate instances of the cryogenic cartridge 4120 positioned in closer physical proximity if needed. Several examples of the cryogenic usage systems 4312 are depicted in the FIGS. 34-37 as further described herein.

Figure 34:
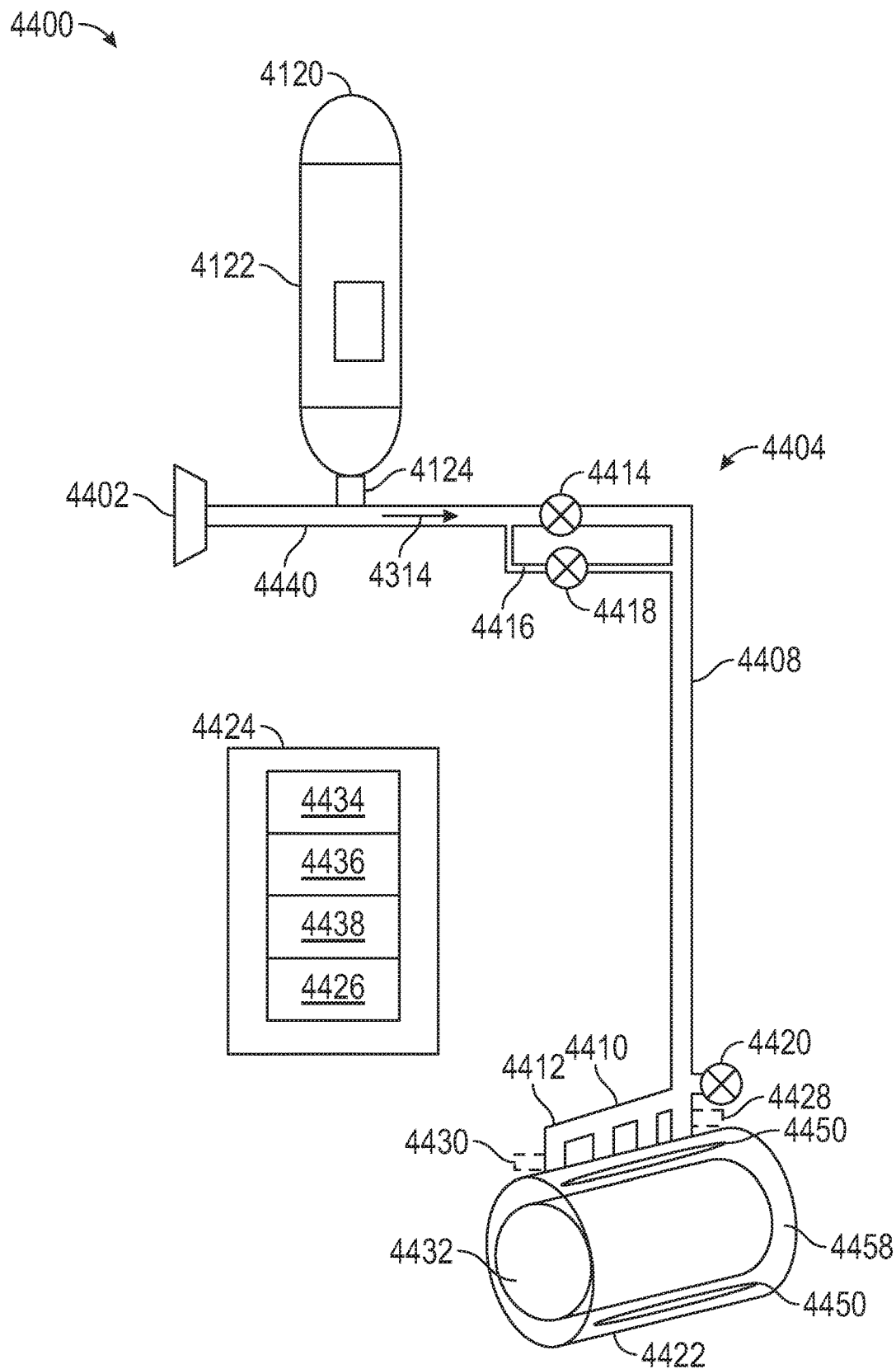
FIG. 34 is a schematic illustration of an electric motor cryogenic cooling system in accordance with an embodiment of the disclosure.

FIG. 34 depicts an electric motor cryogenic cooling system 4400 as an example of the electric motor cryogenic cooling system 4320 of FIG. 33 according to an embodiment. The electric motor cryogenic cooling system 4400 includes one or more cryogenic cartridge 4120 and a cryogenic working fluid flow control assembly 4404 in fluid communication with motor windings 4450 of the electric fan motor 4458. A cryogenic fluid coupling 4402 can provide an access port for transferring cryogenic working fluid 4314 to or refilling the cryogenic cartridge 4120, for instance, from cryogenic fluid flow paths 4306 and/or a filling port 4310 of FIG. 33. The electric motor cryogenic cooling system 4400 is operable to control a flow rate of a cryogenic working fluid 4314 through the cryogenic working fluid flow control assembly 4404 to the motor windings 4450. The cryogenic working fluid 4314 can be liquid air released from the cryogenic liquid reservoir 4122, cool gaseous air, and/or a mix of liquid and gaseous air. For example, the liquid air can be stored under pressure in the cryogenic liquid reservoir 4122 and may change to a gaseous state upon entering a warmer environment of the cryogenic working fluid flow control assembly 4404. As the cryogenic working fluid flow control assembly 4404 is cooled, the cryogenic working fluid 4314 may pass through a primary cooling line 4408 and reach a manifold 4410 of the cryogenic working fluid flow control assembly 4404 as liquid air to cryogenically chill the motor windings 4450. The manifold 4410 can include multiple taps 4412 to flow the cryogenic working fluid 4314 into close proximity with the motor windings 4450.

A combination of valves can be used to control the flow rate of the cryogenic working fluid 4314. For example, a main flow control valve 4414 is operable to control the flow rate of the cryogenic working fluid 4314 through a primary cooling line 4408 of the cryogenic working fluid flow control assembly 4404 to the motor windings 4450. In some embodiments, the main flow control valve 4414 is a variable position valve operable to transition between a closed position, a partially opened position to supply a pre-cooling flow, and a fully opened position to supply a full cooling flow. The terms "full" and "fully" refer to a sufficient level to meet a demand and need not be the maximum level attainable. In other embodiments, the main flow control valve 4414 is a discrete on/off valve that can be commanded to either a fully opened or a fully closed position. The cryogenic working fluid flow control assembly 4404 can also include a bypass cooling line 4416 and a bypass flow control valve 4418 configured to selectively provide a pre-cooling flow as a bypass cooling flow around the main flow control valve 4414. The electric motor cryogenic cooling system 4400 of FIG. 34 is an example of a system that includes the bypass cooling line 4416 and bypass flow control valve 4418.

With continued reference to FIG. 34, a purge valve 4420 can be coupled to the manifold 4410 proximate to a housing 4422 of the electric fan motor 4458. The purge valve 4420 can be controlled to release gaseous air that has accumulated in the cryogenic working fluid flow control assembly 4404 as part of a process of supplying a pre-cooling flow of the cryogenic working fluid 4314 from the cryogenic liquid reservoir 4122 through the cryogenic working fluid flow control assembly 4404 to the motor windings 4450.

A controller 4424 can interface with the main flow control valve 4414, the bypass flow control valve 4418, and the purge valve 4420 through an input/output interface 4426. The controller 4424 can also interface with one or more sensors, such as one or more temperature sensors 4428 and/or one or more pressure sensors 4430. Temperature sensors 4428 can be located proximate to the purge valve 4420, proximate to one or more taps 4412 of the manifold 4410, and/or at other locations to determine a temperature within the manifold 4410, an exit temperature, or other temperatures. Although depicted proximate to the housing 4422 and manifold 4410, the pressure sensors 4430 can be located remotely from the housing 4422 and manifold 4410 if pressure taps and ducting are used. The controller 4424 can be combined with one or more other controllers (not depicted) of the aircraft 4302 of FIG. 33.

In embodiments, the controller 4424 is operable to control changes in the flow rate of the cryogenic working fluid 4314 and timing of opening and closing the purge valve 4420 based on temperature data from the one or more temperature sensors 4428. The controller 4424 may alternatively or additionally be operable to control changes in the flow rate of the cryogenic working fluid 4314 and timing of opening and closing the purge valve 4420 based on pressure data from the one or more pressure sensors 4430. In some embodiments, a speed of rotation of a rotor 4432 of the electric fan motor 4458 is limited responsive to confirming whether the cryogenic working fluid 4314 is reaching the motor windings 4450 in a liquid state. Temperature and/or pressure data from the temperature sensors 4428 and pressure sensors 4430 can be used to confirm whether the cryogenic working fluid 4314 is in a liquid state or that sufficient cooling is reaching a temperature-limited internal component based on an analytical and empirically verified correlation between the measured exit temperature and the electric current being input to the electric fan motor 4458 and therefrom estimating the temperature of the component. A motor controller (not depicted) can set or limit the electric current provided to the motor windings 4450 based on determining whether the cryogenic working fluid 4314 is in the liquid state at the motor windings 4450. A communication interface 4434 of the controller 4424 can send a limit signal, a liquid state confirmation signal, and/or other signals to control the electric fan motor 4458.

In an embodiment, the controller 4424 also includes a memory system 4436 to store instructions that are executed by a processing system 4438 of the controller 4424. The executable instructions may be stored or organized in any manner and at any level of abstraction, such as in connection with a controlling and/or monitoring operation of the electric motor cryogenic cooling system 4400. The processing system 4438 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 4436 may include random access memory (RAM), read only memory (ROM), or other electronic, optical, magnetic, or any other computer readable medium onto which is stored data and control algorithms in a non-transitory form.

The cryogenic cartridge 4120 is detachably coupled by the coupling interface 4124 in fluid communication with a feeder line 4440. In some embodiments, the feeder line 4440 enables another source to recharge the cryogenic liquid reservoir 4122 with liquid air through the cryogenic fluid coupling 4402, for instance, from the on-board cryogenic cooler 4308 of FIG. 33.

Figure 35:
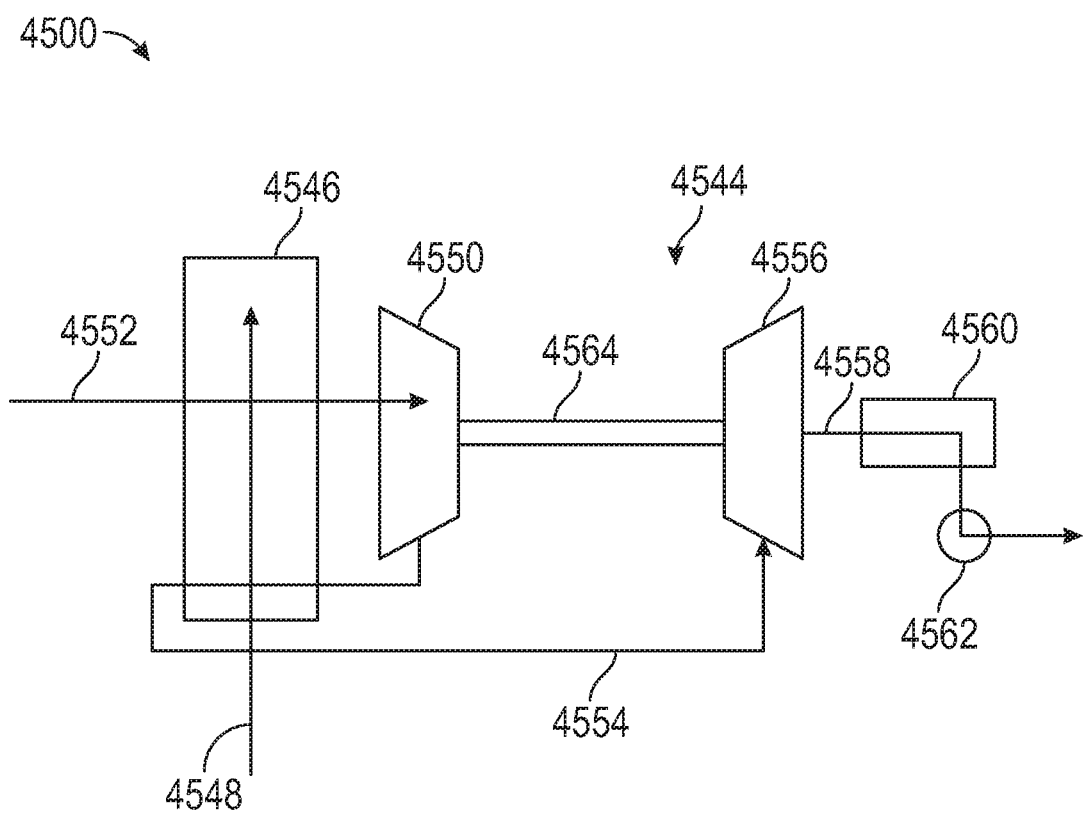
FIG. 35 is a schematic illustration of an on-board liquid air generation system in accordance with an embodiment of the disclosure.

FIG. 35 depicts a schematic illustration of an on-board cryogenic cooler 4500 as an example of the on-board cryogenic cooler 4308 of FIG. 33 in accordance with an embodiment. The cryogenic cooler 4500 can include one or more air cycle machines 4544 operable to compress, chill, expand, pump, and condense an air flow to produce liquid air for storage in the cryogenic liquid reservoir 4122 and/or immediate use. As one example, the cryogenic cooler 4500 can include a heat exchanger system 4546 operable to receive a cooling air intake 4548. A compressor 4550 can receive bleed air 4552 from a gas turbine engine (not depicted) as an air flow. Compressed air 4554 output by the compressor 4550 can pass through the heat exchanger system 4546 to at least one turbine 4556 as a cooled flow 4558 to a vacuum system 4560 and a liquid air condensate pump system 4562 that urges liquid air through into the cryogenic liquid distribution system 4304 of FIG. 33. The compressor 4550 and the at least one turbine 4556 may be mechanically linked by a coupling 4564, such as a shaft. In some embodiments, the compressor 4250 and the at least one turbine 4556 are not physically coupled. The compressor 4550 can be driven mechanically by a gas turbine engine and/or electrically using an electric motor (not depicted). Although one example of the cryogenic cooler 4500 is depicted in the example of FIG. 35, it will be understood that additional elements and modifications are contemplated, such as two or more turbine wheels, recirculation paths, water separation, one or more fan sections, intermediate taps, relief valves, and/or other such elements known in the art.

Figure 36:
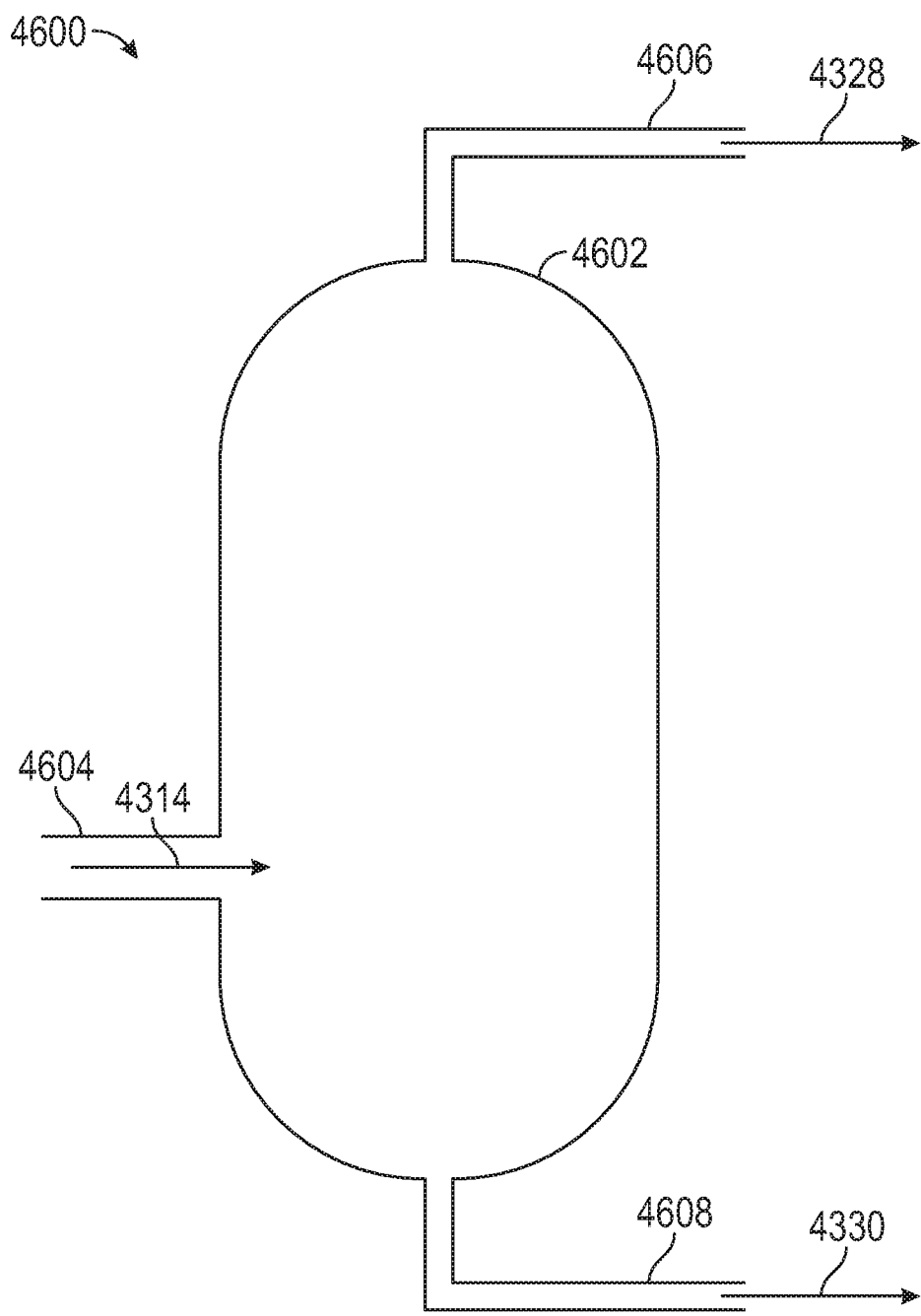
FIG. 36 is a schematic illustration of a gas separation system in accordance with an embodiment of the disclosure.

FIG. 36 depicts a schematic illustration of a cryogenic air separator 4600 as an example of the gas separation system 4326 of FIG. 33 in accordance with an embodiment. The cryogenic air separator 4600 can include a separation vessel 4602 with at least one liquid air input port 4604, at least one gaseous nitrogen output port 4606, and at least one liquid oxygen output port 4608. The liquid air input port 4604 is operable to receive a liquid air flow from the cryogenic working fluid 4314 of FIG. 33. The temperature of the liquid air flow can be below the boiling points of nitrogen, oxygen, and other constituents of air upon reaching liquid air input port 4604. The separation vessel 4602 can be sized, located, and otherwise temperature controlled to allow nitrogen to boil off from the liquid air flow through the gaseous nitrogen output port 4606 as gaseous nitrogen 4328 while liquid oxygen 4330 remains and flows out of the liquid oxygen output port 4608. For instance, in reference to an example at ambient atmospheric pressure, as the liquid air flow is warmed from about –200 degrees C., nitrogen would boil off at temperatures at or above –195.8 degrees C., leaving liquid oxygen or an oxygen-rich liquid if the temperature remains below –183 degrees C., for example. The separation in the cryogenic air separator 4600 can be temperature-based in that differences in boiling points of nitrogen and oxygen allow for nitrogen to transition into a gaseous state while oxygen (and potentially argon) remains liquefied while the temperature of the cryogenic working fluid 4314 rises upon entry into the separation vessel 4602. The pressure of the cryogenic working fluid 4314 can be set/adjusted to match the separation performance properties of the cryogenic air separator 4600, as liquid/gas state is a function of pressure and temperature. Although the example of FIG. 36 includes a single separation vessel 4602, it will be understood that other configurations can be implemented, such as a series of separation vessels 4602, along with other features to further enhance separation performance.

Figure 37:
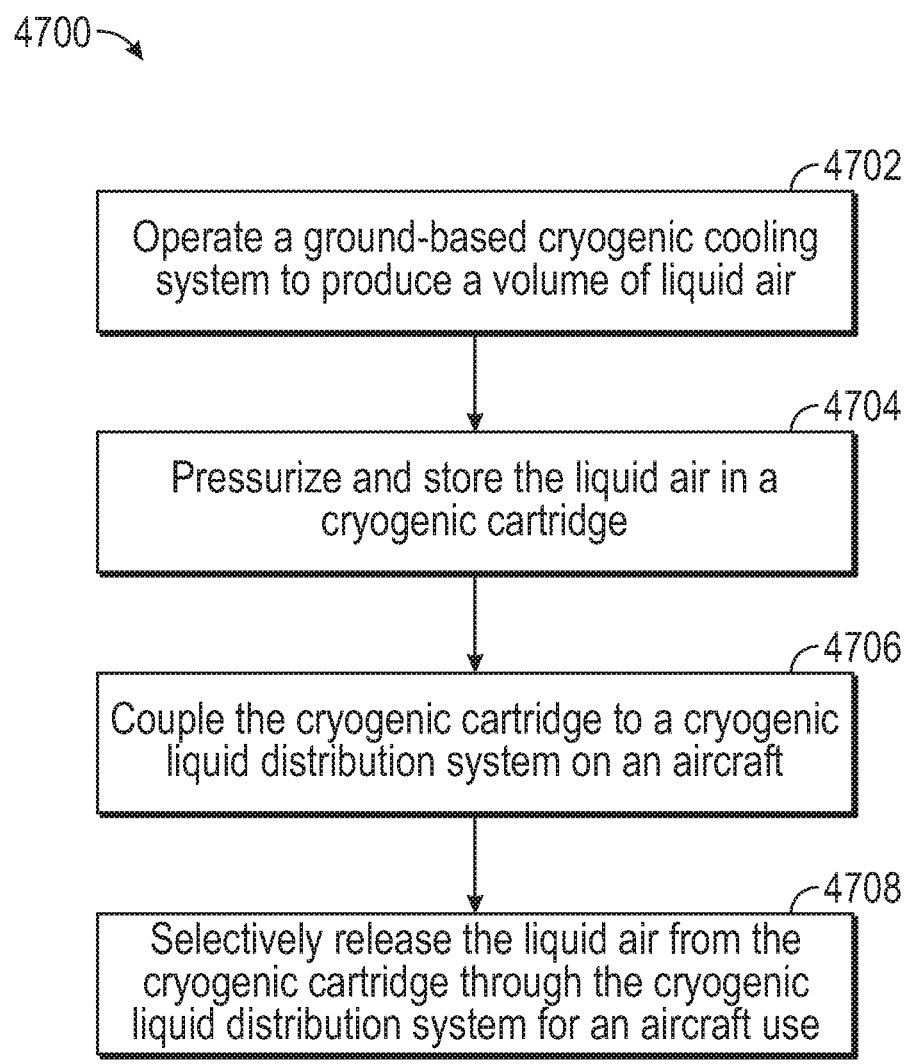
FIG. 37 is a flow chart illustrating a method in accordance with an embodiment of the disclosure.

FIG. 37 is a flow chart illustrating a method 4700 of ground-based filling of a cryogenic cartridge 4120 for an aircraft use (e.g., aircraft 4302 of FIG. 33) in accordance with an embodiment. The method 4700 of FIG. 37 is described in reference to FIGS. 1-37 and may be performed with an alternate order and include additional steps. The method 4700 can be performed, for example, by the ground-based cryogenic cooling system 4100, the cryogenic system 4300, and/or other variations.

At block 4702, a ground-based cryogenic cooling system 4100 is operated to produce a volume of liquid air 4164. The compressor 4150 of the cryogenic cooler 4102 can produce compressed air 4154 responsive to rotation driven by an electric motor 4110. The compressed air 4154 can be cooled through a heat exchanger system 4146. Water 4114 can be removed from cooled compressed air 4154 to produce dried cool air 4155. The dried cool air 4155 can be expanded through a turbine assembly 4156 to produce chilled air 4158. Condensing of the chilled air 4158 into the liquid air 4164 can be performed using the liquid air condensate pump system 4162. The electric motor 4110 can be powered by a renewable power source including one or more of: a solar array 4104A, a wind turbine system 4104C, and a rechargeable battery system 4104B.

At block 4704, the liquid air 4164 is pressurized and stored in a cryogenic cartridge 4120. The liquid air 4164 can be urged through a feeder line 4140 into the cryogenic cartridge 4120. As previously described, the cryogenic cartridge 4120 can include a coupling interface 4124 configured to detachably establish fluid communication with the feeder line 4140 and a cryogenic liquid reservoir 4122 configured to store the liquid air 4164 under pressure. The cryogenic cartridge 4120 can also include a rapid release component 4126 operable to depressurize the cryogenic liquid reservoir 4122 upon impact.

At block 4706, the cryogenic cartridge 4120 is coupled to a cryogenic liquid distribution system 4304 on an aircraft 4302. At block 4708, liquid air is selectively released from the cryogenic cartridge 4120 as a cryogenic working fluid 4314 through the cryogenic liquid distribution system 4304 for an aircraft use. The aircraft use can include one or more cryogenic usage systems 4312, such as one or more of: cryogenically cooling an electric motor using an electric motor cryogenic cooling system 4320, cooling one or more components of a gas turbine engine using a gas turbine engine cooling system 4322, and/or cooling power electronics of the aircraft 4302 using a power electronics cooling system 4324. In some embodiments, liquid air is passed through a gas separation system 4326 to produce gaseous nitrogen 4328 and liquid oxygen 4330 for various aircraft uses, such as providing the gaseous nitrogen 4328 to a fuel tank inerting system 4332 and providing the liquid oxygen 4330 to either or both of a breathable oxygen system 4334 and a combustion enhancement system 4336. Further, an on-board cryogenic cooler 4308 can be controlled to at least partially recharge the cryogenic cartridge 4120 during aircraft operation.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for an aircraft, the system comprising:
    an engine bleed source of a gas turbine engine;
    a means for chilling an engine bleed air flow from the engine bleed source to produce a chilled working fluid at a temperature below a boiling point of oxygen and above a boiling point of nitrogen;
    a means for separating gaseous nitrogen from the chilled working fluid as a gaseous nitrogen supply and separating liquid oxygen from the chilled working fluid as a liquid oxygen supply; and
    a plumbing system comprising:
        a feeder line coupled to an output of the means for chilling the engine bleed air flow;
        a pump in fluid communication with the feeder line, the pump operable to urge the chilled working fluid for an aircraft use through the plumbing system; and a valve operable to direct a portion of the chilled working fluid to the means for separating gaseous nitrogen.

2. The system of claim 1, wherein the means for chilling the engine bleed air flow is a cryogenic cooling system comprising a compressor operable to further compress the engine bleed air flow as compressed air and at least one turbine operable to expand and cool the compressed air as the chilled working fluid.

3. The system of claim 1, wherein the aircraft use comprises cooling one or more components of the aircraft.

4. The system of claim 1, wherein the aircraft use comprises an increased airflow to one or more of: components of the gas turbine engine, a cabin of the aircraft, and electronics of the aircraft.

5. The system of claim 1, wherein the means for separating gaseous nitrogen and liquid oxygen is an impact plate-based separator comprising an impact plate positioned proximate to an input port to alter a flow direction of the chilled working fluid.

6. The system of claim 1, wherein the means for separating gaseous nitrogen and liquid oxygen is a stagnation plate-based separator comprising a stagnation plate with variations in curvature and flow paths to alter a flow velocity and pressure of the chilled working fluid.

7. The system of claim 1, wherein the means for separating gaseous nitrogen and liquid oxygen is a magnetic-based separator comprising a magnetic field generator operable to produce a magnetic field to attract the liquid oxygen towards a liquid oxygen output port.

8. The system of claim 1, wherein at least a portion of the gaseous nitrogen supply is provided to one or more of: a fuel system of the aircraft and a location downstream of a combustor of the gas turbine engine.

9. The system of claim 1, wherein at least a portion of the liquid oxygen supply is provided to one or more of: a cabin of the aircraft and a compressor stream of the gas turbine engine.

10. A method comprising:
providing an engine bleed air flow from an engine bleed source of a gas turbine engine to a cryogenic cooling system;
chilling the engine bleed air flow using the cryogenic cooling system to produce a chilled working fluid at a temperature below a boiling point of oxygen and above a boiling point of nitrogen;
urging, by a pump in fluid communication with a feeder line of a plumbing system, the chilled working fluid from the feeder line for an aircraft use of an aircraft through the plumbing system, wherein the feeder line is coupled to an output of the cryogenic cooling system;
directing, by a valve of the plumbing system, a portion of the chilled working fluid to a cryogenic air separator;
separating, by the cryogenic air separator, gaseous nitrogen from the chilled working fluid as a gaseous nitrogen supply; and
separating, by the cryogenic air separator, liquid oxygen from the chilled working fluid as a liquid oxygen supply.

11. The method of claim 10, further comprising:
compressing the engine bleed air flow as compressed air by a compressor of the cryogenic cooling system; and
expanding and cooling the compressed air as the chilled working fluid by at least one turbine of the cryogenic cooling system.

12. The method of claim 10, wherein the aircraft use comprises cooling one or more components of the aircraft.

13. The method of claim 10, wherein the aircraft use comprises an increased airflow to one or more of: components of the gas turbine engine, a cabin of the aircraft, and electronics of the aircraft.

14. The method of claim 10, wherein separating gaseous nitrogen and liquid oxygen is performed using an impact plate-based separator comprising an impact plate positioned proximate to an input port to alter a flow direction of the chilled working fluid.

15. The method of claim 10, further comprising:
providing at least a portion of the gaseous nitrogen supply to one or more of: a fuel system of the aircraft and a location downstream of a combustor of the gas turbine engine.

16. The method of claim 10, further comprising:
providing at least a portion of the liquid oxygen supply to one or more of: a cabin of the aircraft and a compressor stream of the gas turbine engine.

\* \* \* \* \*